US011423172B2

(12) United States Patent
Alameh et al.

(10) Patent No.: US 11,423,172 B2
(45) Date of Patent: Aug. 23, 2022

(54) ELECTRONIC DEVICES, METHODS, AND SYSTEMS FOR TEMPORARILY PRECLUDING SHARING OF MEDIA CONTENT TO PROTECT USER PRIVACY

(71) Applicant: Motorola Mobility LLC, Chicago, IL (US)

(72) Inventors: Rachid Alameh, Crystal Lake, IL (US); Alvin Von Ruff, Woodstock, IL (US); Jarrett Simerson, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 103 days.

(21) Appl. No.: 16/838,842

(22) Filed: Apr. 2, 2020

(65) Prior Publication Data

US 2021/0312074 A1  Oct. 7, 2021

(51) Int. Cl.
*G06F 21/62* (2013.01)
*H04L 9/40* (2022.01)
*G06F 3/0481* (2022.01)

(52) U.S. Cl.
CPC ........ *G06F 21/6245* (2013.01); *H04L 63/107* (2013.01); *G06F 3/0481* (2013.01)

(58) Field of Classification Search
CPC combination set(s) only.
See application file for complete search history.

(56) References Cited

U.S. PATENT DOCUMENTS

| 8,924,999 | B1 | 12/2014 | Santangelo | |
| 9,262,596 | B1* | 2/2016 | Steiner | G06F 21/6245 |
| 9,961,494 | B2* | 5/2018 | Kannan | H04W 4/21 |
| 2004/0268131 | A1 | 12/2004 | Kudo | |
| 2008/0316031 | A1 | 12/2008 | Kalama | |
| 2009/0059797 | A1 | 3/2009 | Northcutt | |
| 2009/0217344 | A1* | 8/2009 | Bellwood | G06F 21/10 726/1 |
| 2013/0263206 | A1* | 10/2013 | Nefedov | G06F 21/604 726/1 |
| 2013/0305325 | A1* | 11/2013 | Headley | H04L 9/3215 726/5 |
| 2014/0053078 | A1 | 2/2014 | Kannan | |

(Continued)

OTHER PUBLICATIONS

"Geo-Blocking", Wikipedia; Published Mar. 22, 2020; https://en.wikipedia.org/wiki/Geo-blocking.

(Continued)

*Primary Examiner* — Harris C Wang

(74) *Attorney, Agent, or Firm* — Philip H. Burrus, IV

(57) ABSTRACT

An electronic device includes one or more sensors capturing media content from an environment of the electronic device. A location detector determines whether the environment of the electronic device is situated at a location of residence of an authorized user of the electronic device. A user interface receives user input requesting transmission of the media content to another electronic device located outside the location of residence of the authorized user of the electronic device. One or more processors preclude transmission of the media content to the other electronic device in response to the user input when the location detector determines that one or more sensors captured the media content at the location of residence of the authorized user of the electronic device.

20 Claims, 20 Drawing Sheets

(56) References Cited

U.S. PATENT DOCUMENTS

| | | | | |
|---|---|---|---|---|
| 2015/0026234 | A1* | 1/2015 | Graham | G06Q 50/01 |
| | | | | 709/202 |
| 2015/0113664 | A1* | 4/2015 | Aad | G06V 40/172 |
| | | | | 726/27 |
| 2016/0063660 | A1* | 3/2016 | Spector | G06T 1/60 |
| | | | | 382/100 |
| 2017/0063772 | A1* | 3/2017 | Bapat | G06Q 50/01 |
| 2017/0078760 | A1* | 3/2017 | Christoph | H04L 65/612 |
| 2017/0124296 | A1* | 5/2017 | Baldwin | G06F 21/105 |
| 2017/0280411 | A1* | 9/2017 | Noonan | G01S 5/02 |
| 2019/0371067 | A1 | 12/2019 | Simari | |
| 2020/0120500 | A1* | 4/2020 | Sharma | H04W 12/02 |
| 2021/0099571 | A1 | 4/2021 | Wambugu | |
| 2021/0144150 | A1 | 5/2021 | James | |

OTHER PUBLICATIONS

"How to Mange Your Social Media Privacy Settings", The University of Texas at Austin Center for Identity; Published on or before Feb. 25, 2020; https://identity.utexas.edu/everyone/how-to-manage-your-social-media-privacy-settings.

"Restricting the Geographic Distribution of Your Content", AWS Developer Guide; Published on or before Feb. 25, 2020; https://docs.aws.amazon.com/AmazonCloudFront/latest/DeveloperGuide/georestrictions.html.

"Restricting the Shares", Support Articles for PLEX; Published on or before Feb. 25, 2020; https://support.plex.tv/articles/204232573-restricting-the-shares/.

Chukwube, Joseph , "The Ultimate Guide to Bypassing Geo-restrictions While Streaming", Hackernoon; Published Jan. 17, 2020; https://hackernoon.com/the-ultimate-guide-to-bypassing-geo-restrictions-while- streaming-5d97d85f87b2.

Fleishman, Glenn , "How to disable My Photo Stream and iCloud Photo Sharing without erasing your photos", Macword; Published Aug. 9, 2018; https://support.plex.tv/articles/204232573-restricting-the-shares/.

Molla, Rani , "People say they care about privacy but they continue to buy devices that can spy on them", Vox: Recode; Published May 13, 2019; https://www.vox.com/recode/2019/5/13/18547235/trust-smart-devices-privacy-security.

Schmidt, Casey , "How Geo Blocking Protects Digital Property", Posted Mar. 11, 2020; https://www.canto.com/blog/geo-blocking/.

Whittaker, Zack , "For privacy and security, change these Android settings right now", ZDNet; Published Aug. 22, 2016; https://www.zdnet.com/pictures/android-phone-tablet-privacy-security-settings/.

Wang, Harris C. "Non-Final Office Action" U.S. Appl. No. 16/838,845, filed Apr. 2, 2020; dated Sep. 28, 2021.

Wang, Harris , "Notice of Allowance", U.S. Appl. No. 16/838,845, filed Apr. 2, 2020; dated Jan. 12, 2022.

Khan, Hassan Abdur-Rahman, "Non-Final Office Action", U.S. Appl. No. 16/838,838; filed Apr. 2, 2020; dated Jun. 9, 2022.

* cited by examiner

ELECTRONIC DEVICES, METHODS, AND SYSTEMS FOR TEMPORARILY PRECLUDING SHARING OF MEDIA CONTENT TO PROTECT USER PRIVACY

BACKGROUND

Technical Field

This disclosure relates generally to electronic devices, and more particularly to electronic devices having one or more sensors capable of capturing media content.

BACKGROUND ART

Modern portable electronic devices often have the computing power on par with the desktop computers of only a few years ago. Modern electronic devices such as smartphones are equipped with powerful processors, high-resolution displays, powerful loudspeakers, and extremely fast communication circuits. Moreover, these devices are frequently equipped with advanced sensors such as high-resolution image capture devices and sensitive microphones that are capable of capturing media content such as images, sounds, and video. Users of these devices frequently like to share captured media with others. It would be advantageous to have improved electronic devices, methods, and systems that helped to ensure that media content is shared only when intended.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
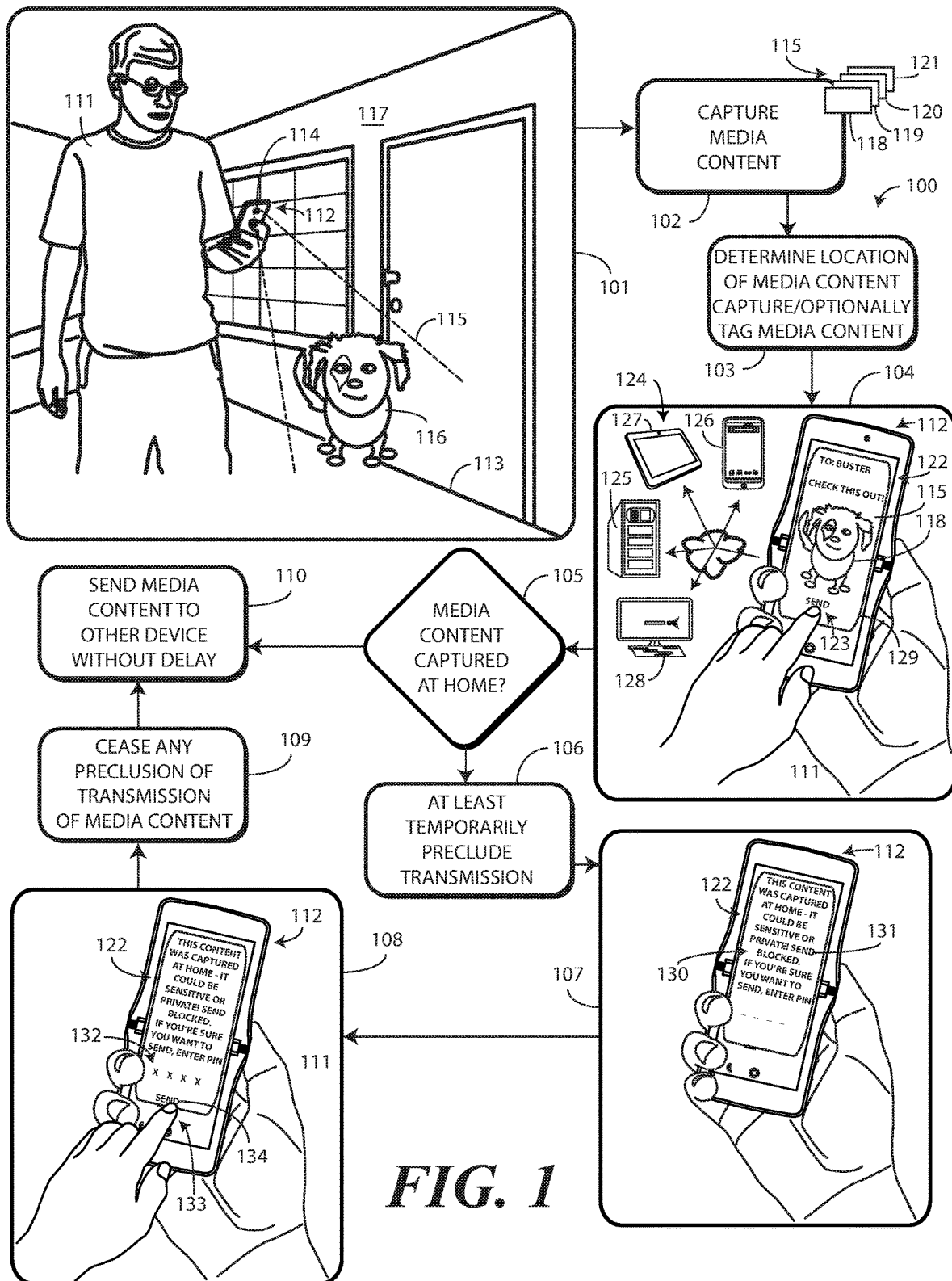
FIG. 1 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to at least temporarily precluding the transmission of media content to another electronic device in response to underlying conditions. Illustrating by example, in one or more embodiments one or more processors of an electronic device at least temporarily preclude the transmission of media content to another electronic device, server, social media site, or other recipient when the media content is captured at a location of residence of an authorized user of the electronic device. In other embodiments, the one or more processors at least temporarily preclude the transmission of media content when the location at which the media content is captured and the location at which the request to transmit the media content substantially differ. In still another embodiment, the one or more processors at least temporarily preclude the transmission of the media content when the location of the transmitting electronic device and the receiving electronic device are substantially different, unless the transmitting electronic device and the receiving electronic device can be otherwise linked together such as by having a history of engagement or residing at the same location of residence, and so forth.

Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of at least temporarily blocking or precluding the transmission of media content based upon one or more underlying factors, until additional authorization is received to transmit the media content is received in one or more embodiments, as described herein. The non-processor circuits may include, but are not limited to, a radio receiver, a radio transmitter, signal drivers, clock circuits, power source circuits, and user input devices. As such, these functions may be interpreted as steps of a method to perform the temporary preclusion of transmission and/or the subsequent transmission once the necessary additional authorization factors are received. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that people love to share media content captured by their electronic devices with others. For instance, a person may want to share images, sounds, and videos of a concert, party, emails, messages, or other event with friends who are not present. The person may want to share these items directly with others, such as by sending a multimedia message or electronic mail comprising the media content. Alternatively, or in combination therewith, the person may want to share the media content more broadly by posting it on a social media site where even people who are unknown to the person may see and experience the images, sounds, videos, and so forth.

Embodiments of the disclosure also contemplate that once an image, sound, text, or video is shared, especially when shared via social media, it can be difficult to "unshare" the same media content. Once the proverbial sharing bell has been rung, it can be difficult or impossible to un-ring this bell by deleting, retrieving, destroying, or otherwise preventing others from seeing the media content. A user receiving a video, for example, may have already retransmitted, saved, or otherwise made a copy of the video. When an image is posted on social media, crawling servers may detect this posting and replicate the image across a plurality of devices. In this fashion, sharing media content with others, especially when that media content is shared via third party servers such as those employed by social media sites, can create a "digital tattoo" that is difficult or impossible to remove.

Embodiments of the disclosure provide a solution that helps to ensure only media content that is specifically intended for sharing is shared from a transmitting electronic device. Said differently, embodiments of the disclosure help to prevent the unintentional sharing of personal, private, or sensitive media content. In one or more embodiments, one or more processors of an electronic device perform this function by at least temporarily precluding the sharing of the media content based upon one or more underlying factors. This preclusion of transmission, which can occur for a matter of seconds, minutes, or hours, or until additional authorization to transmit the media content is received, serves as a "circuit breaker" that at least temporarily prevents or blocks media content that could be private, personal, or sensitive, as determined by the one or more factors, from being inadvertently transmitted from the electronic device to another electronic device. This circuit breaker allows the person requesting the transmission of the media content to pause, reconsider, and optionally verify that the sharing of the media content is intentional.

In one or more embodiments, one or more sensors of an electronic device capture media content from an environment of the electronic device. A location detector of the electronic device identifies a location of the electronic device when the one or more sensors capture the media content.

In one or more embodiments, when a user interface of the electronic device receives user input requesting transmission of the media content to another electronic device, the one or more processors, in conjunction with the location detector, determine another location of the receiving electronic device. When the location of the transmitting electronic device and the location of the receiving electronic device are substantially different locations, such as when the location of the transmitting electronic device and the receiving electronic device are beyond a predefined radius from each other, which could be set in a device menu, in one or more embodiments the one or more processors at least temporarily preclude the transmission of the media content to the receiving electronic device.

In one or more embodiments, the one or more processors then prompt, such as by placing an interactive notification on a touch-sensitive display of the electronic device, for additional authorization to transmit the media content to the receiving electronic device while at least temporarily precluding the transmission of the media content. The prompt might say, "the receiving device is not at the same location—are you sure you want to send or post this content?" In one or more embodiments, presuming that the authorized user of the electronic device does indeed want to send or post the media content, they may deliver an additional authorization to the user interface, such as by touching a user actuation target marked "yes" or "send." In one or more embodiments, when the one or more processors receive the additional authorization at the user interface while at least temporarily precluding the transmission of the media content to the other electronic device, they cease the at least temporarily precluding the transmission and instead cause a communication device to transmit the media content to the other electronic device.

This embodiment of the disclosure works to elevate personal data security and user privacy. In addition, this embodiment of the disclosure simplifies device-to-device engagement by allowing media content captured at a location to be, by default, sharable with other electronic devices who are at the same location where the media content was captured. As will be described in more detail below, this embodiment of the disclosure also allows sharing of the media content between electronic devices based upon a prior engagement history without the necessity of receiving the additional authorization at the user interface. However, this embodiment of the disclosure at least temporarily precludes sharing of media content when the location of the transmitting electronic device and the receiving electronic device are substantially different.

In other embodiment, one or more sensors of the electronic device also capture media content from an environment around the electronic device. A location detector again detects a location of the electronic device when the one or more sensors capture the media content.

A user interface then receives user input requesting transmission of the media content to another electronic device, which could be an electronic device belonging to another person, a server, a cloud server, a social media server, or another electronic device. In one or more embodiments, when this occurs, the location detector identifies a second location occurring when the user input is received at the user interface.

In one or more embodiments, when the location occurring when the one or more sensors capture the media content is substantially different from the second location occurring when the request to transmit the media content is received are substantially different locations, one or more processors of the electronic device at least temporarily preclude the transmission of the media content to the other electronic device.

As before, in one or more embodiments the one or more processors can then prompt for additional authorization to transmit the media content to the receiving electronic device while at least temporarily precluding the transmission of the media content. A prompt presented on a display of the electronic device might say, "You're trying to send or post a video from a location that is different from where the video was captured—are you sure you want to send or post this content?"

In one or more embodiments, presuming that the authorized user of the electronic device does indeed want to send or post the media content, they may deliver an additional authorization to the user interface, such as by touching a user actuation target marked "yes" or "send." In one or more embodiments, when the one or more processors receive the additional authorization at the user interface while at least temporarily precluding the transmission of the media content to the other electronic device, they cease the at least temporarily precluding the transmission and instead cause a communication device to transmit the media content to the other electronic device.

Advantageously, this embodiment of the disclosure elevates personal data security and user privacy pertaining to media content captured at a particular location by at least temporarily precluding any sharing of the media content when the electronic device is situated at a substantially different location when the authorized user attempts to share the media content. This embodiment improves data sharing privacy by allowing the electronic device to share captured media content if the electronic device is at the same location as when the media content was captured by the one or more sensors. Thus, if the authorized user is sitting at work while capturing media content, and then wants to share this "work-based" media content while the authorized user is still at work, the one or more processors of the electronic device allow this by matching the media content location and the share request location as being substantially the same location. However, if the authorized user attempts to share media content captured at home while at work, in one or more embodiments the one or more processors will by default at least temporarily preclude this transmission, optionally requesting additional authorization prior to causing any transmission.

Regarding media content captured at home, i.e., in a dwelling situated at a location of residence belonging to an authorized user of the electronic device, in one or more embodiments this media content is treated in a special, unique way. Embodiments of the disclosure contemplate that many users consider the home to be a particularly private place. A person's home is their proverbial "castle" as the saying goes. Accordingly, in one or more embodiments personal data security and user privacy pertaining to media content captured at a personal location, which may be the person's home or personal vehicle, is always—by default—at least temporarily precluded from being transmitted. In many cases, this at least temporarily preclusion continues until additional authorization to transmit the media content is received.

In such an embodiment, one or more sensors of the electronic device once again capture media content from an environment around the electronic device. In one or more embodiments, the location detector of the electronic device determines whether the environment is positioned at a location of residence of an authorized user of the electronic device when the one or more sensors capture the media content.

A user interface then again receives user input requesting transmission of the media content to another electronic device, which could be an electronic device belonging to another person, a server, a cloud server, a social media server, or another type of electronic device. In one or more embodiments, when this occurs, an where the environment where the media content was captured is positioned at the location of residence of the authorized user of the electronic device, the one or more processors of the electronic device at least temporarily preclude the transmission of the media content to the other electronic device.

In one or more embodiments, the location of residence can be subdivided, using user settings set in a menu of the electronic device, such that media content captured in some locations of the location of residence are freely sharable without any temporary preclusion, while other media content captured in other locations is at least temporarily precluded from being shared. Illustrating by example, in one or more embodiments the location of residence comprises only a portion of the residence of the authorized user of the electronic device. The location of residence may only correspond to a dwelling, e.g., the house, or a portion of the dwelling, e.g., upstairs, downstairs, bedroom, bathroom, kitchen, etc. Using user settings in a menu operable with the one or more processors, in one or more embodiments the authorized user can designate particular portions of the residence as being those from which media content can be freely shared, while others are marked as locations from which sharing of media content should be at least temporarily precluded. Media content captured outside may be freely sharable, while media content captured inside may be at least temporarily precluded from being shared. Similarly, media content captured upstairs may be at least temporarily precluded from being shared, while media content captured downstairs may be freely shared, and so forth. Other examples of such subdivisions will be obvious to those of ordinary skill in the art having the benefit of this disclosure.

Regardless of whether the location of residence is a portion of a residence of the authorized user of the electronic device or the entirety of the residence of the authorized user, in one or more embodiments the one or more processors can then prompt for additional authorization to transmit the media content to the receiving electronic device while at least temporarily precluding the transmission of the media content. A prompt presented on a display of the electronic device might say, "You're trying to send or post a video captured upstairs in your house—are you sure you want to send or post this content?"

In one or more embodiments, presuming that the authorized user of the electronic device does indeed want to send or post the media content, they may deliver an additional authorization to the user interface, such as by touching a user actuation target marked "yes" or "send." In one or more embodiments, when the one or more processors receive the additional authorization at the user interface while at least temporarily precluding the transmission of the media content to the other electronic device, they cease the at least temporarily precluding the transmission and instead cause a communication device to transmit the media content to the other electronic device.

Thus, in one or more embodiments media content captured in the home is at least temporarily precluded from being shared by default. In one or more embodiments, if an authorized user of the electronic device attempts to share such media content by launching an application such as email, the one or more processors at least temporarily preclude the transmission by email by blocking the email application from accessing the media content at all. The one or more processors can then prompt the authorized user for additional authorization to transmit the media content. Where such additional authorization is received, the one or more processors can then cease the preclusion of the transmission of the media content and cause a communication device to transmit the media content to another electronic device.

The above explained embodiments are just a few of the ways methods, systems, and electronic devices configured in accordance with embodiments of the disclosure can be configured. Other examples will be described below. Still others will be obvious to those of ordinary skill in the art having the benefit of this disclosure.

Turning now to FIG. 1, illustrated therein is one explanatory method 100 in accordance with one or more embodiments of the disclosure. Beginning at step 101, an authorized user 111 is shown holding an electronic device 112 configured in accordance with one or more embodiments of the disclosure. The authorized user 111 is situated at his location of residence 113, which in this example is a dwelling (his house) situated at a residence belonging to the authorized user 111.

At step 102, one or more sensors 114 of the electronic device 112, which in this example comprise an image capture device, are capturing media content 115 from an environment 117 of the electronic device 112. In this example, the environment 117 comprises the interior of the house, and the media content 115 comprises images 118 of the authorized user's dog 116 that are captured by the image capture device. While captured images 118 are one example of media content 115 that one or more sensors of the electronic device 112 can capture, embodiments of the disclosure are not so limited. Other examples of media content 115 comprise captured video 119, captured audio 120, captured screenshots 121, which can be captured text or multimedia messages, captured emails, captured websites, other media content, and/or combinations thereof. Other examples of media content 115 that can be captured by one or more sensors of the electronic device 112 will be obvious to those of ordinary skill in the art having the benefit of this disclosure.

At step 103, a location detector of the electronic device determines whether the environment 117 is positioned at a location of residence 113 of the authorized user 111 of the electronic device 112 when the one or more sensors capture the media content 115. In this example, the environment 117 is positioned at a location of residence 113 of the authorized user 111, as the environment 117 is situated within the authorized user's house. As will be described in more detail below with reference to FIG. 7, in one or more embodiments the location of residence 113 is user definable within a residence, e.g., a land parcel with predefined metes and bounds, belonging to the authorized user 111 of the electronic device 112. For example, in one or more embodiments the location of residence 113 can be defined as being only a predefined portion of the residence of the authorized user 111. The authorized user 111 may use user settings of a menu to define, for instance, a dwelling (the house in this example) being the location of residence 113 or predefined portion of the residence of the authorized user 111. Alternatively, the authorized user 111 may use the user settings to define only a portion of the dwelling situated at the residence as the location of residence 113. Other examples will be described below. Still others will be obvious to those of ordinary skill in the art having the benefit of this disclosure.

At step 104, a user interface 122, shown illustratively as a touch-sensitive display in this example, is receiving user input 123 requesting transmission of the media content 115 to another electronic device 124. In this example, the user input 123 is requesting transmission of the media content 115 to another electronic device 124 across a network.

Specifically, the authorized user 111 is requesting that the image 118 of the authorized user's dog 116 be sent in the form of a multimedia message 129 to a person named Buster. The multimedia message 129 includes a heading line saying, "check this out," as the authorized user 111 is particularly excited about the shenanigans his dog 116 got into that morning. As such, the authorized user 111 wants Buster to share in the antics. Accordingly, the authorized user 111 delivers user input 123 to the user interface 122 requesting that the image 118 be transmitted to another electronic device 124 belonging to Buster.

It should be noted that the other electronic device 124 could be any of a number of electronic devices. For example, in one embodiment, the other electronic device 124 comprises a portable electronic device such as a smartphone 126 or tablet computer 127 that belongs to a friend, stranger, or other acquaintance of the authorized user 111. For example, the other electronic device 124 could be another smartphone 126 belonging to Buster, who is the intended recipient of the image 118 in this example. In another embodiment, the other electronic device 124 is a computer 128. In still other embodiments, the other electronic device 124 is a server 125. The server 125 could be a cloud server 125, a personal server, web server, a social media server, commercial server, private server, institutional server, academic server, non-profit server, or other type of server configured to receive media content 115 from electronic devices across the network. For example, rather than sending a multimedia message 129 to a smartphone belonging to Buster, in another embodiment the authorized user 111 may want to share the image 118 with Buster by posting the image 118 with a server 125 operated by a social media service while tagging Buster in the image. Other examples of electronic devices to which media content 115 may be transmitted in accordance with embodiments of the disclosure will be obvious to those of ordinary skill in the art having the benefit of this disclosure.

At decision 105, one or more processors of the electronic device 112 determine whether the environment 117 is positioned at the location of residence 113 of the authorized user 111. In one or more embodiments, where the environment 117 is positioned at a location other than at the location of residence 113 of the authorized user 111, the one or more processors of the electronic device 112 cause, at step 110 in response to the user input 123 received at step 104, a communication device of the electronic device 112 to transmit the media content 115 to the other electronic device 124. Thus, if the authorized user 111 had been somewhere other than the location of residence 113, such as in a public park taking pictures of his beloved dog 116, in one or more embodiments the images 118 would simply be sent at step 110 in response to the user input 123 received at step 104 due to the fact that the authorized user 111 was somewhere other than his home.

However, as noted above, in one or more embodiments the home, dwelling, or residence of the authorized user 111 is treated as a special case where media content 115 captured at home is presumed to be private, personal, or secure. Accordingly, in one or more embodiments when media content 115 is captured at home, a default mode of the electronic device 112 prevents the media content 115 from being shared outside the home. Said differently, in one or more embodiments where the media content 115 is captured at a location of residence 113 belonging to the authorized user 111, as determined by assessing media capture location, which can optionally be tagged to the media content 115 during the media content operation, the one or more processors of the electronic device 112 operate in a default mode to prevent any applications from accessing the media content 115 so as to be able to share it by causing a communication device of the electronic device 112 to transmit the media content 115 to another electronic device 124.

To illustrate, in this example, as shown at step 101, the environment 117 within which the media content 115 was captured is indeed positioned at the location of residence 113 of the authorized user 111 due to the fact that its situated inside the authorized user's house. Accordingly, at step 106, in one or more embodiments when the environment 117 is positioned at the location of residence 113 of the authorized user of the electronic device 112 when the one or more sensors of the electronic device 112 capture the media content 115, the one or more processors of the electronic device 112 at least temporarily preclude, in response to the user input 123 received at step 104, the transmission of the media content 115 to the other electronic device 124.

As used herein, "at least temporarily preclude" means preventing the transmission of the media content 115 for a duration sufficient to allow the authorized user 111 to reconsider, again determine, reassess, or otherwise confirm that they do actually intend to cause the media content 115 to be transmitted to the other electronic device 124. Thus, the one or more processors of the electronic device 112 may at least temporarily preclude the transmission of the media content 115 for a period of tens of seconds, minutes, or longer. As will be explained in more detail below, in one or more embodiments the one or more processors of the electronic device 112 may at least temporarily preclude the transmission of the media content 115 until the authorized user 111 causes the electronic device 112 to match a predefined criterion such as returning to a location where the media content 115 was captured, with a prompt or other instruction being presented thereafter indicating that the media content 115 can be shared after additional authorization or another override. Other triggers for ceasing the at least temporarily precluding the transmission of the media content 115 to the other electronic device 124 will be described below. Still others will be obvious to those of ordinary skill in the art having the benefit of this disclosure.

In this illustrative example, the at least temporarily precluding occurring at step 106 continues until additional authorization to transmit the media content 115 is received from the authorized user 111. For instance, in this example the one or more processors of the electronic device 112 prompt 130, at step 107, for additional authorization to transmit the media content 115 to the other electronic device 124. In one or more embodiments, this prompting 130 occurs while the one or more processors of the electronic device 112 are at least temporarily precluding the transmission of the media content 115 to the other electronic device 124 in response to the user input received at step 104 requesting transmission of the same.

In this example, the one or more processors of the electronic device 112 prompt 130 for additional authorization to transmit the media content 115 to the other electronic device by presenting a message 131 on the user interface 122 of the electronic device 112. In this illustrative embodiment, the message 131 requests additional authorization in the form of a personal identification number (PIN). It should be noted that a PIN is merely one form of additional authorization used in FIG. 1 for illustration purposes. In other embodiments, the additional authorization will comprise entry of a password, a simple actuation of a user actuation target, performance of a gesture on, or near, the user interface 122 of the electronic device 112, making a gesture translating the electronic device 112 in three-dimensional space, voice command, or some other manipulation of the electronic device 112 in response to the prompt 130.

In other embodiments, the additional authorization may comprise authentication information corresponding to the authorized user 111. Illustrating by example, the one or more processors of the electronic device 112 may require biometric information to be delivered to the electronic device 112 such as a fingerprint, iris scan, face scan, facial image, voice print, or other authenticator confirming that the person delivering the user input 123 at step 104 is indeed the authorized user 111 of the electronic device 112. Other examples of additional authorization will be described below. Still others will be obvious to those of ordinary skill in the art having the benefit of this disclosure.

In this illustrative example, the message 131 comprises an indicator explaining why the one or more processors of the electronic device 112 are at least temporarily precluding the transmission of the media content 115 in response to the user input 123 received at the user interface 122 at step 104. In this example, the message 131 states, "This content was captured at home—it could be sensitive or private! Send blocked. If you're sure you want to send, enter PIN."

Since the authorized user 111 is indeed sure he wants Buster to see the image 118 of his beloved dog 116, at step 108 the authorized user 111 delivers the additional authorization 132 to the user interface 122 in the form of additional user input 133 at step 108. The one or more processors of the electronic device 112 thus receive, at step 108, the additional authorization 132 to transmit the media content 115 to the other electronic device 124. In one or more embodiments, this receipt of the additional authorization 132 occurs while the one or more processors of the electronic device 112 at least temporarily preclude the transmission of the media content 115 to the other electronic device 124. The authorized user 111 may also actuate a user actuation target 134, shown here as a "send" icon presented on the touch-sensitive display of the electronic device 112, causing the additional authorization 132 to be delivered to the one or more processors of the electronic device 112.

In one or more embodiments, step 109 then comprises the one or more processors of the electronic device 112 ceasing, in response to receiving the additional authorization 132 to transmit the media content 115 to the other electronic device 124 at step 108, the at least temporarily precluding the transmission of the media content 115 to the other electronic device 124. Step 110 then comprises the one or more processors of the electronic device 112 causing, in response to the ceasing at step 109, a communication device of the electronic device 112 to transmit the media content 115 to the other electronic device 124. As noted above, while the media content 115 comprises an image 118 of the dog 116 in this illustration, embodiments of the disclosure are not so limited. The media content 115 can comprise captured video 119, captured audio 120, captured screenshots 121, captured text messages, captured emails, or any content that can be inputted to electronic device 112, or combinations thereof. Other examples of media content 115 will be obvious to those of ordinary skill in the art having the benefit of this disclosure.

Accordingly, in one or more embodiments the method 100 of FIG. 1 elevates personal data security and user privacy pertaining to media content 115 captured at a personal location, which is the home of the authorized user 111 in this example. As will be described below with reference to FIG. 7, the personal location could be other locations, such as when the electronic device 112 is situated within a vehicle belonging to the authorized user 111. Since media content 115 captured at home is frequently private and personal in nature, embodiments of the disclosure contemplate that people should be careful when sharing such media content 115 to other electronic devices 124 situated outside the home.

Thus, in the example of FIG. 1, the electronic device 112 has a default mode and an override mode. In the default mode, step 107 and step 108 would be omitted, with the one or more processors of the electronic device 112 not allowing any media content 115 captured in an environment 117 situated at a location of residence 113 of the authorized user 111 to be transmitted to other electronic devices 124. As noted above, this can be determined using a location detector and assessing the location of the capture of the media content 115, which can be tagged to the media content 115. The one or more processors of the electronic device 112 may prevent the transmission of the media content 115 to other electronic devices 124 by preventing applications operating on the one or more processors, such as an email, text, or social media application, from accessing the media content 115.

In the override mode, when the authorized user 111 attempts to share the media content 115 by launching an application such as the messaging application shown at step 104, the one or more processors block the media content 115 from being inserted into the message at step 106. In one or more embodiments, the one or more processors of the electronic device 112 then alert the authorized user 111 at step 107 that a higher level of authorization or authentication, here entry of a PIN, is required to confirm the authorized user's intent to share the media content 115 that is otherwise considered to be private since it was captured at the location of residence 113. When this additional authorization 132 is received, as shown at step 108, the media content 115 can be transmitted to the other electronic device 124 at step 110.

Figure 2:
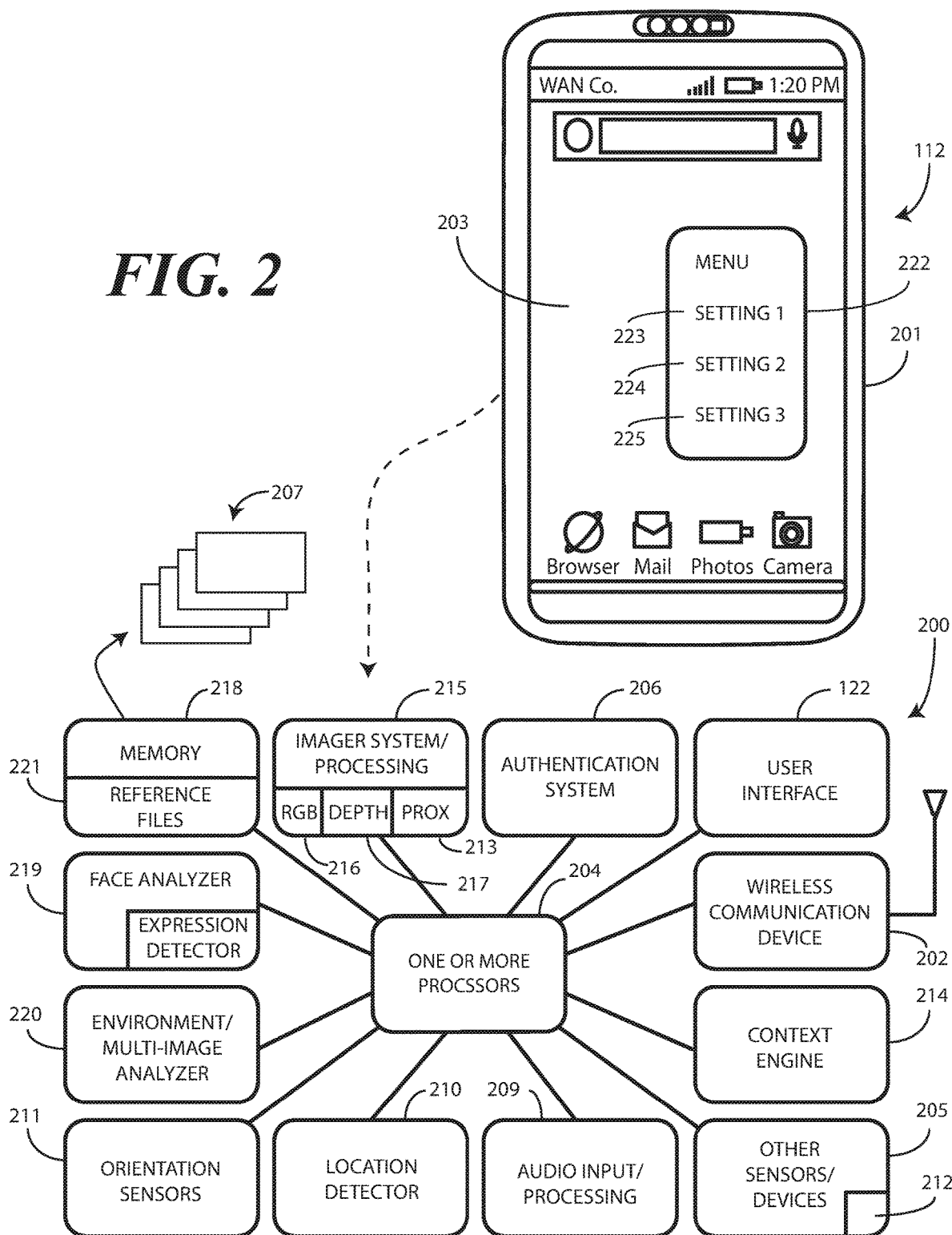
FIG. 2 illustrates one explanatory electronic device in accordance with one or more embodiments of the disclosure.

Turning now to FIG. 2, illustrated therein is one explanatory block diagram schematic 200 of one explanatory electronic device 112 configured in accordance with one or more embodiments of the disclosure. It should be noted that the electronic device 112, while shown as a smartphone for illustrative purposes in FIG. 1 above, the electronic device 112 can be any of a number of various types of devices. For example, it should be obvious to those of ordinary skill in the art having the benefit of this disclosure that the block diagram schematic 200 could be used with other devices as well, including conventional desktop computers, palm-top computers, tablet computers, gaming devices, media players, wearable devices, or other devices. Still other devices will be obvious to those of ordinary skill in the art having the benefit of this disclosure.

In one or more embodiments, the block diagram schematic 200 is configured as a printed circuit board assembly disposed within a housing 201 of the electronic device 112. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 122. In one or more embodiments, the user interface 122 includes a display 203, which may optionally be touch-sensitive. In one embodiment, users can deliver user input to the display 203 of such an embodiment by delivering touch input from a finger, stylus, or other objects disposed proximately with the display 203. In one embodiment, the display 203 is configured as an active matrix organic light emitting diode (AMOLED) display. However, it should be noted that other types of displays, including liquid crystal displays, suitable for use with the user interface 122 would be obvious to those of ordinary skill in the art having the benefit of this disclosure.

In one embodiment, the electronic device includes one or more processors 204. In one embodiment, the one or more processors 204 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 218, can optionally store the executable software code used by the one or more processors 204 during operation.

In this illustrative embodiment, the block diagram schematic 200 also includes a communication device 202 that can be configured for wired or wireless communication with one or more other devices or networks. The networks can include a wide area network, a local area network, and/or personal area network. The communication device 202 may also utilize wireless technology for communication, such as, but are not limited to, peer-to-peer or ad hoc communications such as HomeRF, Bluetooth, and IEEE 802.11, as well as other forms of wireless communication such as infrared technology. The communication device 202 can include wireless communication circuitry, one of a receiver, a transmitter, or transceiver, and one or more antennas.

In one embodiment, the one or more processors 204 can be responsible for performing the primary functions of the electronic device with which the block diagram schematic 200 is operational. For example, in one embodiment the one or more processors 204 comprise one or more circuits operable with the user interface 122 to present presentation information to a user. The executable software code used by the one or more processors 204 can be configured as one or more modules 207 that are operable with the one or more processors 204. Such modules 207 can store instructions, control algorithms, and so forth.

In one or more embodiments, the block diagram schematic 200 includes an audio input/processor 209. The audio input/processor 209 can include hardware, executable code, and speech monitor executable code in one embodiment. The audio input/processor 209 can include, stored in memory 218, basic speech models, trained speech models, or other modules that are used by the audio input/processor 209 to receive and identify voice commands that are received with audio input captured by an audio capture device. In one embodiment, the audio input/processor 209 can include a voice recognition engine. Regardless of the specific implementation utilized in the various embodiments, the audio input/processor 209 can access various speech models to identify speech commands.

In one embodiment, the audio input/processor 209 is configured to implement a voice control feature that allows a user to speak a specific device command to cause the one or more processors 204 to execute a control operation. For example, the audio input/processor 209 may deliver a device command requesting the one or more processors 204 to cooperate with the authentication system 206 to authenticate a user. Consequently, this device command can cause the one or more processors 204 to access the authentication system 206 and begin the authentication process.

The authentication system 206 and its authentication process can also be used to obtain additional authorization to transmit media content as well. For example, when the one or more processors 204 prompt for additional authorization to transmit media content to another electronic device, in one or more embodiments the one or more processors 204 can cooperate with the authentication system 206 to obtain that additional authorization by obtaining authentication information from the authorized user as proxy additional authorization information. Recall from above, for example, that the additional authorization (132) requested was a PIN, which required the authorized user (111) to manually enter the additional authorization (132) in response to the prompt (130). While this works well, in other embodiments rather than requiring the authorized user to enter the additional authorization manually, the authentication systems of the electronic device 112 can passively obtain the additional authorization to transmit media content in response to prompting by the one or more processors 204.

Consequently, in one or more embodiments the authentication system 206 can be configured to passively obtain the additional authorization from the authorized user by re-authenticating the authorized user in response to the prompting. When the authentication information used as additional authorization to transmit media content to another electronic device is received in the form of audio input, in one embodiment the audio input/processor 209 listens for voice commands, processes the commands and, in conjunction with the one or more processors 204, performs an authentication procedure in response to voice input to, if successful, ceases the at least temporarily precluding of the transmission and instead cause the communication device 202 to transmit the media content to the other electronic device.

Various sensors 205 can be operable with the one or more processors 204. FIG. 2 illustrates several examples such sensors 205. It should be noted that those shown in FIG. 2 are not comprehensive, as others will be obvious to those of ordinary skill in the art having the benefit of this disclosure. Additionally, it should be noted that the various sensors 205 shown in FIG. 2 could be used alone or in combination. Accordingly, many electronic devices will employ only subsets of the sensors 205 shown in FIG. 2, with the particular subset defined by device application.

A first example of a sensor 205 that can be included with the other components is a touch sensor. The touch sensor can include a capacitive touch sensor, an infrared touch sensor, resistive touch sensors, or another touch-sensitive technology. Other types of touch sensors will be obvious to those of ordinary skill in the art having the benefit of this disclosure.

Another example of a sensor 205 is a geo-locator that serves as a location detector 210. In one embodiment, location detector 210 is able to determine location data when the electronic device 112 captures media content, when the electronic device 112 receives user input at the user interface 122 requesting transmission of the media content, or location data when other operations occur with the electronic device 112. In one or more embodiments, the location data captured by the location detector 210 can also be tagged to the media content captured by the one or more sensors 205. This location data can be captured in a variety of ways, including by capturing the location data from a constellation of one or more earth orbiting satellites, or from a network of terrestrial base stations to determine an approximate location. In one or more embodiments, The satellite positioning systems based location fixes of the location detector 210 autonomously or with assistance from terrestrial base stations, for example those associated with a cellular communication network or other ground based network, or as part of a Differential Global Positioning System (DGPS), as is well known by those having ordinary skill in the art. The location detector 210 may also be able to determine location by locating or triangulating terrestrial base stations of a traditional cellular network, or from other local area networks, such as Wi-Fi networks.

One or more motion detectors can be configured as an orientation detector 211 that determines an orientation and/or movement of the electronic device 112 in three-dimensional space. Illustrating by example, the orientation detector 211 can include an accelerometer, gyroscopes, or other device to detect device orientation and/or motion of the electronic device 112. Using an accelerometer as an example, an accelerometer can be included to detect motion of the electronic device. Additionally, the accelerometer can be used to sense some of the gestures of the user, such as one talking with their hands, running, or walking.

The orientation detector 211 can determine the spatial orientation of an electronic device 112 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 112.

The one or more sensors 205 can also include a gaze detector for detecting the user's gaze point. The gaze detector can optionally include sensors for detecting the alignment of a user's head in three-dimensional space. Electronic signals can then be processed for computing the direction of user's gaze in three-dimensional space. The gaze detector can further be configured to detect a gaze cone corresponding to the detected gaze direction, which is a field of view within which the user may easily see without diverting their eyes or head from the detected gaze direction. The gaze detector can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector of FIG. 2.

Other components 212 operable with the one or more processors 204 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 212 can also include proximity sensors 213. The proximity sensors 213 fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 201 of the electronic device 112. In one embodiment, the signal receiver is an infrared signal receiver to receive an infrared emission from an object such as a human being when the human is proximately located with the electronic device 112.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level.

By contrast, proximity detector components include a signal emitter and a corresponding signal receiver. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 212 can optionally include a barometer or altimeter operable to sense changes in air pressure due to elevation changes or differing pressures of the electronic device 112. The other components 212 can also optionally include a light sensor that detects changes in optical intensity, color, light, or shadow in the environment of an electronic device. An infrared sensor can be used in conjunction with, or in place of, the light sensor. Similarly, the other components 212 can include a temperature sensor configured to monitor temperature about an electronic device 112.

A context engine 214 can then operable with the various sensors to detect, infer, capture, and otherwise determine persons and actions that are occurring in an environment about the electronic device 112. For example, where included one embodiment of the context engine 214 determines assessed contexts and frameworks using adjustable algorithms of context assessment employing information, data, and events. These assessments may be learned through repetitive data analysis. These assessments can be used to obtain additional authorization to transmit media content in one or more embodiments. Alternatively, a user may employ the user interface 122 to enter various parameters, constructs, rules, and/or paradigms that instruct or otherwise guide the context engine 214 in detecting multi-modal social cues, emotional states, moods, and other contextual information that can be used as additional authorization to transmit media content in response to a prompt by the one or more processors 204. The context engine 214 can comprise an artificial neural network or other similar technology in one or more embodiments.

In one or more embodiments, the context engine 214 is operable with the one or more processors 204. In some embodiments, the one or more processors 204 can control the context engine 214. In other embodiments, the context engine 214 can operate independently, delivering information gleaned from detecting multi-modal social cues, emotional states, moods, and other contextual information to the one or more processors 204. The context engine 214 can receive data from the various sensors. In one or more embodiments, the one or more processors 204 are configured to perform the operations of the context engine 214.

In one or more embodiments, the imager processor system 215 comprises an imager 216 that can be operable with the authentication system 206. The imager processors system 215 can also include an optional depth imager 217, which can also be operable with the authentication system 206.

In one embodiment, the imager 216 comprises a two-dimensional imager configured to receive at least one image of a person within an environment of the electronic device 112. In one embodiment, the imager 216 comprises a two-dimensional RGB imager. In another embodiment, the imager 216 comprises an infrared imager. Other types of imagers suitable for use as the imager 216 of the authentication system will be obvious to those of ordinary skill in the art having the benefit of this disclosure.

The depth imager 217, where included, can take a variety of forms. For example, the depth imager 217 can comprise a pair of imagers separated by a predetermined distance, such as three to four images. This "stereo" imager works in the same way the human eyes do in that it captures images from two different angles and reconciles the two to determine distance.

Alternatively, the depth imager 217 can comprise a structured light laser that projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 217 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, where included the depth imager 217 adds detection of a third "z-dimension" to the x-dimension and y-dimension captured by the imager 216. This additional dimension can be used to enhance the security of using a person's face as authentication data, be it for use as their password in the process of authentication by facial recognition or for use as additional authorization to transmit media content when the one or more processors 204 prompt the person for the same.

In one or more embodiments, the authentication system 206 can be operable with a face analyzer 219 and/or an environmental analyzer 220. The face analyzer 219 and/or environmental analyzer 220 can be configured to process an image or depth scan of an object and determine whether the object matches predetermined criteria. For example, the face analyzer 219 and/or environmental analyzer 220 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 220, operating in tandem with the authentication system 206, can be used as a facial recognition device to determine the identity of one or more persons detected about the electronic device 112. In one or more embodiments, this identity can be used as additional authorization to transmit media content in response to prompts by the one or more processors 204 when the media content is considered to be personal, private, or otherwise restricted from immediate transmission due to one or more underlying factors, such as where the media content was captured, where the electronic device 112 is situated, where the receiving electronic device is situated, whether the electronic device 112 and the receiving electronic device have a history indicating that they have been paired or reside at the same location of residence, or other factors.

In one or more embodiments, when the authentication system 206 detects a person, one or both of the imager 216 and/or the depth imager 217 can capture a photograph and/or depth scan of that person. The authentication system 206 can then compare the image and/or depth scan to one or more predefined authentication reference files 221 stored in the memory 218. This comparison, in one or more embodiments, is used to confirm beyond a threshold authenticity probability that the person's face—both in the image and the depth scan—sufficiently matches one or more of the reference files 221.

Beneficially, this optical recognition performed by the authentication system 206 operating in conjunction with the face analyzer 219 and/or environmental analyzer 220 allows access to the electronic device 112—or alternatively transmission of media content considered by the one or more processors 204 to be private, personal, or otherwise temporarily restricted from transmission—only when one of the persons detected about the electronic device are sufficiently identified as the owner and/or authorized user of the electronic device 112.

As noted above, the one or more processors 204, when media content is considered to be personal, private, or otherwise to be at least temporarily precluded from transmission, which could be determined from manual tagging, media content analysis or other techniques, the one or more processors 204 can prompt for additional authorization to transmit the media content. For example, in one or more embodiments the one or more sensors 205, one example of which is the imager 216, capture media content from an environment of the electronic device 112. The location detector 210 can then determine whether the environment of the electronic device 112 is situated at a location of residence of an authorized user of the electronic device 112.

When the user interface 122 receives user input requesting transmission of the media content to another electronic device location outside the location of residence of the authorized user of the electronic device, in one or more embodiments the one or more processors 204 can preclude transmission of the media content to the other electronic device in response to the user input when the location detector 210 determines that the one or more sensors 205 captured the media content at the location of residence of the authorized user of the electronic device 112.

When this occurs, in one or more embodiments the one or more processors 204 can present a prompt for additional authorization to transmit the media content to the other electronic device. The one or more processors 204 can cease the preclusion of the transmission of the media content to the other electronic device upon receiving the additional authorization to transmit the media content to the electronic device.

This additional authorization can be obtained in a variety of ways. In the example of FIG. 1, the additional authorization was obtained via manual entry of a PIN. However, in other embodiments the one or more processors 204 obtain the additional authorization passively by obtaining additional authentication information from the authorized user in response to the prompt, which can be used as proxy additional authorization authorizing transmission of the media content to the other electronic device.

Illustrating by way of example, if, while the one or more processors 204 are at least temporarily precluding the transmission of the media content to another electronic device, the one or more processors 204 present a prompt on the display 203 stating, "This content appears to be private—are you sure you want to send? If so, wink!" in one or more embodiments the authentication system 206 can operate in conjunction with the one or more sensors 205 to obtain at least one additional authentication factor, here a wink, from a person to be used as the additional authorization to transmit the media content. The one or more processors 204, operating with the authentication system 206, can then compare this additional authentication factor to one or more reference files 221 stored in the memory 218 of the electronic device 112. Where the at least one additional authentication factor matches at least one reference file of the one or more reference files 221, the one or more processors 204 can passively interpret this additional authentication factor as the authorized user actively delivering additional authorization to transmit the media content to the other electronic device.

Thus, in this example the face analyzer 219 and/or environmental analyzer 220 identify an expressed mien in response to a prompt, while the one or more processors 204 preclude the transmission of media content, from at least one image and/or at least one facial depth scan. This mien, requested by the prompt, can serve as an additional authentication factor used to provide additional authorization to transmit the media content to the other electronic device. In one or more embodiments, the one or more processors 204 cease the at least temporarily precluding of the transmission and instead cause, in response to the user input requesting the same, the communication device 202 to transmit the media content to the other electronic device when the expressed mien matches reference file of the one or more reference files 221 stored in the memory 218. Examples of expressed miens include one of one or more raised eyebrows, one or more closed eyes, one or more fingers touching a face, an opened mouth, looking up, looking down, looking to the right, looking to the left, or being situated adjacent to a predefined object. Other techniques for delivering additional authorization to transmit media content to another electronic device will be described below. Still other techniques will be obvious to those of ordinary skill in the art having the benefit of this disclosure.

In one or more embodiments, a user can "train" the electronic device 112 by storing predefined examples of additional authorization to transmit media content as reference files 221 in the memory 218 of the electronic device 112. Continuing the mien example, a user may take a series of pictures. These can include specifically articulated miens. They can include depth looking in different directions. They can include making a sweep with the electronic device 112 such as from top to bottom or left to right about the face. They can also include identifiers of special features such as eye color, sink color, air color, weight, and height. They can include the user standing in front of a particular wall, which is identifiable by the environmental analyzer from images captured by the imager 216. They can include the user raisin a hand or looking in one direction, such as in a profile view. The miens can include raised eyebrows or one eye closed or an open mouth or a finger touching the chin. These are merely examples of items that can be stored in the reference files 221. Each can be designated, using a menu 222 to define one or more user settings 223,224,225, as a predefined mien to be used as additional authorization to transmit media content.

Figure 3:
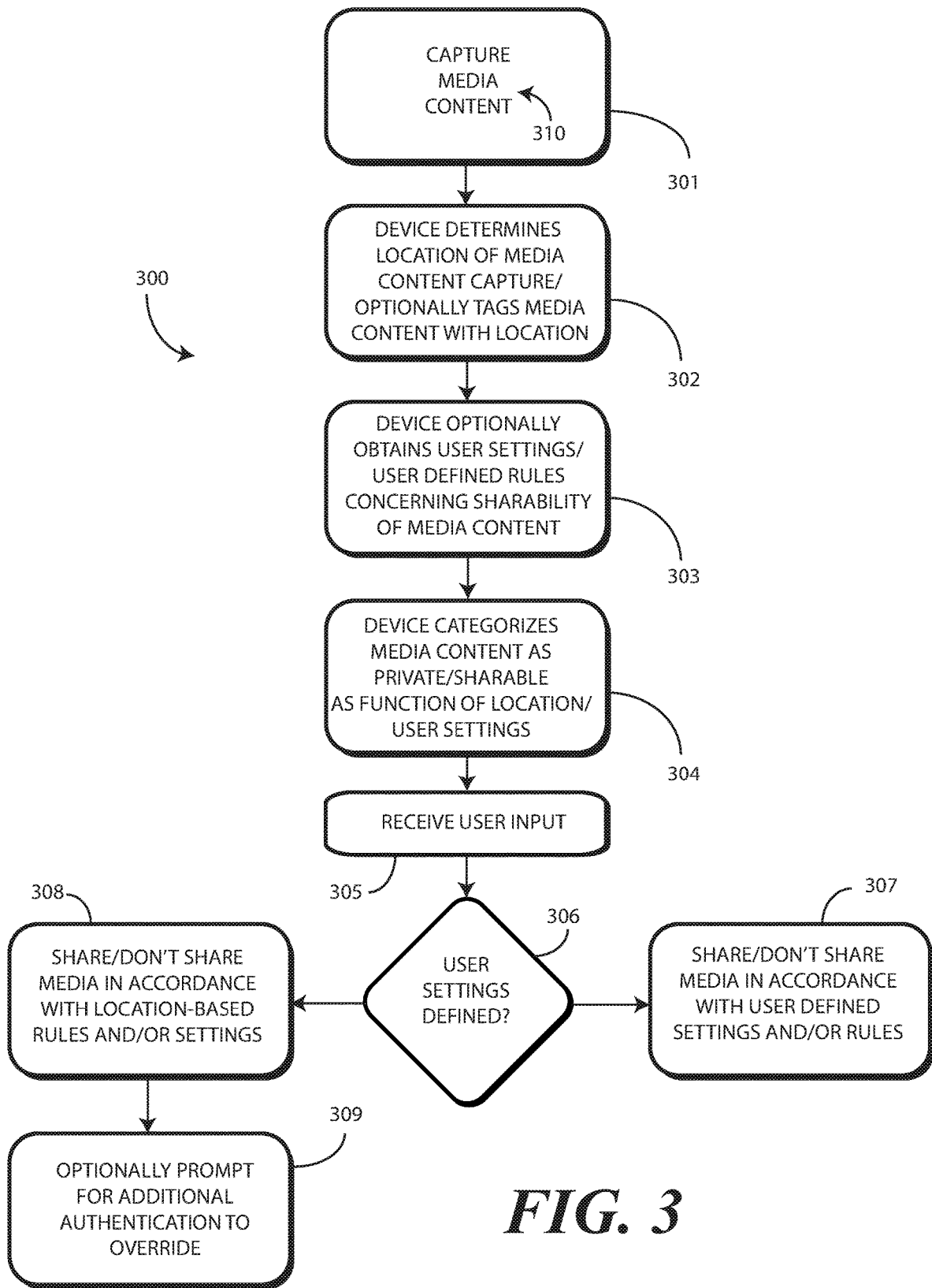
FIG. 3 illustrates one explanatory method in accordance with one or more embodiments of the disclosure.

Turning now to FIG. 3, illustrated therein is one explanatory method 300 for using the electronic device (112) of FIG. 2. Beginning at step 301, one or more sensors (205) of the electronic device (112) capture media content 310 from an environment of the electronic device (112).

At step 302, the location detector (210) of the electronic device determines whether the environment of the electronic device (112) is situated at a location of residence of an authorized user of the electronic device. In one or more embodiments, the location detector (210) does this by assessing the location of the electronic device (112) during the media capture event occurring at step 301. Optionally, step 302 can include the one or more processors (204) or the imager processors system (215) tagging the assessed location occurring during the media content event as well.

At optional step 303, the method 300 can include obtaining user-defined settings (223,224,225) and/or rules, which can be delivered to the one or more processors (204) of the electronic device (112) using a menu (222) or other mechanism for delivering data to the user interface (122) of the electronic device (112). For example, as will be described in more detail below with reference to FIG. 7, in one or more embodiments a person can use the menu (222) to define one or more user settings (223,224,225) to subdivide a residence into one or more predefined portions. The person may define a location of residence as being just a predefined portion of the overall residence. The person may define, for example, a dwelling situated at a residence as being the location of residence where media content captured is presumed to be private. This may mean that media content captured within the home is presumed to be private, while media content captured outside the home is presumed to be non-private, and so forth.

At step 304, the one or more processors (204) categorize the captured media content 310 as being presumed private, and therefore subject to at least temporarily preclusion of transmission, or presumed public, and therefore immediately transmittable by the communication device (202) in response to user input received at the user interface (122) requesting the same, as a function of the location at which the media content was captured and the on or more user settings (223,224,225). In one or more embodiments, step 304 comprises categorizing the media content as being presumed private when the location detector (210) determines that the one or more sensors (205) captured the media content 310 is at the location of residence of the authorized user of the electronic device (112), which may be defined by the one or more user settings (223,224,225).

At step 305, the user interface (122) of the electronic device (112) receives user input requesting transmission of the media content 310 to another electronic device located outside the location of residence of the authorized user of the electronic device (112). Decision 306 determines whether the user settings (223,224,225) have been defined to at least temporarily preclude transmission of the media content 310. Where they have, step 308 comprises applying those user settings (223,224,225) to at least temporarily preclude the transmission. For example, in one or more embodiments the one or more processors (204) preclude transmission of the media content 310 to the other electronic device in response to the user input received at step 305 when the location detector (210) determines that the one or more sensors (205) captured the media content 310 at the location of residence of the authorized user of the electronic device (112).

In other embodiments, the user settings (223,224,225) can define the location of residence with even more granularity. For example, the user settings (223,224,225) may define that the location of residence is a portion of a dwelling situated at the residence of the authorized user of the electronic device (112), such as a portion of the home. The user settings (223,224,225) may define the location of residence to be the upstairs of the home of the authorized user of the electronic device (112), the downstairs of the home, the family room, or other portion of the home.

As previously described, step 309 can comprise the one or more processors (204) causing, in response to the user input received at step 305 when the location detector (210) determines the one or more sensors (205) captured the media content 310 at the location of residence of the authorized user of the electronic device (112), a presentation of a prompt for additional authorization to transmit the media content 310 to the other electronic device. Where the same is received, the one or more processors (204) can override the presumption of privacy and can cease the preclusion of the transmission of the media content 310 to the other electronic device upon receiving the additional authorization to transmit the media content 310 to the other electronic device.

In one or more embodiments, if the location of the electronic device (112) cannot be determined, sharing is precluded by default. This can occur if the media content capture location cannot be determined, the location at which user interface to share the media content (115) cannot be determined, or if the location of the receiving electronic device cannot be determined. As with other embodiments, additional authorization to share the media content can be delivered to cause the transmission thereof in such situations.

By contrast, where no user settings (223,224,225) are defined, or alternatively where the location detector (210) fails to determine that the one or more sensors (205) captured the media content 310 at the location of residence of the authorized user of the electronic device (112), at step 307 the one or more processors (204) can cause the communication device (202) to transmit the media content 310 to the other electronic device without delay.

It should be noted that in one or more embodiments the authorized user of the electronic device (112) can elect, via one or more user settings (223,224,225) in a menu (222), to what types of media content (115) the temporary preclusion of transmission will be applicable. For example, the authorized user may select images, sounds, and videos to fall under temporary preclusion, while text messages are exempt from the preclusion limitation, and so forth.

Using user settings (223,224,225) to define the location of residence is but one technique with which the one or more processors (204) can use such settings in the method 300 of FIG. 3. In another embodiment, the user settings (223,224, 225) can define one or more criteria that must be matched to at least temporarily preclude the transmission of the media content 310. Illustrating by example, in another embodiment the user settings (223,224,225) can define at least one predefined criterion that the media content 310 must match for the at least temporarily preclusion of step 308 to occur. This predefined criterion may be a predefined time of day. For example, the user settings (223,224,225) may define conditions such that media content 310 captured at night is presumed private, while media content 310 captured during the day is presumed public.

Similarly, in other embodiments the user settings (223, 224,225) may identify the media content 310 as being presumed private in a more direct way. Recall from above that the electronic device (112) can include an environmental analyzer (220), face analyzer (219), or combinations thereof. The user settings (223,224,225) may define media content 310 including representations of particular objects, particular people, or particular activities, as determined by these analyzers, to be presumed private, while other objects, people, or activities should be presumed public. For the former, when the user settings (223,224,225) are defined in this manner, as determined at decision 306, the method 300 proceeds to step 308. For the latter, the method 300 proceeds to step 307. In one or more embodiments, the one or more processors (204) determine, using the user settings (223, 224,225) at step 304, whether the media content 310 matches at least one predefined criterion of the user settings (223,224,225). In one or more embodiments, the one or more processors (204) at least temporarily preclude the transmission of the media content 310 in response to the user input received at step 305 only where the media content 310 matches the at least one predefined criterion.

In still other embodiments, the user settings (223,224, 225) can define different types of media content as being presumed public or presumed private. For example, the user settings (223,224,225) may indicate that images, voices, and videos captured by the one or more sensors (205) at the location of residence of the authorized user of the electronic device are presumed to be private, while text messages are presumed public. Accordingly, for the former the method 300 proceeds to step 308. For the latter, the method 300 proceeds to step 307, and so forth.

Thus, as shown and described with reference to FIG. 3, the method 300 allows for a user to define sharing rules using a menu (222) as one or more user settings (223,224, 225), which can pertain to "home captured" media content, and which can also be sub-classified to govern sharing conditions. The method 300 allows certain media content to be classified as being presumed public, i.e., non-private. Where this occurs, the method 300 proceeds to step 307 where the gating block does not apply. When a user attempts to share media content, the sharing action causes the device to check for user settings (223,224,225) at step 303. If the setting indicates media type is publicly shareable, the one or more processors (204) can cause the communication device (202) to share the media content without restriction.

Figure 4:
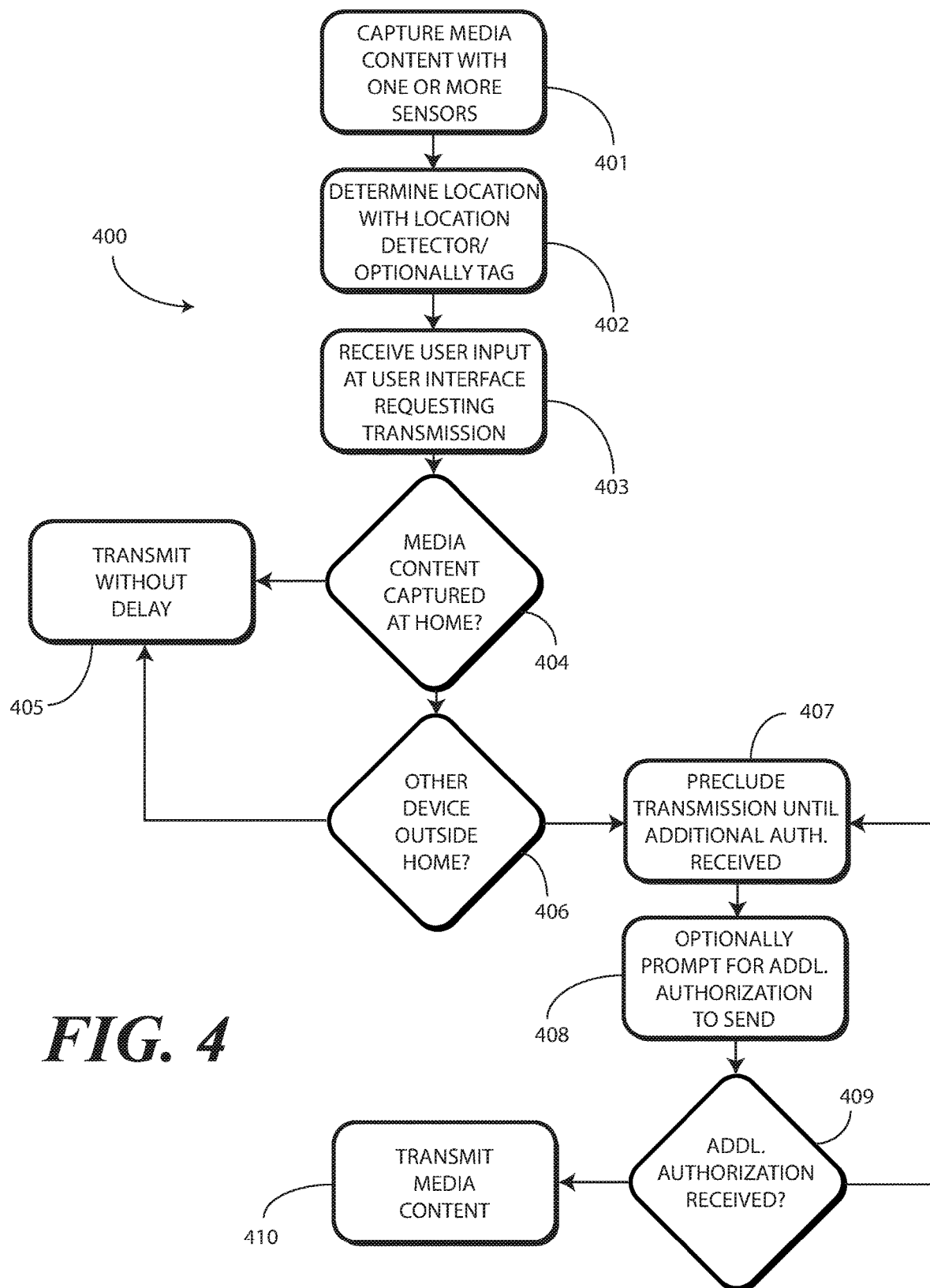
FIG. 4 illustrates another explanatory method in accordance with one or more embodiments of the disclosure.

Turning now to FIG. 4, illustrated therein is another method 400 in accordance with one or more embodiments of the disclosure. Beginning at step 401, one or more sensors of an electronic device capture media content from an environment of the electronic device. At step 402, a location detector determines whether the environment is positioned at a location of residence of an authorized user of the electronic device when the one or more sensors capture the media content.

At step 403, a user interface of the electronic device receives user input requesting transmission of the media content to another electronic device. One or more processors of the electronic device determine, at decision 404, whether the location detector has determined that the environment is positioned within the location of residence of the authorized user. Where it not, i.e., when the environment is positioned other than at the location of residence of the authorized user, step 405 comprises the one or more processors causing, in response to the user input received at step 403, a communication device to transmit the media content to the other electronic device without delay.

However, when the location detector determines that the environment is positioned at the location of residence of the authorized user of the electronic device when the one or more sensors captured the media content, decision 406 determines whether the other electronic device is positioned outside the location of residence of the authorized user of the electronic device. Embodiments of the disclosure contemplate that even though the media content may be presumed private since it is captured at the location of residence of the authorized user, if the other electronic device is also at the location of residence, the owner of that electronic device is already privy to the content represented in the media content. For this reason, the media content is no longer private with reference to that other user. Thus, in one or more embodiments the one or more processors of the electronic device should transmit the media content to the other electronic device in such a situation at step 405.

Decision 406 can occur in a variety of ways. The transmitting electronic device may establish electronic communication with the other electronic device to determine the latter's location. Alternatively, the transmitting electronic device and the receiving electronic device may each be in communication with a cloud server or other device that is able to assess location using the location detector of each electronic device. Other techniques for determining the location of the receiving electronic device will be obvious to those of ordinary skill in the art having the benefit of this disclosure.

Where the receiving electronic device is positioned outside the location of residence of the authorized user of the transmitting electronic device, the owner of the receiving electronic device will not be privy to the content represented in the media content. Accordingly, privacy protection is still in order. Thus, in one or more embodiments step 407 comprises at least temporarily precluding the transmission of the media content to the other electronic device when the location detector determines that the environment is positioned at the location of residence of the authorized user of the electronic device when the one or more sensors capture the media content, and that the receiving electronic device is positioned outside the location of residence of the authorized user of the electronic device. In one or more embodiments, the at least temporary preclusion occurring at step 407 occurs only when the receiving electronic device is positioned outside the location of residence of the electronic device.

As before, step 408 can comprise one or more processors of the electronic device causing, in response to the user input received at step 403, and when the location detector determines that the one or more sensors captured the media content at the location of residence of the authorized user of the electronic device at decision 404, the presentation of a prompt for additional authorization to transmit the media content to the other electronic device. Decision 409 determines whether this additional authorization is received at a user interface of the electronic device.

Where it is not, the at least temporarily precluding continues at step 407. Where it is, step 410 comprises the one or more processors ceasing the at least temporarily precluding of the transmission of the media content to the other electronic device and causing a communication device of the electronic device to transmit the media content to the other electronic device.

Figure 5:
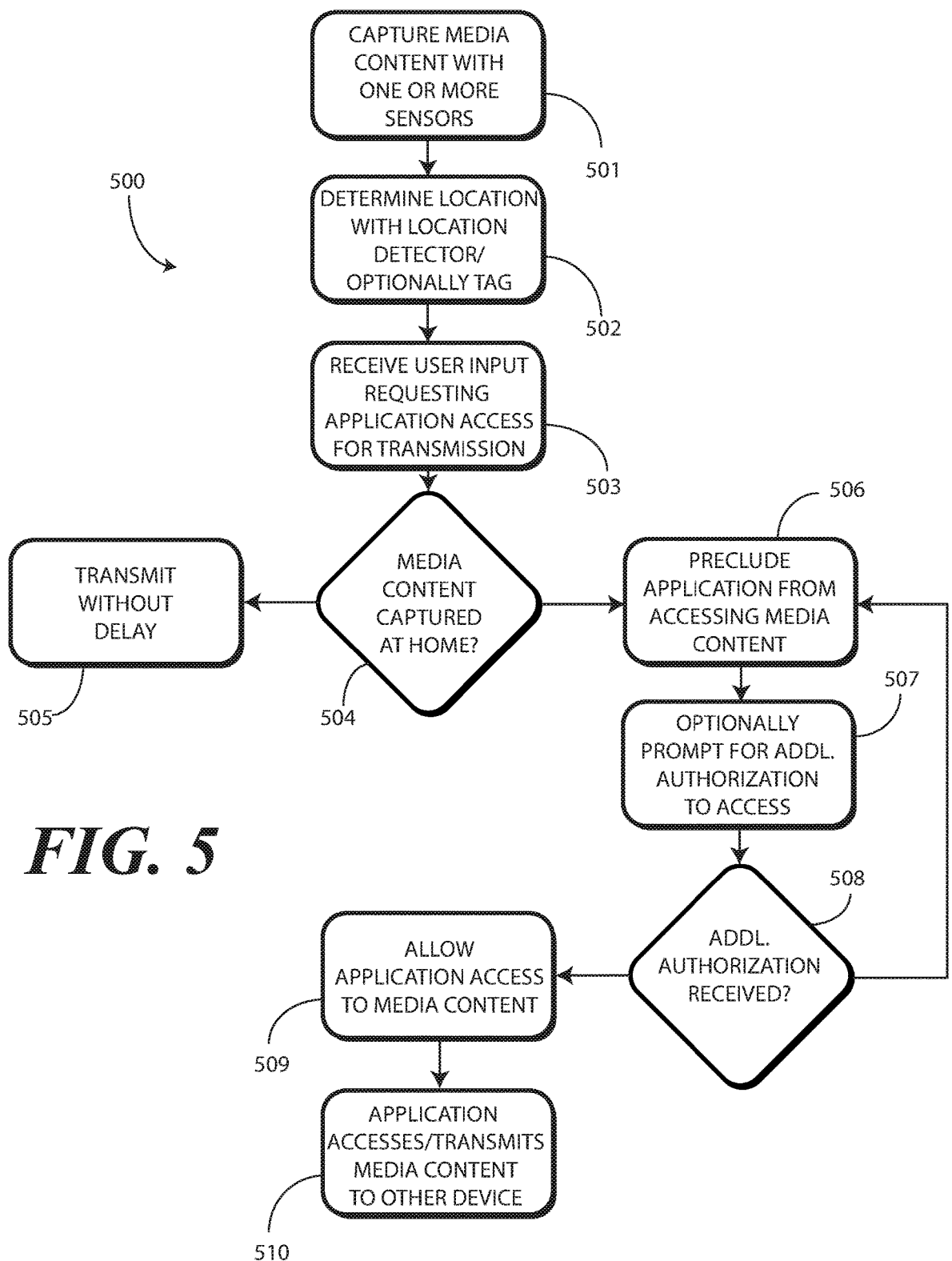
FIG. 5 illustrates another explanatory method in accordance with one or more embodiments of the disclosure.

Turning now to FIG. 5, illustrated therein is yet another method 500 in accordance with one or more embodiments of the disclosure. The method 500 of FIG. 5 begins in a similar manner to the method (400) of FIG. 4. Beginning at step 501, one or more sensors of an electronic device capture media content from an environment of the electronic device. At step 502, a location detector determines whether the environment is positioned at a location of residence of an authorized user of the electronic device when the one or more sensors capture the media content.

At step 503, a user interface of the electronic device receives user input requesting transmission of the media content to another electronic device. In this particular method, the user input requesting the transmission of the media content to the other electronic device comprises a request for a predefined application operating on the one or more processors to cause the transmission of the media content to the other electronic device. For example, the user input received at step 503 may cause an electronic mail application or text application or social media application to launch and attempt to access the media content for transmission to another electronic device, such as an email server, text server, social media server, or other electronic device.

One or more processors of the electronic device determine, at decision 504, whether the location detector has determined that the environment is positioned within the location of residence of the authorized user. Where it is not, i.e., when the environment is positioned other than at the location of residence of the authorized user, step 505 comprises the one or more processors causing, in response to the user input received at step 503, a communication device to transmit the media content to the other electronic device without delay. In one or more embodiments, step 505 accomplishes this by permitting the application launched by the user input received at step 503 to access the media content from a memory of the electronic device for transmission to another electronic device, such as an email server, text server, social media server, or other electronic device.

Where the environment is positioned at the location of residence of the authorized user of the electronic device when the one or more sensors capture the media content, step 506 comprises at least temporarily precluding, with one or more processors of the electronic device in response to the user input received at step 503, the transmission of the media content to the other electronic device. Step 506 is a bit different from previous embodiments in that it is performed in the method 500 of FIG. 5 by at least temporarily precluding the predefined application actuated with the user input received at step 503 from access, selecting, attaching, or otherwise manipulating the media content.

As before, step 507 can comprise one or more processors of the electronic device causing, in response to the user input received at step 503, and when the location detector determines that the one or more sensors captured the media content at the location of residence of the authorized user of the electronic device at decision 504, the presentation of a prompt for additional authorization to transmit the media content to the other electronic device. Decision 508 determines whether this additional authorization is received at a user interface of the electronic device.

Where it is not, the at least temporarily precluding continues at step 506. Where it is, step 509 comprises the one or more processors ceasing the at least temporarily precluding of the transmission of the media content to the other electronic device and causing a communication device of the electronic device to transmit the media content to the other electronic device. In this illustrative embodiment, step 509 comprises permitting the application actuated by the user input received at step 503 to access the media content from a memory of the electronic device for transmission to another electronic device, such as an email server, text server, social media server, or other electronic device. The application then transmits the media content to the other electronic device at step 510.

Figure 6:
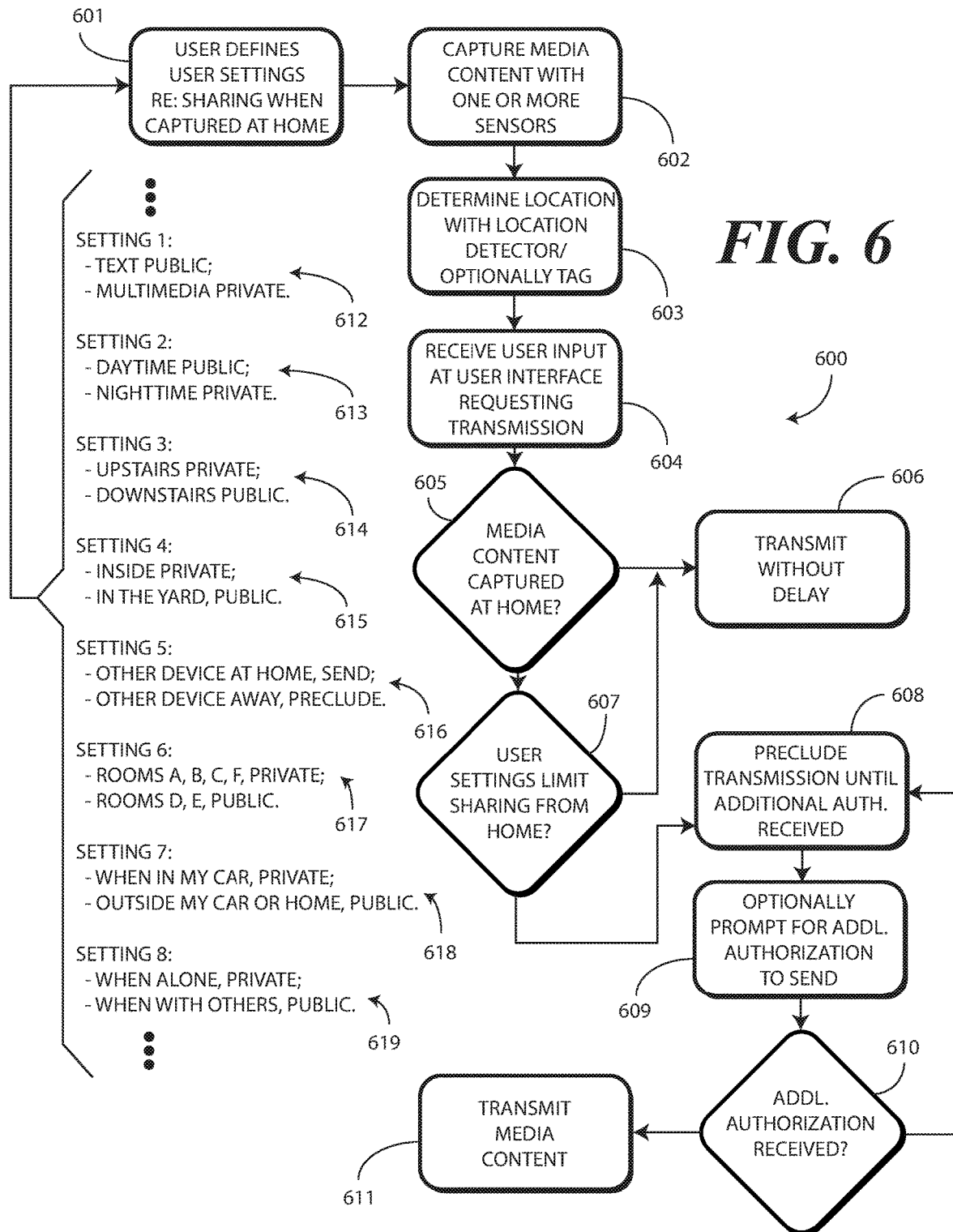
FIG. 6 illustrates yet another explanatory method in accordance with one or more embodiments of the disclosure.

Turning now to FIG. 6, illustrated therein is yet another method 600 configured in accordance with one or more embodiments of the disclosure. As briefly described above with reference to FIGS. 2 and 3, in some embodiments a user can define one or more user settings that limit the transmission of media content when captured at a location of residence of the authorized user are set within a memory of the electronic device. The method 600 of FIG. 6 further explores how these user settings can be employed.

Beginning at step 601, a user defines one or more user settings that limit the transmission of media content when captured at a location of residence in a memory of the electronic device. As described above with reference to FIGS. 2-3, in one or more embodiments this is done using a menu. Other techniques for defining user settings in electronic devices will be obvious to those of ordinary skill in the art having the benefit of this disclosure.

FIG. 6 illustrates several examples of how the user settings can be defined to limit the transmission of media content when captured at a location of residence. Illustrating by example, user setting 612 segregates presumed private and presumed public media content by media content type. In this example, user setting 612 defines text messages as being presumed public, and therefore by default transmittable to other electronic devices without any at least temporary preclusion thereof. By contrast, multimedia messages, which may include sensitive images, sounds, and/or videos of actions, people, objects, or other phenomena occurring at the location of residence may be defined as presumed private by the user settings 612. Thus, user setting 612 identifies the media content as private media content when the media content comprises multimedia content, but identifies the media content as public media content when it is just text, despite the fact that the text was captured at the location of residence of the authorized user of the electronic device.

User setting 613 identifies the media content as private media content or public media content when the one or more sensors capture the media content at a predefined time of day. In this example, when the one or more sensors capture the media during daylight hours, this user setting 613 causes the one or more processors of the electronic device to presume that the media content is public, and therefore by default transmittable to other electronic devices without any at least temporary preclusion thereof. By contrast, media content captured during nighttime hours is defined as presumed private by the user setting 613. This daytime-nighttime dichotomy is illustrative only. In other embodiments, the predefined time of day may be set in other ways, as will be obvious to those of ordinary skill in the art having the benefit of this disclosure.

User setting 614 subdivides a residence of an authorized user of the electronic device into predefined portions to define the location of residence at which there should be some at least temporary preclusion of transmission. In this user setting, a dwelling situated at the residence of the authorized user of the electronic device is subdivided such that media content captured in some portions of the home are presumed private, while media content captured in other portions of the home are presumed public.

In this example, when the one or more sensors capture the media content at a location situated downstairs in the home, this user setting 614 causes the one or more processors of the electronic device to presume that the media content is public, and therefore by default transmittable to other electronic devices without any at least temporary preclusion thereof. By contrast, the user setting 614 defines media content captured upstairs in the home as being presumed private. Since it is private, the one or more processors of the electronic device will at least temporarily preclude transmission, and optionally prompt for additional permission, in response to user input requesting transmission thereof.

This coarse subdivision of the home into upstairs and downstairs is illustrative only. In other embodiments, particular rooms of the home may be defined as being presumed private, as shown at user setting 617. User setting 618 may define images of particular objects in the home as being presumed private, and so forth. Of course, user setting 614 or user setting 617 can be used in combination with user setting 613 to define particular portions of the residence private during certain hours of the day, and so forth. Other combinations of ways in which user setting 613 and user setting 614 or user setting 617 can be used will be obvious to those of ordinary skill in the art having the benefit of this disclosure.

User setting 615 also subdivides the residence of the authorized user into portions. With this user setting, the predefined portion of the residence defining the location of residence where at least temporary preclusion of transmission of media content should occur is that of a dwelling situated at the residence of the authorized user of the electronic device. Accordingly, when the one or more sensors capture the media content outside the dwelling, this user setting 615 causes the one or more processors of the electronic device to presume that the media content is public, and therefore by default transmittable to other electronic devices without any at least temporary preclusion thereof. By contrast, this user setting 615 defines media content captured inside the dwelling as presumed private. Accordingly, when the user attempts to transmit any media content captured within the dwelling to another electronic device, the one or more processors of the electronic device will at least temporarily preclude this transmission, optionally prompting for additional authorization to transmit the media content once the authorized user has had an opportunity to confirm this desire.

User setting 616 defines presumed private and presumed public media content in a similar fashion to that described above with reference to FIG. 4 where the at least temporarily precluding transmission of the media content to the other electronic device occurs only when the other electronic device is situated somewhere other than the location of residence of the authorized user of the electronic device transmitting the media content. In this example, when the receiving electronic device is situated within the location of residence of the authorized user of the transmitting electronic device, this user setting 616 causes the one or more processors of the electronic device to transmit the media content without any preclusion thereof. By contrast, when the receiving electronic device is situated other than at the location of residence of the authorized user of the transmitting electronic device, the one or more processors will at least temporarily preclude the transmission, optionally prompting for additional authorization to transmit the media content while the precluding is occurring.

User setting 618 limits transmission of the media content not only when captured at the location of residence of the authorized user of the electronic device, but also within a vehicle belonging to the authorized user of the electronic device. Embodiments of the disclosure contemplate that a personal vehicle, as opposed to a public vehicle, commercial vehicle, e.g., cab or bus, or ride-share vehicle is another environment that a person may consider to be quite private. For some people, being inside their personal vehicle feels as private as their home due to the fact that it is a confined, enclosed space, and requires a specific key to enter. Accordingly, in one or more embodiments, user setting 618 adds the personal vehicle belonging to the authorized user of the electronic device to location of residence as being an area where at least temporary preclusion of the transmission of media content should occur when the media content is captured in the vehicle. By contrast, media content captured either outside the vehicle or the location of residence can be transmitted without delay in response to user input requesting the transmission of the same.

User setting 619 limits transmission of the media content when the media content includes a depiction of only a single person. In one or more embodiments, if the media content comprises a depiction or sound of a single person, it is presumed private. By contrast, if the media content comprises depictions or sounds of a plurality of persons, it is presumed public. The user settings shown in FIG. 6 are illustrative only and are used to demonstrate the myriad of ways in which embodiments of the disclosure can determine whether a user setting in a memory of the electronic device identifies the media content as private media content. Numerous others will be obvious to those of ordinary skill in the art having the benefit of this disclosure.

At step 602, one or more sensors of the electronic device capture the media content. At step 603, the location detector of the electronic device determines the location at which the one or more sensors captured the media content at step 602. At step 604, the user interface of the electronic device receives user input requesting the transmission of the media content captured at step 602 to another electronic device.

One or more processors of the electronic device determine, at decision 605, whether the location detector has determined that the environment is positioned within the location of residence of the authorized user. Where it is not, i.e., when the environment is positioned other than at the location of residence of the authorized user, step 606 comprises the one or more processors causing, in response to the user input received at step 604, a communication device to transmit the media content to the other electronic device without delay.

Where the environment is positioned at the location of residence of the authorized user of the electronic device when the one or more sensors capture the media content, decision 607 determines, by one or more processors of the electronic device, whether there is a user setting limiting transmission of the media content when captured at the location of residence of the authorized user of the electronic device set in the memory of the electronic device. Where there is none, in one or more embodiments step 606 comprises the one or more processors causing, in response to the user input received at step 604, a communication device to transmit the media content to the other electronic device without delay.

However, where there is a user setting limiting transmission of the media content set in the memory of the electronic device, which could be any of the user settings shown in FIG. 6 or other user settings, the one or more processors at least temporarily preclude transmission of the media content to the other electronic device at step 608. In one or more embodiments, step 608 comprises at least temporarily precluding the transmission of the media content to the other electronic device only when the user setting limiting the transmission of the media content when captured at the location of residence is set in the memory of the electronic device. If, for example, user setting 615 is used, the at least temporary precluding of step 608 would occur only when the user setting 615 identifies the media content as private media content, which would occur if the media content was captured inside the house. However, if captured in the yard, the method 600 would allow for transmission of this media content at step 606 despite the fact that it was captured at a portion of a residence belonging to the authorized user of the electronic device.

As before, step 609 can comprise one or more processors of the electronic device causing, in response to the user input received at step 604, the presentation of a prompt for additional authorization to transmit the media content to the other electronic device. Decision 610 determines whether this additional authorization is received at a user interface of the electronic device.

Where it is not, the at least temporarily precluding continues at step 608. Where it is, step 611 comprises the one or more processors ceasing the at least temporarily precluding of the transmission of the media content to the other electronic device and causing a communication device of the electronic device to transmit the media content to the other electronic device.

As demonstrated, the method 600 of FIG. 6 allows the definition of one or more user settings at step 601 to define the limitations on transmission of media content, as well as when media content should be at least temporarily precluded from being transmitted. Using these user settings, a further sub-classification can be enabled as to the exact location within a residence, vehicle, or dwelling where the media is captured. The user settings can cause media content captured at locations such as a second floor, bedroom, bathroom, etc., to be presumed private. In addition to using the location detector and sensors such as barometers, such location determinations can be triggered by artificial intelligence contextual detection that builds such location profiles within the residence or home. The user settings defined at step 601 can also limit transmission of media content as a function of portions of a residence, such as being within the home versus right outside home, e.g., in the yard. The user settings can also sub-classify media capture as a function of the time of capture, e.g., day or night, and so forth. As noted, vehicles are also environments that user could consider very private. For some, it is as private as home since it is confined, enclosed, and requires a user key to enter.

Figure 7:
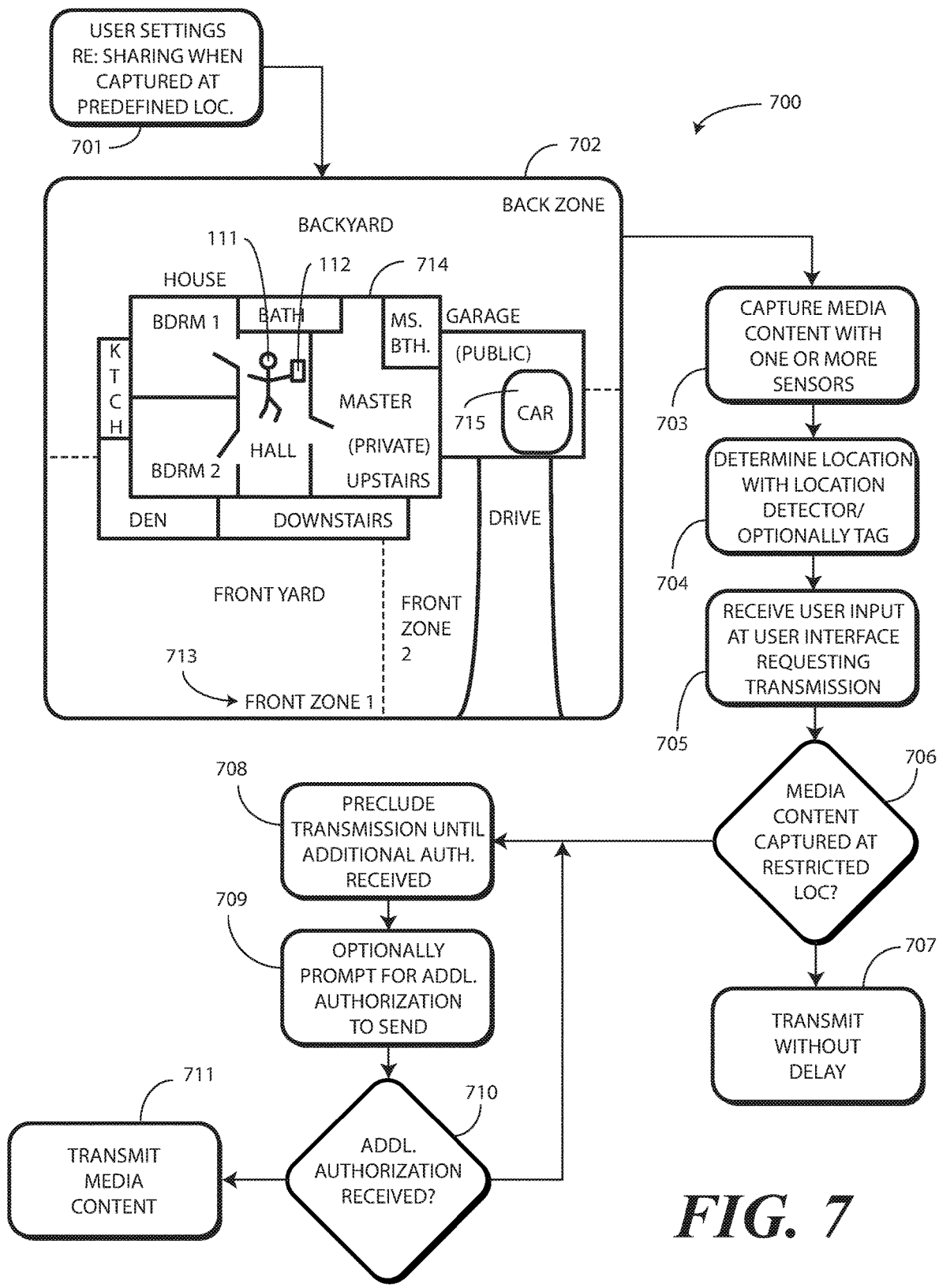
FIG. 7 illustrates still another explanatory method in accordance with one or more embodiments of the disclosure.

Turning now to FIG. 7, illustrated therein is yet another method 700 illustrating how some of these user settings can be used in more detail. Beginning at step 701, a user can define one or more user settings that limit the transmission of media content when captured at a location of residence in a memory of the electronic device. Many examples of these user settings were described above with reference to FIG. 6.

In the method 700 of FIG. 7, as shown at step 702, these user settings subdivide a residence 712 of an authorized user 111 of an electronic device 112 into one or more portions. Specifically, the authorized user 111 has defined the location of residence from which captured media content should be at least temporarily precluded from transmission as one or more predefined portions of the residence 712. When media content is captured in one of the predefined portions, temporary preclusion of the transmission of the content should be precluded. By contrast, when media content is captured in portions of the residence 712 other than the predefined portions, the media content can be transmitted without delay.

In this example, the authorized user 111 has defined a dwelling 714 situated at the residence 712 of the authorized user 111 and the vehicle 715 belonging to the authorized user 111 as being predefined portions where media content captured in these predefined portions should be presumed private. By contrast, media content captured at portions other than these predefined portions, e.g., front yard portion 713, can be considered to be public.

At step 703, one or more sensors of the electronic device capture media content from the environment of the electronic device. At step 704, a location detector or one or more other sensors of the electronic device determine whether the environment is positioned within one of these predefined portions where the media content should be presumed private. Presume, for example, that the media content is captured in the vehicle 715 belonging to the authorized user 111 of the electronic device 112. Where this is the case, one or more sensors of the electronic device determine, at step 704, whether the environment is positioned within the vehicle 715 owned by the authorized user 111 of the electronic device 112 when the one or more sensors capture the media content. This could be determined, for example, by exchanging electronic communications between the electronic device 112 and the vehicle 715 to determine the vehicle identification number (VIN) or other information confirming that the vehicle 715 belongs to the authorized user 111, and is not a public, ride-share, commercial, or other type of vehicle that does not belong to the authorized user 111.

At step 705, a user interface of the electronic device receives user input requesting transmission of the media content to another electronic device situated outside the vehicle 715 owned by the authorized user 111 of the electronic device 112. Decision 706 then determines whether the environment in which the media content is captured is positioned within the vehicle 715 owned by the authorized user 111 of the electronic device 112. Where it is, i.e., where the environment is positioned within the vehicle 715 owned by the authorized user 111 of the electronic device 112 when the one or more sensors capture the media content, step 708 comprises at least temporarily precluding, with the one or more processors of the electronic device 112 in response to the user input received at step 705, the transmission of the media content to the other electronic device. By contrast, if the media content had been captured in another portion, such as front yard portion 713, it could be transmitted without delay at step 707.

As before, step 709 can comprise one or more processors of the electronic device causing, in response to the user input received at step 705, the presentation of a prompt for additional authorization to transmit the media content to the other electronic device. Decision 710 determines whether this additional authorization is received at a user interface of the electronic device.

Where it is not, the at least temporarily precluding continues at step 708. Where it is, step 711 comprises the one or more processors ceasing the at least temporarily precluding of the transmission of the media content to the other electronic device and causing a communication device of the electronic device to transmit the media content to the other electronic device.

Figure 8:
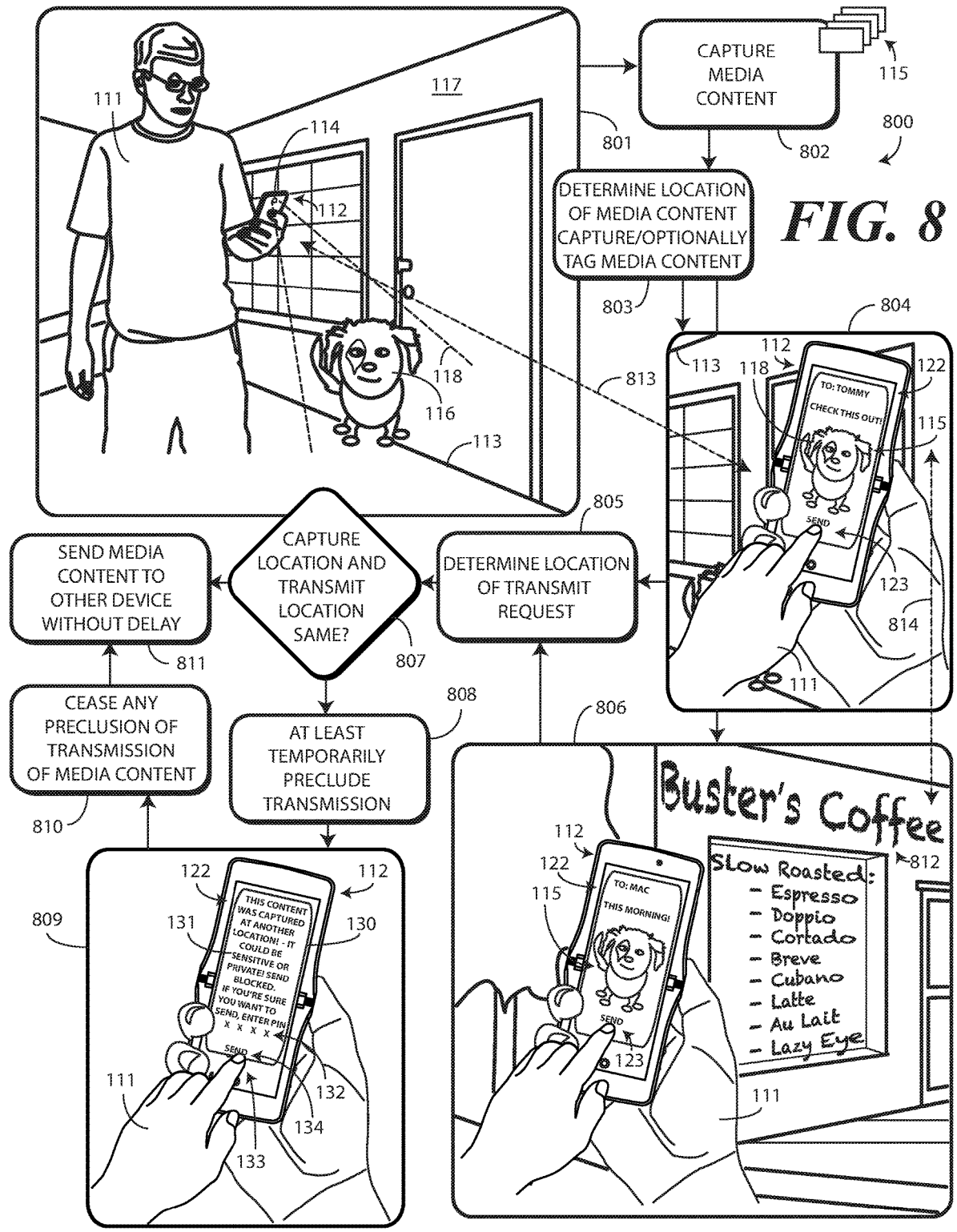
FIG. 8 illustrates another explanatory method in accordance with one or more embodiments of the disclosure.

Turning now to FIG. 8, illustrated therein is another method 800 in accordance with one or more embodiments of the disclosure. To this point, the methods described above, e.g., the method (100) of FIG. 1, have been directed to at least temporarily precluding the transmission of media content when that media content is captured at a location of residence of an authorized user of an electronic device, with the presumption being that the home is a private place and media content captured in the home is presumed to be private as well. The method 800 of FIG. 8 is a bit different. While the method 800 includes at least temporarily precluding the transmission of media content as a function of one or more factors, in this method 800 one or more processors of the electronic device at least temporarily preclude transmission of the media content if the location at which the media content is captured and the location at which user input is received by the user interface of the electronic device do not substantially match.

The method 800 of FIG. 8 functions to elevate personal security and privacy pertaining to media content captured a particular location from being transmitted from the electronic device when the electronic device is positioned another location that is substantially different without receiving additional authorization to transmit the media content in the default mode. Advantageously, the method 800 functions to improve data sharing privacy by allowing media content to be shared by transmission from the electronic device if the electronic device is in substantially the same location as where the media content was captured, which may be within a predefined radius of a certain number of feet, yards, or meters.

Illustrating by example, if an authorized user of an electronic device captures media content while at a work location, and then delivers user input requesting transmission of the media content to another electronic device while the authorized user is still at work, in one or more embodiments one or more processors of the electronic device cause a communication device to transmit the media content without delay since the substantial match of media content capture location and sharing location confirm intent and relevance. However, when the authorized user of the electronic device attempts to share media content captured at a substantially different location, such as a shop or restaurant, while at work, in one or more embodiments transmission of the media content is at least temporarily precluded until additional authorization to transmit the media content is received.

Illustrating by way of another example, if the authorized user captures an image while eating in a restaurant and delivers user input to the user interface of the electronic device requesting transmission of the media content to a social media server while the authorized user is still at the restaurant, the one or more processors of the electronic device cause the media content to be transmitted without delay. However, if the authorized user attempts to transmit the media content to the social media server after leaving the restaurant, the location detector of the electronic device will detect that the location of media content capture and the location of sharing are beyond a predefined radius, such as 1000 yards for example, and are thus substantially different locations. Accordingly, in one or more embodiments the one or more processors will at least temporarily preclude the transmission of the media content to the social media server until additional authorization to transmit is received at the user interface of the electronic device.

It should be noted, and will be described in more detail below with reference to FIG. 9, that the method 800 of FIG. 8 and the method (100) of FIG. 1 can be combined together such that media content captured at the location of residence of the authorized user of the electronic device is treated in accordance with the method (100) of FIG. 1, while media content captured outside the location of residence of the authorized user of the electronic device is treated in accordance with the method 800 of FIG. 8. Additionally, in still other embodiments, media content captured at a known location, e.g., a known work location, a frequently patronized restaurant, frequently visited beach, or frequently traveled road, could be by default sharable with other electronic devices if these other electronic devices are situated at the same location as the sharing device at the time of sharing. It should be noted that the predefined radius defining whether two locations are substantially the same or substantially different could be user definable using a menu of the electronic device.

In an alternate embodiment, prior engagement history can be used to omit any at least temporarily preclusion of transmission of media content to a receiving electronic device. For example, where two devices were previously solidly linked and/or paired by location, there is no restriction of sharing amongst each other in the future when each is situated at a new location. Instead, one or more processors of the transmitting device omit the at least temporarily precluding the transmission of the media content and instead cause, in response to the user input, a communication device to transmit the media content to the previously paired, receiving electronic device, despite the fact that it is situated at a new location.

Beginning at step 801, an authorized user 111 is again shown holding an electronic device 112 configured in accordance with one or more embodiments of the disclosure. The authorized user 111 is situated at his location of residence 113, which in this example is a dwelling (his house) situated at a residence belonging to the authorized user 111.

At step 802, one or more sensors 114 of the electronic device 112, which in this example comprise an image capture device, are capturing media content 115 from an environment 117 of the electronic device 112. In this example, the environment 117 comprises the interior of the house, and the media content 115 comprises images 118 of the authorized user's dog 116 that are captured by the image capture device. While captured images 118 are one example of media content 115 that one or more sensors of the electronic device 112 can capture, the media content 115 can take other forms as well, just as was the case with the method (100) of FIG. 1. For example, the media content 115 can comprise captured video (119), captured audio (120), captured screenshots (121), which can be captured text or multimedia messages, captured emails, captured websites, other media content, and/or combinations thereof. Other examples of media content 115 that can be captured by one or more sensors of the electronic device 112 will be obvious to those of ordinary skill in the art having the benefit of this disclosure.

At step 803, a location detector (210) of the electronic device 112 identifies a location of the electronic device 112 that is occurring when the one or more sensors 114 capture the media content 115. In this example, the environment 117 is positioned at a location of residence 113 of the authorized user 111, as the environment 117 is situated within the authorized user's house.

At step 804, a user interface 122, shown illustratively as a touch-sensitive display in this example, is receiving user input 123 requesting transmission of the media content 115 to another electronic device. In this example, the user input 123 is requesting transmission of the media content 115 to another electronic device, which may be in communication with the electronic device 112 across a network. Here, the authorized user 111 delivers the user input 123 to the user interface 122 requesting that the image 118 be transmitted to another electronic device belonging to Buster.

As before, it should be noted that the other electronic device could be any of a number of electronic devices. For example, in one embodiment, the other electronic device comprises a portable electronic device such as a smartphone or tablet computer belonging to another person. For example, the other electronic device could be another smartphone belonging to Buster, who is the intended recipient of the image 118 in this example. In another embodiment, the other electronic device could be a desktop, laptop, tablet, or rack-mount computer. In still other embodiments, the other electronic device is a server, such as a cloud server, personal server, web server, social media server, commercial server, private server, institutional server, academic server, non-profit server, or other type of server configured to receive media content 115 from electronic devices across the network. For example, rather than sending a multimedia message to a smartphone belonging to Buster, as shown at step 804, in another embodiment the authorized user 111 may want to share the image 118 with Buster by posting the image 118 with a server operated by a social media service while tagging Buster in the image. Other examples of electronic devices to which media content 115 may be transmitted in accordance with embodiments of the disclosure will be obvious to those of ordinary skill in the art having the benefit of this disclosure.

Step 806 then shows the authorized user 111 performing the same task as at step 804, namely, delivering user input 123 to a user interface 122 of the electronic device 112 requesting transmission of the media content 115 to another electronic device. Step 806 is included to illustrate how the method 800 treats the delivery of the user input 123 at a first location, such as the location of residence 113 shown at step 804, differently than the delivery of the same user input 123 at a second location, which is a coffee shop 812 at step 806. Step 806 could be occurring at a different time than step 804, on a different day than step 804, and so forth. It should be noted that step 804 and step 806 are not intended to suggest that the authorized user 111 is in two different locations simultaneously, thereby defying the well-established laws of physics.

At step 805, the location detector (210) of the electronic device 112 identifies the location at which the user input 123 is received by the user interface 122 requesting transmission of the media content 115. Making the determination from the location of step 804, the location detector (210) would identify that the location where the media content was captured at step 802, namely the location of residence 113 of the authorized user 111 of the electronic device 112, is substantially the same location as where the user input 123 of step 804 is received due to the fact that the location of capture (step 801) and the location of receiving the user input 123 (step 804) are within a predefined radius 813 of each other. As noted above, this predefined radius 813 could be a predefined number of feet, a predefined number of yards, a predefined number of meters, and so forth. In one or more embodiments, the predefined radius 813 is 100 yards. In another embodiment, the predefined radius 813 is 500 yards. In still another embodiment, the predefined radius 813 is 1000 yards. Other examples of the predefined radius 813 will be obvious to those of ordinary skill in the art having the benefit of this disclosure. In one or more embodiments, the predefined radius 813 can be user defined using a menu (222) or other user settings (223,224,225) of the electronic device 112.

Making the determination from the location of step 806, the location detector (210) would identify that the location where the media content was captured at step 802, namely the location of residence 113 of the authorized user 111 of the electronic device 112, is a substantially different location from where the user input 123 of step 804 is received due to the fact that the location of capture (step 801) and the location of receiving the user input 123 (step 806) are beyond a predefined radius 814 from each other. This predefined radius 814 could also be a predefined number of feet, a predefined number of yards, a predefined number of meters, and so forth. In one or more embodiments, the predefined radius 814 is 100 yards. In another embodiment, the predefined radius 814 is 500 yards. In still another embodiment, the predefined radius 814 is 1000 yards. Other examples of the predefined radius 814 will be obvious to those of ordinary skill in the art having the benefit of this disclosure. In one or more embodiments, the predefined radius 814 can be user defined using a menu (222) or other user settings (223,224,225) of the electronic device 112.

The method 800 of FIG. 8 treats situations in which the media content 115 is captured and shared from a substantially similar location and those in which the media content 115 is captured from substantially different locations differently. Specifically, decision 807 determines whether the first location, i.e., the location where the media content 115 is captured, is substantially the same as, or substantially different from, the second location, i.e., the location where user input 123 is received by the user interface 122 requesting to share the media content 115 by transmitting the media content 115 to another electronic device.

Using the user input 123 received at step 804 as an example, this would result in decision 807 determining that the first location of the electronic device 112 occurring when the one or more sensors 114 capture the media content 115 and the second location of the electronic device 112 occurring when the user input 123 is received are substantially similar locations due to the fact that they are within the predefined radius 813 of each other. Accordingly, in one or more embodiments the one or more processors (204) of the electronic device 112 would, at step 811, omit any at least temporary preclusion of transmission of the media content 115 to the other electronic device. Instead, the one or more processors (204) would cause the communication device to transmit the media content 115 to the other electronic device without delay. In one or more embodiments, this causing of the communication device to transmit the media content to the another electronic device without delay at step 811 occurs only when the other electronic device is situated within a predefined radius 813 of the first location at which the media content 115 was captured.

By contrast, using the user input 123 received at step 806, this would result in decision 807 determining that the first location of the electronic device 112 occurring when the one or more sensors 114 capture the media content 115 and the second location of the electronic device 112 occurring when the user input 123 is received are substantially different locations due to the fact that they are beyond the predefined radius 814 from each other. Accordingly, the one or more processors (204) of the electronic device 112 would, at step 808, at least temporarily preclude the transmission of the media content 115 to the other electronic device in response to the user input 123 received at step 806.

As before, in one or more embodiments the at least temporarily precluding occurring at step 808 can continue until additional authorization to transmit the media content 115 is received from the authorized user 111. For instance, in this example the one or more processors of the electronic device 112 prompt 130, at step 809, for additional authorization to transmit the media content 115 to the other electronic device. In one or more embodiments, this prompting 130 occurs while the one or more processors of the electronic device 112 are at least temporarily precluding the transmission of the media content 115 to the other electronic device in response to the user input 123 received at step 806 requesting transmission of the same.

In this example, the one or more processors of the electronic device 112 prompt 130 for additional authorization to transmit the media content 115 to the other electronic device by presenting a message 131 on the user interface 122 of the electronic device 112. In this example, the message 131 of the prompt 130 alerts the authorized user 111 to the fact that the transmission of the media content 115 has been at least temporarily precluded. The message 131 of the prompt 130 also indicates, in this illustrative embodiment, that the location where the media content 115 was captured and the location where the user input 123 requesting transmission of the media content 115 are substantially different locations. This illustrative message states, "The content was captured at another location. It could be sensitive or private—Send Blocked—Are you sure you want to send?—If you're sure you want to send, enter PIN:"

In this illustrative embodiment, the message 131 requests additional authorization in the form of a PIN. As before, the PIN is merely one form of additional authorization that can be used in accordance with embodiments of the disclosure. Other examples of additional authorization comprise entry of a password, expression of a predefined mien, a simple actuation of a user actuation target, performance of a gesture on, or near, the user interface 122 of the electronic device 112, making a gesture translating the electronic device 112 in three-dimensional space, voice command, or some other manipulation of the electronic device 112 in response to the prompt 130. Other examples of additional authorization will be obvious to those of ordinary skill in the art having the benefit of this disclosure.

Since the authorized user 111 is indeed sure he wants to transmit the media content 115, at step 809 the authorized user 111 delivers the additional authorization 132 to the user interface 122 in the form of additional user input 133 at step 809. The one or more processors of the electronic device 112 thus receive, at step 809, the additional authorization 132 to transmit the media content 115 to the other electronic device. In one or more embodiments, this receipt of the additional authorization 132 occurs while the one or more processors of the electronic device 112 at least temporarily preclude the transmission of the media content 115 to the other electronic device. The authorized user 111 may also actuate a user actuation target 134, shown here as a "send" icon presented on the touch-sensitive display of the electronic device 112, causing the additional authorization 132 to be delivered to the one or more processors of the electronic device 112.

In one or more embodiments, step 810 then comprises the one or more processors of the electronic device 112 ceasing, in response to receiving the additional authorization 132 to transmit the media content 115 to the other electronic device at step 809, the at least temporarily precluding the transmission of the media content 115 to the other electronic device. Step 811 then comprises the one or more processors of the electronic device 112 causing, in response to the ceasing at step 810, a communication device of the electronic device 112 to transmit the media content 115 to the other electronic device.

Figure 9:
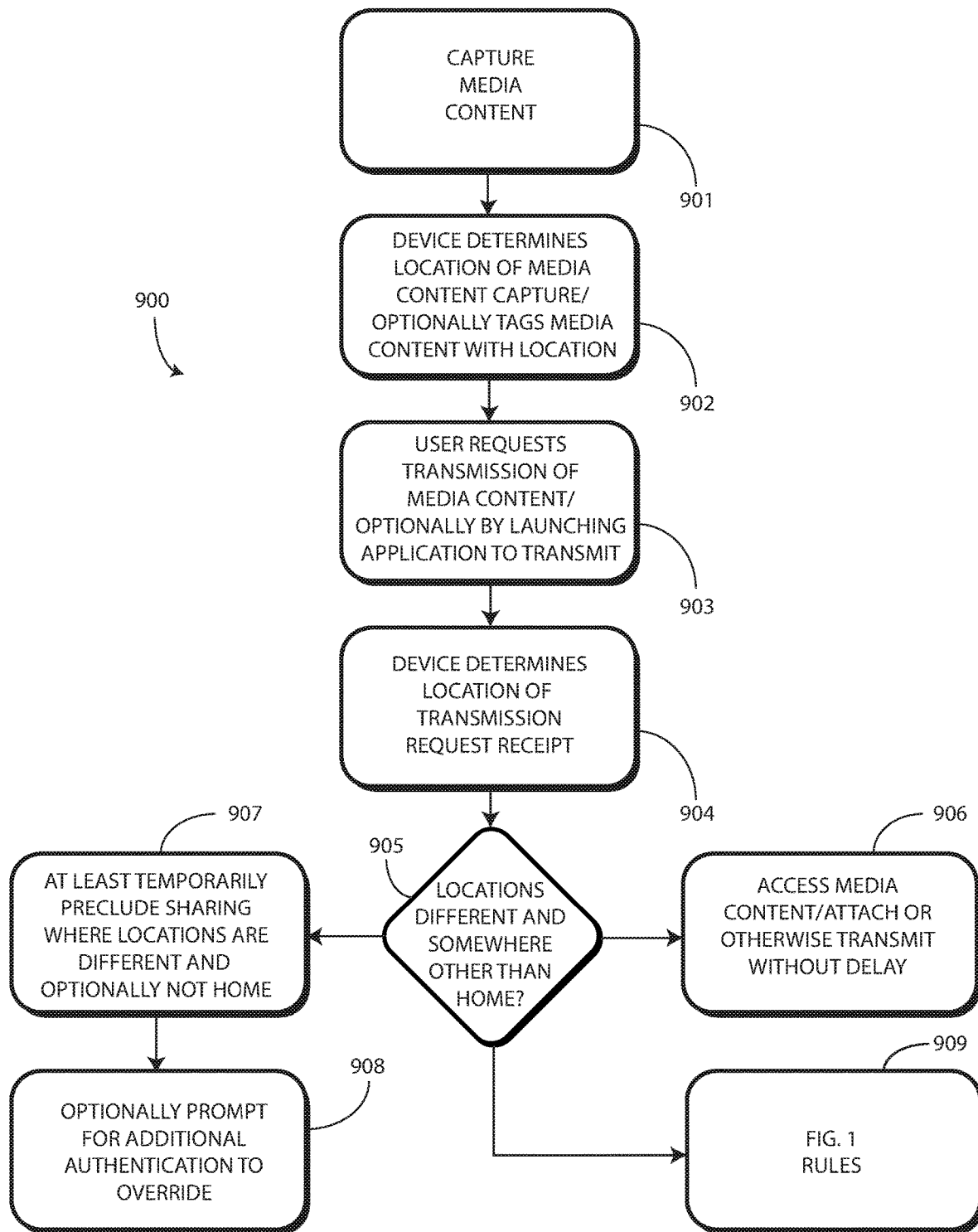
FIG. 9 illustrates yet another explanatory method in accordance with one or more embodiments of the disclosure.

Turning now to FIG. 9, illustrated therein is another method 900 of using an electronic device (112), such as that described above with reference to FIG. 2, in accordance with embodiments of the disclosure. The method 900 of FIG. 9 works in a similar fashion to the method (800) of FIG. 8, but incorporates the method (100) of FIG. 1 that treats the location of residence of the authorized user of the electronic device as a special case since the home is considered a truly personal place and can have its own set of rules defined by the method (100) of FIG. 1, as described above.

Beginning at step 901, one or more sensors (205) of the electronic device (112) capture media content (115) while the electronic device (112) is situated at a particular location during the media content capture, which can be referred to as a "media capture location." At step 902, a location detector (210) of the electronic device (112) determines where the media capture location is positioned, and optionally tags this media capture location to the media content (115).

At step 903, a user interface (122) of the electronic device (112) receives user input (123) requesting transmission of the media content (115) to another electronic device while the electronic device 112 is situated at a particular location during the user input (123), which can be referred to as a "user input reception location." At step 904, the location detector (210) determines where the user input reception location is positioned.

Decision 905 then determines two things: First, it determines whether the whether the media content capture location is situated at a location of residence of the authorized user of the electronic device (112). Where it is, the one or more processors (204) of the electronic device (112) use the rules of FIG. 1 at step 909. For example, the one or more processors (204) of the electronic device (112) may at least temporarily preclude the transmission of the media content (115) to the other electronic device when the location detector (210) determines that the media content capture location is situated at the location of residence of the authorized user of the electronic device.

These FIG. 1 rules can be applied even if the media content capture location and the user input reception location are substantially similar locations. For instance, when the first location occurring where the media content (115) is captured is positioned at a location of residence of an authorized user of the electronic device (112), and this location and a second location at which the user input (123) requesting transmission of the media content (115) is received are substantially similar locations, in one or more embodiments the method 900 moves to step 909 and also at least temporarily precludes, with the one or more processors (204) in response to the user input (123), the transmission of the media content (115) to the other electronic device due to the fact that the home is considered a truly personal place requiring its own set of rules.

Alternatively, when the media capture location is other than the location of residence of the authorized user of the electronic device (112), decision 905 can determine whether the media content capture location and the user input reception location are substantially similar locations or substantially different locations. In one or more embodiments, step 906 comprises the one or more processors (204) causing, in response to the user input (123) received at step 903, the communication device (202) of the electronic device (112) to transmit the media content (115) to the other electronic device when the location detector (210) determines that the media content capture location and the user input reception location are substantially similar locations.

The location of the receiving electronic device is referred to as the "other electronic device location." In one or more embodiments, step 906 comprises the one or more processors (204) causing the communication device (202) to transmit the media content (115) to the other electronic device only when the media content capture location and the other electronic device location are substantially similar locations.

By contrast, step 907 comprises the one or more processors (204) at least temporarily precluding, in response to the user input received at step 903, the transmission of the media content (115) to the other electronic device when the location detector (210) determines that the media content capture location and the user input reception location are substantially different locations. Step 908 can comprise the one or more processors (204) causing, in response to the user input received at step 903 when the location detector (210) determines that the media content capture location and the user input reception location are substantially different locations, presentation of a prompt for additional authorization to transmit the media content (115) to the other electronic device. Step 908 can further comprise ceasing the precluding of the transmission of the media content (115) to the other electronic device upon receiving the additional authorization to transmit the media content (115) to the other electronic device, as was the case with the method (300) of FIG. 3 above.

Figure 10:
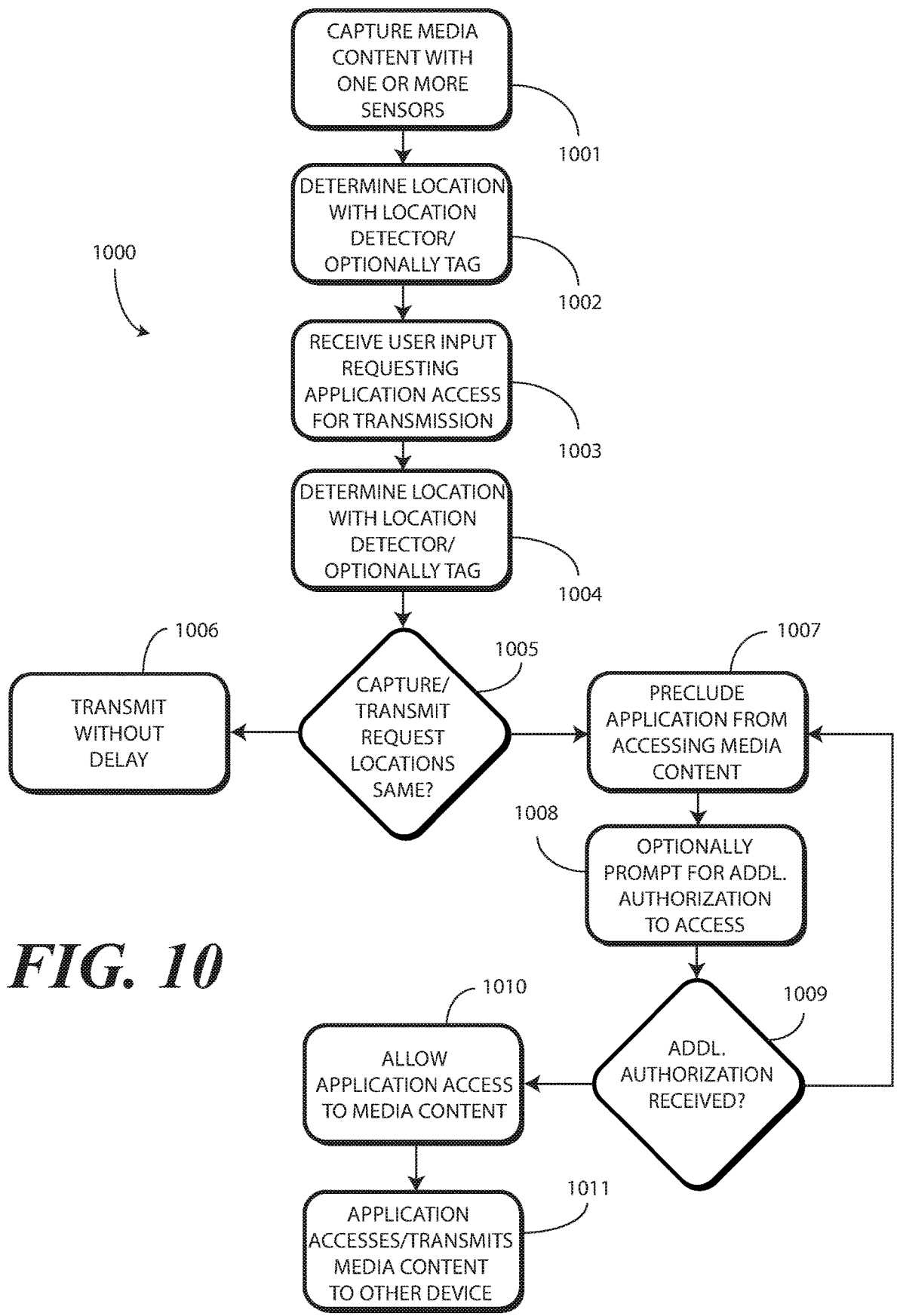
FIG. 10 illustrates still another explanatory method in accordance with one or more embodiments of the disclosure.

Turning now to FIG. 10, illustrated therein is still another method 1000 in accordance with one or more embodiments of the disclosure. Beginning at step 1001, one or more sensors of an electronic device capture media content. At step 1002, a location detector of the electronic device identifies a first location of the electronic device occurring when the one or more sensors capture the media content.

At step 1003, a user interface of the electronic device receives user input requesting transmission of the media content to another electronic device. At step 1004, the location detector of the electronic device identifies a second location occurring when the user input is received.

Decision 1005 determines whether the first location and the second location are substantially similar locations or substantially different locations. In one or more embodiments, this comprises determining whether the first location and the second location location are within, or beyond, a predefined radius such as 500 meters. In one or more embodiments, the predefined radius is user-definable using a menu of the electronic device.

At step 1006, one or more processors of the electronic device cause a communication device, in response to the user input received at step 1003, to transmit the media content to the other electronic device without delay when decision 1005 determines that the first location and the second location are substantially similar locations. In one or more embodiments, step 1006 comprises the one or more processors causing the communication device to transmit the media content to the other electronic device only when the first location and the location of the other electronic device are substantially similar locations.

By contrast, at step 1007 the one or more processors of the electronic device at least temporarily preclude, in response to the user input received at step 1003, the transmission of the media content to the other electronic device when decision 1005 determines that the first location and the second location are substantially different locations. At step 1008, the one or more processors of the electronic device can optionally cause, in response to the user input received at step 1003 when decision 1005 determines that the first location and the second location are substantially different locations, the presentation of a prompt for additional authorization to transmit the media content to the other electronic device.

Decision 1009 determines whether the additional authorization is received. Where it is not, the preclusion of transmission continues at step 1007. However, where the additional authorization to transmit the media content to the other electronic device is received, step 1011 comprises ceasing the precluding of the transmission of the media content to the other electronic device upon receiving the additional authorization to transmit the media content to the other electronic device. At step 1011, the one or more processors of the electronic device can cause the communication device to transmit the media content to the other electronic device.

Figure 11:
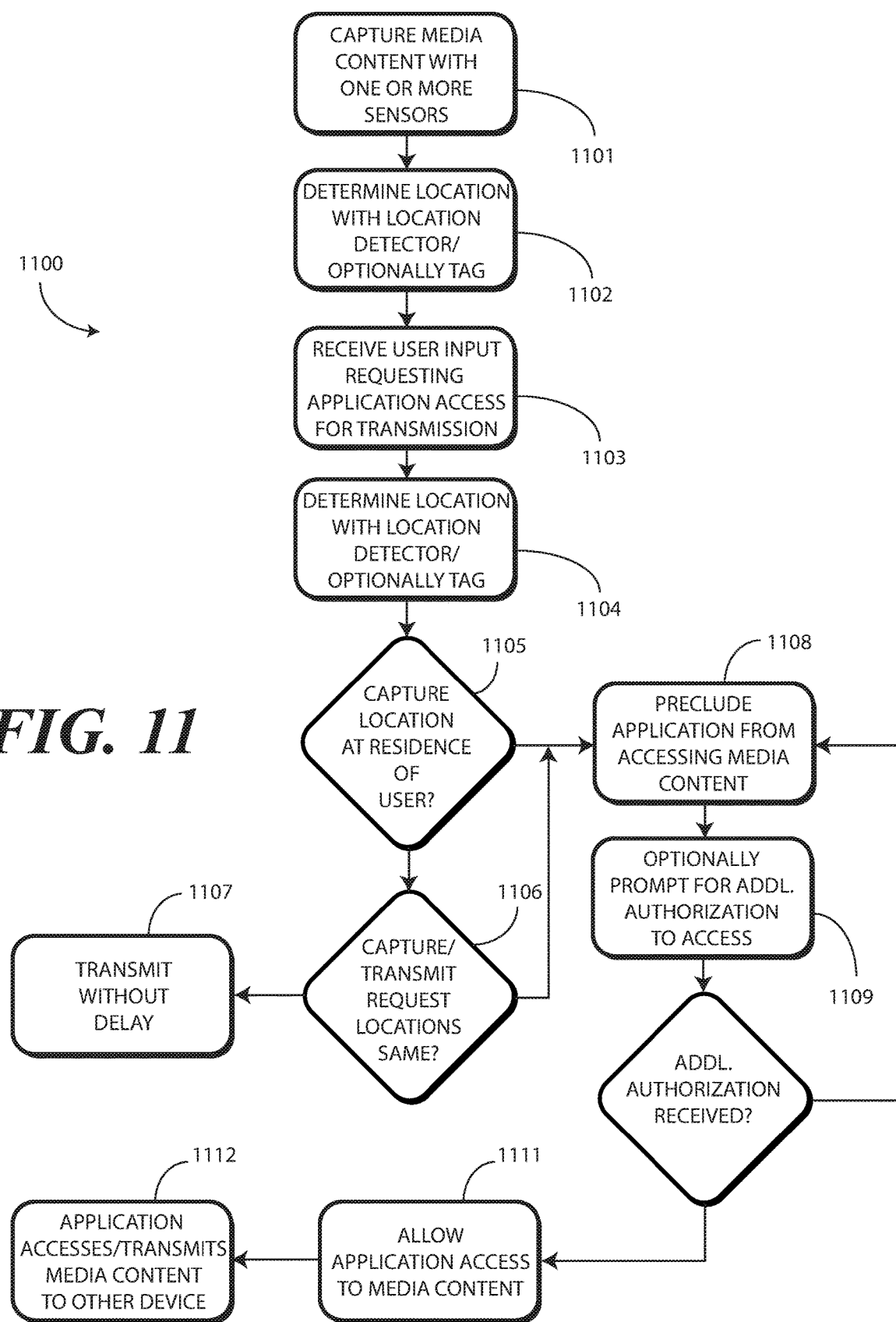
FIG. 11 illustrates another explanatory method in accordance with one or more embodiments of the disclosure.

Turning now to FIG. 11, illustrated therein is still another method 1100 in accordance with one or more embodiments of the disclosure. Beginning at step 1101, one or more sensors of an electronic device capture media content from an environment of the electronic device. At step 1102, a location detector of the electronic device determines a first location where the one or more sensors captured the media content.

At step 1103, a user interface of the electronic device receives user input requesting transmission of the media content to another electronic device. At step 1104, the location detector of the electronic device determines a second location where the user interface received the request to transmit the media content to the other electronic device.

Decision 1105 determines whether the first location, which is the media content capture location, is situated at a location of residence of an authorized user of the electronic device. Where it is, the rules of FIG. 1 can optionally be invoked when the method moves to step 1108. In one or more embodiments, at step 1108 the one or more processors of the electronic device at least temporarily preclude the transmission of the media content to the other electronic device when the location detector determines that the media content capture location is situated at the location of residence of the authorized user of the electronic device. Said differently, in one or more embodiments step 1108 comprises precluding, by the one or more processors, the transmission of the media content to the other electronic device when decision 1105 (which can be made by the one or more processors, the location detector, or combinations thereof) determines that the first location is situated at a residence of an authorized user of the electronic device.

Where decision 1105 determines the first location is not at the location of residence of the authorized user of the electronic device, decision 1106 determines whether the first location, identified at step 1102, and the second location, identified at step 1104, are substantially similar locations or substantially different locations. Where the first location and the second location are substantially similar locations, step 1107 comprises the one or more processors causing a communication device of the electronic device to transmit the media content without delay.

By contrast, when the first location and the second location are substantially different locations, step 1108 comprises the one or more processors of the electronic device precluding transmission of the media content to the other electronic device. In one or more embodiments, as evidenced by the double arrow between decision 1106 and step 1108, this precluding occurring at step 1108 continues until the location detector of the electronic device determines that the first location and the second location are substantially similar locations. In such an embodiment, media content captured at the location of residence of the authorized user of the electronic device would be precluded from being shared when the authorized user was outside of the location of residence, and would remain that way until the authorized user again returned to the location of residence.

In other embodiments, the precluding of step 1108 continues until additional authorization to transmit the media content is received. For example, step 1109 can comprise presenting, by the one or more processors at the user interface of the electronic device, a prompt requesting additional authentication to override the precluding the transmission of the media content to the other electronic device when the location detector determines that the first location and the second location are substantially different locations. Decision 1110 can determine whether this additional authorization is received.

Where it is not, the precluding of step 1108 can continue. However, where the additional authorization is received, step 1111 can comprise overriding, by the one or more processors, the preclusion of the transmission of the media content when the additional authentication is received at the user interface. Step 1112 can then comprise causing a communication device of the electronic device to transmit the media content to the other electronic device.

Figure 12:
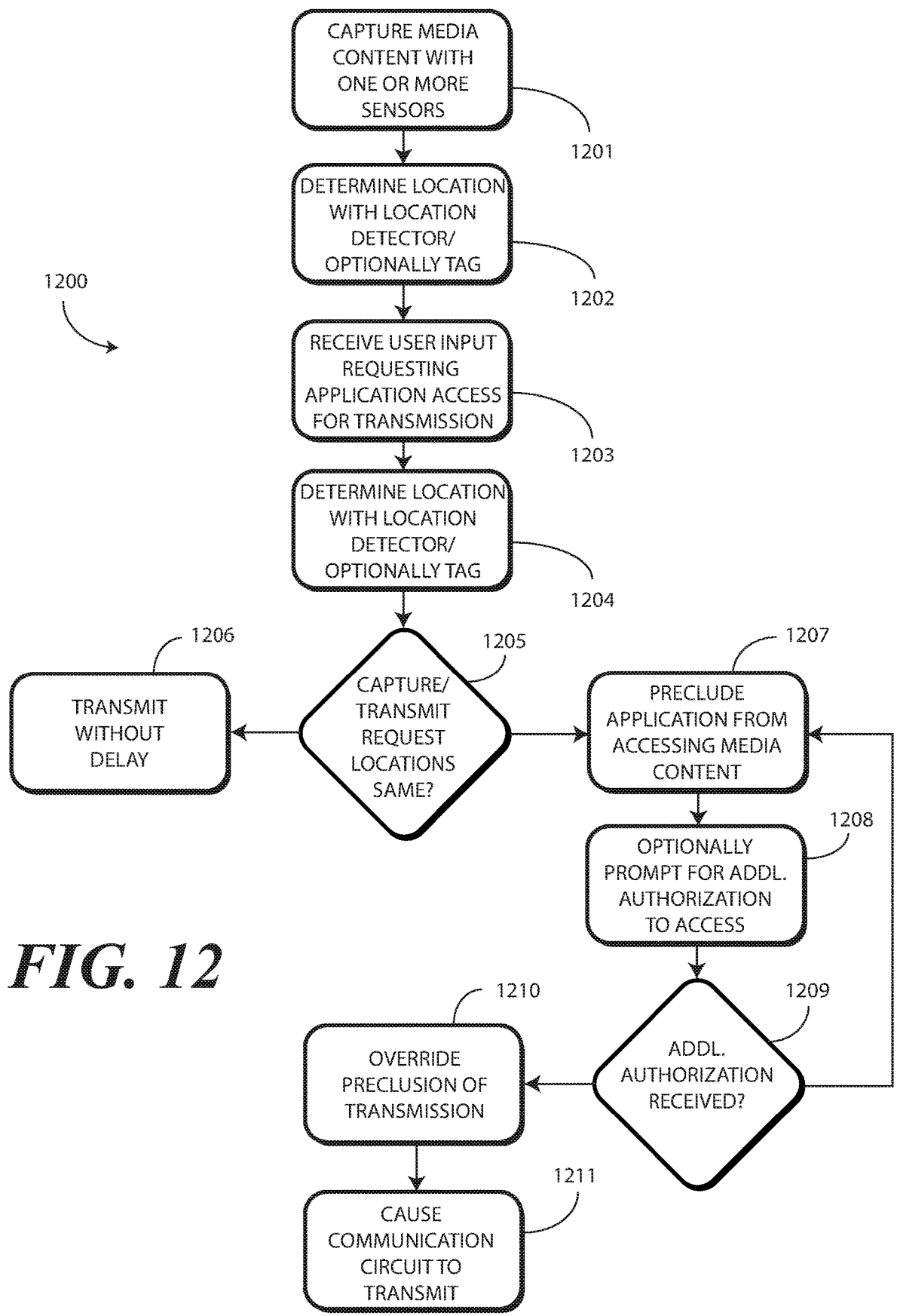
FIG. 12 illustrates still another explanatory method in accordance with one or more embodiments of the disclosure.

Turning now to FIG. 12, illustrated therein is still another method 1200 in accordance with embodiments of the disclosure. Beginning at step 1201, one or more sensors of an electronic device capture media content from an environment of the electronic device. At step 1202, a location detector of the electronic device determines a first location occurring where the one or more sensors capture the media content. This first location is known as the media content capture location.

At step 1203, a user interface of the electronic device receives user input requesting transmission of the media content to another electronic device. At step 1204, the location detector of the electronic device determines a second location occurring where the user interface receives the request to transmit the media content with the other electronic device. This second location is known as the user input reception location.

Decision 1205 determines whether the first location where the one or more sensors captured the media content and the second location where the user interface received the request to transmit (share) the media content to the other electronic device are substantially different locations or substantially the same location. Said differently, decision 1205 determines whether the media content capture location and the user input reception location are substantially similar locations or substantially different locations. In one or more embodiments, this comprises determining whether the first (media content capture) location and the second (user input reception location) are within, or beyond, a predefined radius such as 25 meters. In one or more embodiments, the predefined radius is user-definable using a menu of the electronic device.

At step 1206, one or more processors of the electronic device cause a communication device, in response to the user input received at step 1203, to transmit the media content to the other electronic device without delay when decision 1005 determines that the first (media content capture) location and the second (user input reception) location are substantially similar locations. In one or more embodiments, step 1206 comprises the one or more processors causing the communication device to transmit the media content to the other electronic device only when the first (media content capture) location and the location at which the other electronic device is situated are substantially similar locations. By contrast, at step 1207 the one or more processors of the electronic device preclude, in response to the user input received at step 1203, the transmission of the media content to the other electronic device when decision 1205 determines that the first (media content capture) location and the second (user input reception) location are substantially different locations.

In one or more embodiments, this precluding occurring at step 1207 continues until the location detector of the electronic device determines that the first (media content capture) location and the second (user input reception) location are substantially similar locations. In such an embodiment, media content captured at the location of residence of the authorized user of the electronic device would be precluded from being shared when the authorized user was outside of the location of residence, and would remain that way until the authorized user again returned to the location of residence.

In other embodiments, the precluding of step 1207 continues until additional authorization to transmit the media content is received. For example, step 1208 can comprise presenting, by the one or more processors at the user interface of the electronic device, a prompt requesting additional authentication to override the precluding the transmission of the media content to the other electronic device when the location detector determines that the first (media content capture) location and the second (user input reception) location are substantially different locations. Decision 1209 can determine whether this additional authorization is received.

Where it is not, the precluding of step 1207 can continue. However, where the additional authorization is received, step 1210 can comprise overriding, by the one or more processors, the preclusion of the transmission of the media content when the additional authentication is received at the user interface. Step 1211 can then comprise causing a communication device of the electronic device to transmit the media content to the other electronic device.

Figure 13:
FIG. 13 illustrates another explanatory method in accordance with one or more embodiments of the disclosure.

Turning now to FIG. 13, illustrated therein is yet another method 1300 in accordance with one or more embodiments of the disclosure. Recall from above that the method (100) of FIG. 1 was directed to media content captured at home, with its special set of rules due to the fact that it is considered a truly personal place with its own set of rules. By contrast, the method (800) of FIG. 8 was directed to rules protecting privacy when the location where the media content was captured different from where the media content was shared, i.e., where the user interface of the electronic device received user input requesting transmission of the media content to another electronic device.

In the method 1300 of FIG. 13, rather than considering the location of the transmitting electronic device when the media content is shared compared to the location of the transmitting electronic device when the media content is captured, the method 1300 looks at the location of the transmitting electronic device compared to the location of the receiving electronic device. In one or more embodiments, if the transmitting electronic device and receiving electronic device are positioned at substantially the same location, the media content can be shared from the transmitting electronic device to the receiving electronic device without delay as a result of this inference of relevance and intent. However, when the location of the transmitting electronic device and another location of the receiving electronic device are substantially different, in one or more embodiments one or more processors of the transmitting electronic device at least temporarily preclude the transmission of media content to the receiving electronic device. In one or more embodiments, the one or more processors can then prompt for additional authorization to transmit the media content. Upon receiving that additional authorization, or alternatively when either the transmitting electronic device or the receiving electronic device moves such that the location of the transmitting electronic device and the other location of the receiving electronic device are substantially the same, the one or more processors can cease the preclusion of transmission and can transmit the media content from the transmitting electronic device to the receiving electronic device.

The method 1300 of FIG. 13 elevates personal data security and user privacy, and simplifies device-to-device engagement by allowing media content captured at an identified location to be by default sharable with other electronic devices that are at substantially the same location. In some embodiments, sharing is allowed at a later time between electronic devices based upon an engagement history without requiring any additional authorization to share the media content.

The method 1300 of FIG. 13 allows electronic devices situated in the same context or location to share media content captured at the location. Illustrating by example, if a family is having dinner at a restaurant, i.e., an identified location, and the matriarch of the family takes a picture with a smartphone and wants to share it with the patriarch of the family, who is also seated at the table, the picture is sharable between the transmitting electronic device of the mom and the receiving electronic device of the dad without delay and without requiring any additional authorization to transmit the picture.

Illustrating by way of another example, in one or more embodiments one or more processors of a transmitting electronic device can identify, from a shared history, whether a receiving electronic device is sufficiently linked to the transmitting electronic device to allow sharing of media content without delay and without requiring any additional authorization to transmit the media content. For instance, if the dad's smartphone, which is attempting to transmit media content to the mom's smartphone, which is the receiving device, are determined from a shared history to reside at the same location of residence, i.e., the one or more processors of the dad's smartphone determine from this shared history that the receiving electronic device belongs to mom and resides at the same location of residence as the dad's electronic device rather than just being occasionally present at the location of residence as a visiting guest would be, the one or more processors of the dad's smartphone allow media content to be sharable between the transmitting electronic device of the dad and the receiving electronic device of the mom without delay and without requiring any additional authorization. In one or more embodiments, this is true even when the transmitting electronic device and the receiving electronic device are not positioned at substantially the same location.

Advantageously, the use of this history of an occupant's presence at a location of residence as a gate to sharing media content reduces the privacy concern occurring when media content is captured at one location and shared with another electronic device situated at another location. This is true because the occupant presence history at the location of residence, which serves as a type of authentication, a transmitting electronic device can share media content with a receiving electronic device when both are situated at the location of residence without delay and without requiring additional authorization to transmit the media content.

Beginning at step 1301, an authorized user 111 is again shown holding an electronic device 112 configured in accordance with one or more embodiments of the disclosure. The authorized user 111 is situated at his location of residence 113, which in this example is a dwelling (his house) situated at a residence belonging to the authorized user 111.

At step 1302, one or more sensors 114 of the electronic device 112, which in this example comprise an image capture device, are capturing media content 115 from an environment 117 of the electronic device 112. In this example, the environment 117 comprises the interior of the house, and the media content 115 comprises images 118 of the authorized user's dog 116 that are captured by the image capture device.

While captured images 118 are one example of media content 115 that one or more sensors of the electronic device 112 can capture, the media content 115 can take other forms as well, just as was the case with the method (100) of FIG. 1. For example, the media content 115 can comprise captured video (119), captured audio (120), captured screenshots (121), which can be captured text or multimedia messages, captured emails, captured websites, other media content, and/or combinations thereof. Other examples of media content 115 that can be captured by one or more sensors of the electronic device 112 will be obvious to those of ordinary skill in the art having the benefit of this disclosure.

At step 1303, a location detector (210) of the electronic device 112 identifies a location of the electronic device 112 that is occurring when the one or more sensors 114 capture the media content 115. In this example, the environment 117 is positioned at a location of residence 113 of the authorized user 111, as the environment 117 is situated within the authorized user's house.

At step 1304, a user interface 122, shown illustratively as a touch-sensitive display in this example, is receiving user input 123 requesting transmission of the media content 115 to another electronic device. In this example, the user input 123 is requesting transmission of the media content 115 to another electronic device, which may be in communication with the electronic device 112 across a network. Here, the authorized user 111 delivers the user input 123 to the user interface 122 requesting that the image 118 be transmitted to another electronic device belonging to Buster.

As before, it should be noted that the other electronic device could be any of a number of electronic devices. For example, in one embodiment, the other electronic device comprises a portable electronic device such as a smartphone or tablet computer belonging to another person. For example, the other electronic device could be another smartphone belonging to Buster, who is the intended recipient of the image 118 in this example. In another embodiment, the other electronic device could be a desktop, laptop, tablet, or rack-mount computer. In still other embodiments, the other electronic device is a server, such as a cloud server, personal server, web server, social media server, commercial server, private server, institutional server, academic server, non-profit server, or other type of server configured to receive media content 115 from electronic devices across the network.

For example, rather than sending a multimedia message to a smartphone belonging to Buster, as shown at step 1304, in another embodiment the authorized user 111 may want to share the image 118 with Buster by posting the image 118 with a server operated by a social media service while tagging Buster in the image. Other examples of electronic devices to which media content 115 may be transmitted in accordance with embodiments of the disclosure will be obvious to those of ordinary skill in the art having the benefit of this disclosure.

Figure 16:
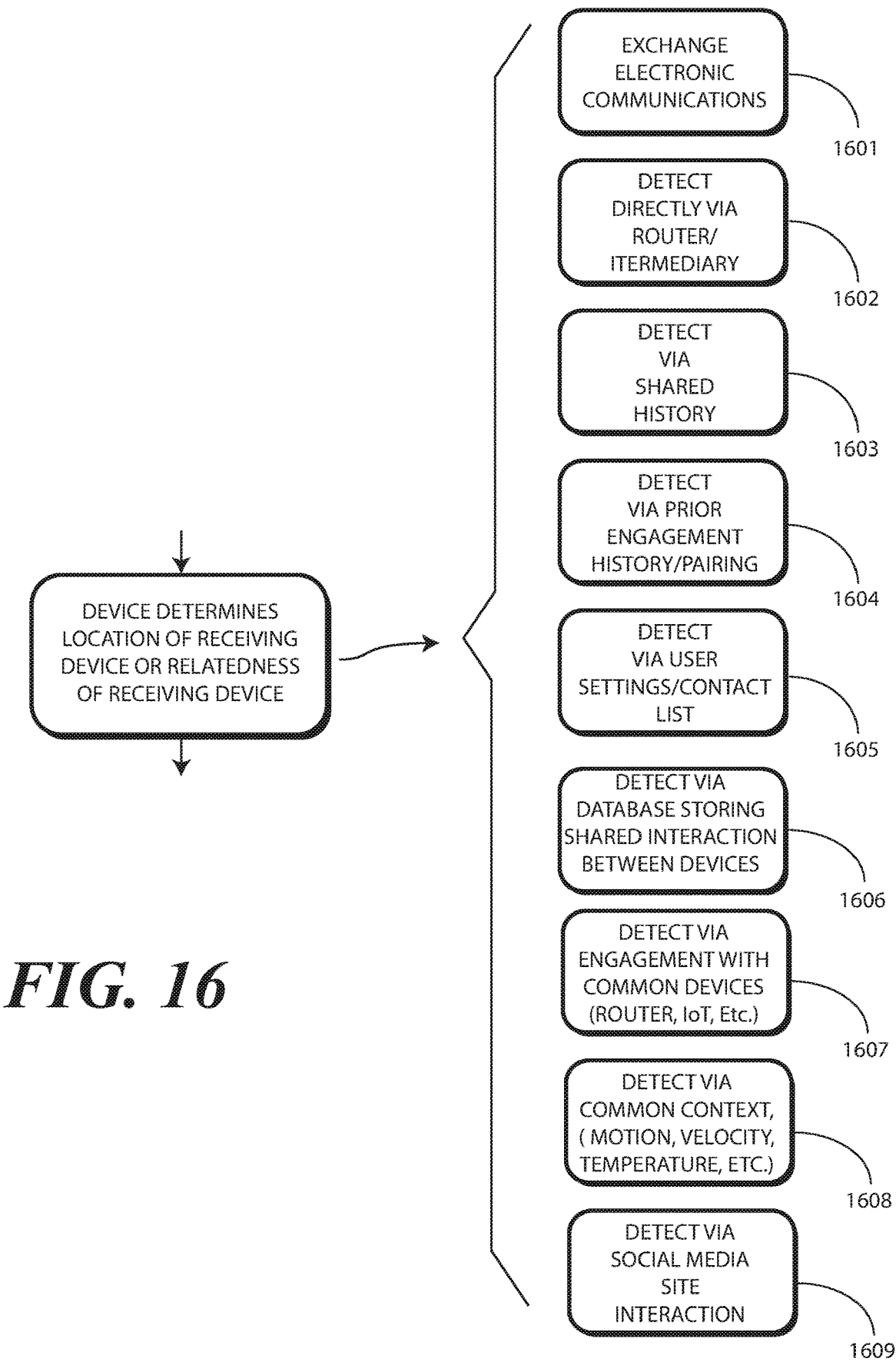
FIG. 16 illustrates still another explanatory method in accordance with one or more embodiments of the disclosure.

At step 1305, one or more processors (204) of the electronic device 112 determine the location of the receiving electronic device. These one or more processors (204) of the electronic device 112 can determine the location of the receiving electronic device 1313 in a variety of ways. Turning briefly to FIG. 16, illustrated therein are various mechanisms by which this determination can be made. It should be noted that these mechanisms can be used, where required, in any of the previous methods as well, including in decision (905) of the method (900) of FIG. 9, the method (800) of FIG. 8, or other methods. Moreover, it should be understood that the mechanisms of FIG. 16 are illustrative only. Others will be obvious to those of ordinary skill in the art having the benefit of this disclosure.

Beginning at 1601, in one or more embodiments electronic device (112) may establish electronic communication with the receiving electronic device (1313) to determine the latter's location. Alternatively, at 1602 electronic device (112) and the receiving electronic device (1313) may each be in communication with a cloud server or other device that is able to assess location using the location detector of each electronic device. At 1603, the one or more processors (204) of electronic device (112) may infer the location of the receiving electronic device (1313) based upon a shared history. If, for example, a husband works from home while a wife works in an office, the wife's electronic device may infer that the husband is at home if it is a work day during working hours, and so forth. Other techniques for determining the location of the receiving electronic device will be obvious to those of ordinary skill in the art having the benefit of this disclosure.

Turning now back to FIG. 13, As shown at step 1306, Buster 1312 is holding the receiving electronic device 1313, shown here as his smartphone, while sitting outside a Laundromat. The Laundromat in this example is beyond a predefined radius 1314 from the location where the media content 115 was captured, i.e., the location of residence 113 of the authorized user 111 of the electronic device 112 attempting to transmit the media content 115.

Decision 1307 determines whether the location where the media content 115 was captured, here the location of residence 113 of the authorized user 111 of the electronic device 112, and the location of the receiving electronic device 1313, here the Laundromat, are substantially the same location or substantially different locations. As with the method (800) of FIG. 8, in one or more embodiments the location of media content capture and the location of the receiving electronic device 112 are substantially the same location when they are within a predefined radius 1314, but are substantially different locations when the location of the receiving electronic device 1313 is beyond the predefined radius 1314 from the location where the media content 115 was captured.

If the location of media content capture and the location of the receiving electronic device 1313 were at substantially the same location, which would have been the situation if Buster 1312 were at the location of residence 113 of the authorized user 111 of the electronic device 112 transmitting the media content 115, the one or more processors (204) of the electronic device 112 would omit, at step 1311, any at least temporarily preclusion of the transmission of the media content 115 to the receiving electronic device 1313 and instead would cause, in response to the user input received at step 1304, the communication device (202) of the electronic device 112 to transmit the media content 115 to the receiving electronic device 1313.

In this example, however, the location of the media content capture and the location of the receiving electronic device 1313 are substantially different locations due to the fact that the Laundromat is beyond the predefined radius, e.g., 1000 yards, from the location of residence 113 of the authorized user 111 of the electronic device 112, which is where the media content 115 was captured. At step 1308, the one or more processors at least temporarily preclude, in response to the user input received at step 1304, the transmission of the media content 115 to the receiving electronic device 1313.

As before, in one or more embodiments the at least temporarily precluding occurring at step 1308 can continue until additional authorization to transmit the media content 115 is received from the authorized user 111. For instance, in this example the one or more processors (204) of the electronic device 112 prompt 130, at step 1309, for additional authorization to transmit the media content 115 to the receiving electronic device 1313. In one or more embodiments, this prompting 130 occurs while the one or more processors (204) of the electronic device 112 are at least temporarily precluding the transmission of the media content 115 to the receiving electronic device 1313 in response to the user input 123 received at step 1306 requesting transmission of the same.

In this example, the one or more processors (204) of the electronic device 112 prompt 130 for additional authorization to transmit the media content 115 to the other electronic device by presenting a message 131 on the user interface 122 of the electronic device 112. In this example, the one or more processors of the electronic device 112 prompt 130 for additional authorization to transmit the media content 115 to the other electronic device by presenting a message 131 on the user interface 122 of the electronic device 112. In this example, the message 131 of the prompt 130 alerts the authorized user 111 to the fact that the transmission of the media content 115 has been at least temporarily precluded. The message 131 of the prompt 130 also indicates, in this illustrative embodiment, that the location of electronic device 112 and the location of the receiving electronic device 1313 are substantially different locations. This illustrative message states, "The receiving device is at another location—Are you sure you want to send? Send Blocked—If you're sure you want to send, enter PIN:"

In this illustrative embodiment, the message 131 requests additional authorization in the form of a PIN. As before, the PIN is merely one form of additional authorization that can be used in accordance with embodiments of the disclosure. Other examples of additional authorization comprise entry of a password, expression of a predefined mien, a simple actuation of a user actuation target, performance of a gesture on, or near, the user interface 122 of the electronic device 112, making a gesture translating the electronic device 112 in three-dimensional space, voice command, or some other manipulation of the electronic device 112 in response to the prompt 130. Other examples of additional authorization will be obvious to those of ordinary skill in the art having the benefit of this disclosure.

Since the authorized user 111 is indeed sure he wants to transmit the media content 115, at step 1309 the authorized user 111 delivers the additional authorization 132 to the user interface 122 in the form of additional user input 133 at step 1309. The one or more processors (204) of the electronic device 112 thus receive, at step 1309, the additional authorization 132 to transmit the media content 115 to the receiving electronic device 1313. In one or more embodiments, this receipt of the additional authorization 132 occurs while the one or more processors (204) of the electronic device 112 at least temporarily preclude the transmission of the media content 115 to the receiving electronic device 1313. The authorized user 111 may also actuate a user actuation target 134, shown here as a "send" icon presented on the touch-sensitive display of the electronic device 112, causing the additional authorization 132 to be delivered to the one or more processors of the electronic device 112.

In one or more embodiments, step 1310 then comprises the one or more processors (204) of the electronic device 112 ceasing, in response to receiving the additional authorization 132 to transmit the media content 115 to the other electronic device at step 1309, the at least temporarily precluding the transmission of the media content 115 to the receiving electronic device 1313. Step 1311 then comprises the one or more processors (204) of the electronic device 112 causing, in response to the ceasing at step 1310, a communication device of the electronic device 112 to transmit the media content 115 to the receiving electronic device 1313.

Thus, the method 1300 of FIG. 13 determines whether the location of the electronic device 112 transmitting the media content 115, when capturing the media content 115, is different from another location of a receiving electronic device 1313. Where it is, there is at least temporarily preclusion of transmission. By contrast, when location at which the electronic device 112 captured the media content 115 and the other location of the receiving electronic device 1313 are substantially the same location, sharing of the media content 115 can occur without delay.

This method 1300 can be modified to allow sharing of the media content 115 even when the electronic device 112 attempting to share the media content 115 and the receiving electronic device 1313 are in different locations under certain circumstances. Recall from the introduction to FIG. 13, that in other embodiments a shared device history can be used to link the electronic device 112 attempting to share the media content 115 and the receiving electronic device 1313, thereby reducing security concerns regarding unintentional sharing of the media content 115.

Figure 14:
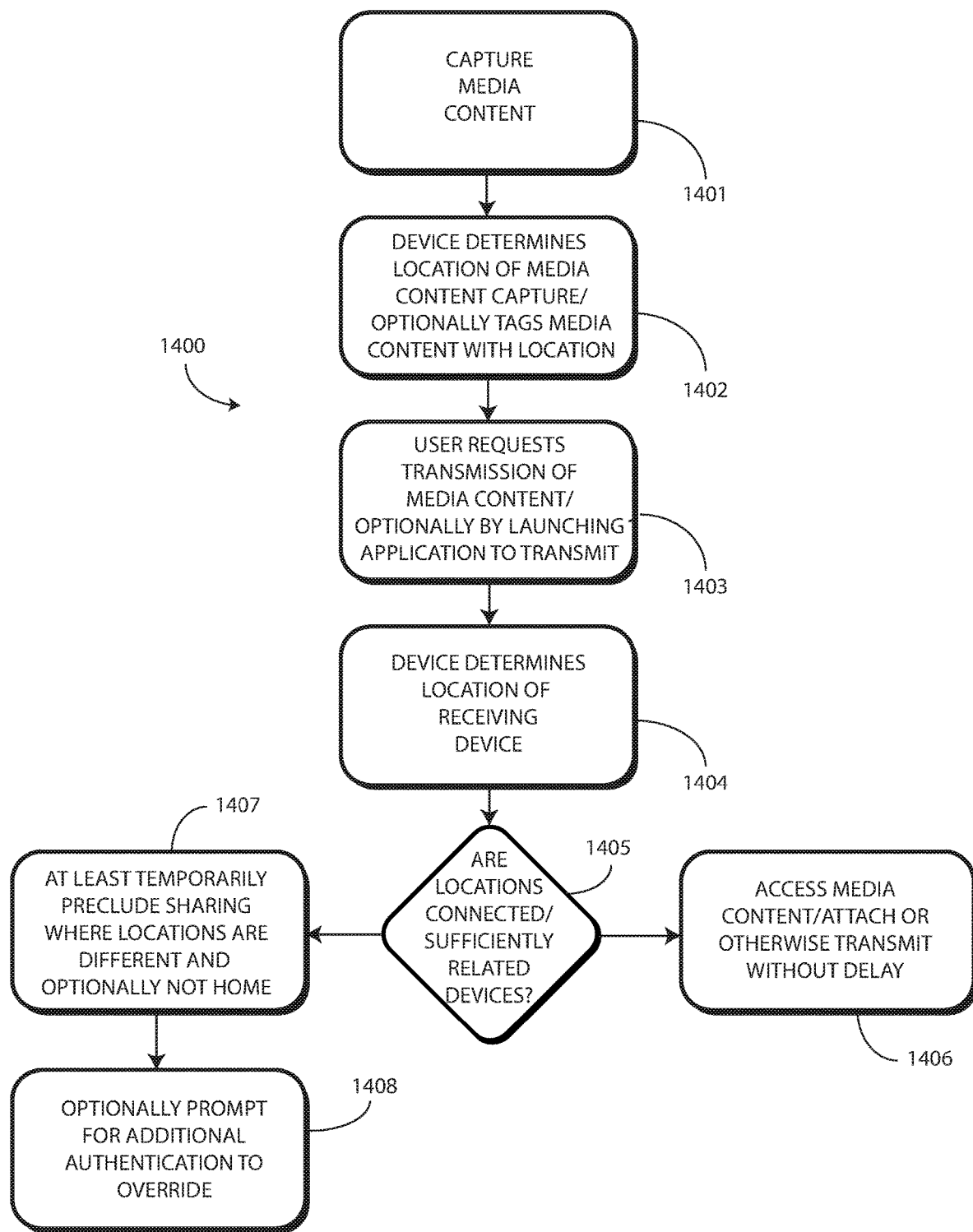
FIG. 14 illustrates still another explanatory method in accordance with one or more embodiments of the disclosure.

For example, in one or more embodiments one or more processors (204) of the electronic device 112 attempting to transmit the media content 115 can identify, from a shared history, shared electronic communications, shared user settings, shared communication channels, or shared contexts, such as when both the electronic device 112 attempting to transmit the media content 115 and the receiving electronic device 1313 are at a common location and moving at a common velocity, as would be the case when the electronic device 112 and the other electronic device 1313 are situated in the same vehicle, whether a receiving electronic device 1313 is sufficiently connected, linked, paired, or associated with the electronic device 112 attempting to share the media content 115 to allow sharing of media content 115 without delay and without requiring any additional authorization to transmit the media content 115. Turning now to FIG. 14, illustrated therein is one method 1400 by which this can occur.

Beginning at step 1401, one or more sensors (205) of an electronic device (112) capture media content (115) while the electronic device (112) is situated at a media content capture location. As before, the media content (115) can comprise one or more of a captured image, captured audio, a captured screenshot (which is an image), captured video, or combinations thereof.

At step 1402, a location detector (210) of the electronic device (112) determines where the media content capture location is positioned. Optionally, the one or more processors (204) of the electronic device (112) can tag the media content (115) with this media content capture location in one or more embodiments.

At step 1403, a user interface (122) of the electronic device (112) receives user input requesting transmission of the media content (115) to another electronic device situated at another electronic device location. At step 1404, one or more processors (204) of the electronic device (112) determine where the other electronic device location is positioned.

Decision 1405 determines whether the media content capture location and the other electronic device location are substantially different locations or substantially the same location. Where the media content capture location and the other electronic device location are substantially the same location, the method 1400 can proceed as described above with reference to FIG. 13. Specifically, step 1406 can comprise the one or more processors (204) of the electronic device (112) causing a communication device (202) of the electronic device (112) to transmit the media content (115) to the other electronic device without delay and without requiring additional authorization to transmit the media content (115).

However, in this embodiment when the media content capture location and the other electronic device location are substantially different locations, decision 1405 can make a second determination before the method 1400 proceeds to step 1407 and its at least temporary preclusion of transmission of the media content (115). In one or more embodiments, decision 1405 also determines whether the electronic device (112) attempting to share the media content (115) and the receiving electronic device (1313) are sufficiently connected, associated, paired, linked, or otherwise related that the media content (115) can be shared without privacy concerns despite the fact that the media content capture location and the other electronic device location are substantially different locations. Turning briefly again to FIG. 16, illustrated therein are examples of how this can occur. Others will be obvious to those of ordinary skill in the art having the benefit of this disclosure.

At 1603, the one or more processors (204) of electronic device (112) may determine whether the electronic device (112) attempting to share the media content (115) and the receiving electronic device (1313) are sufficiently connected, associated, paired, linked, or otherwise related such that the media content (115) can be shared without privacy concerns despite the fact that the media content capture location and the other electronic device location are substantially different locations based upon a shared history. Illustrating by example, 1603 can comprise one or more processors (204) of the electronic device (112) attempting to share the media content (115) accessing a database, stored either in a memory (218) of the electronic device (112), a server in communication with the electronic device (112), or other device, whether an authorized user of the electronic device (112) attempting to share the media content (115) and another authorized user of the receiving electronic device (1313) reside at a common residence.

The database can include location information relating to where each of the electronic device (112) attempting to share the media content (115) and the receiving electronic device (113) are situated most frequently, for the longest duration, or combinations thereof. The database can also include information related to electronic devices that each of the electronic device (112) attempting to share the media content (115) and the receiving electronic device (1313) communicate with to communicate with each other, such as routers situated within a location of residence of the authorized user of the electronic device (112) and the authorized user of the receiving electronic device (1313), Internet-of-things (IoT) devices situated at the location of residence, security systems situated at the location of residence, or other electronic devices situated at the location of residence. The database can also include logs of previous device-to-device communications between the electronic device (112) attempting to share the media content (115) and the receiving electronic device (1313), including previous situations in which the one or more processors (204) of the electronic device (112) attempting to share the media content (115) has overridden the default preclusion of sharing media content (115) due to one or more underlying factors as well. If, for example, the electronic device (112) attempting to share the media content (115) has done the same with prior media content because the receiving electronic device (1313) was frequently at the same location as the electronic device (112), this can be used as a factor to establish a connection, association, pairing, linkage, or other relationship between the devices.

By determining whether there is a sufficient connection, association, pairing, linkage, or other relationship between the electronic device (112) and the receiving electronic device (1313), the one or more processors (204) of the electronic device (112) attempting to share the media content (115) can conclude that there are no privacy concerns with sharing the media content (115) with the receiving electronic device (1313). Accordingly, where there is a sufficient connection, association, pairing, linkage, or other relationship between the devices, embodiments of the disclosure contemplate that the electronic device (112) attempting to share the media content (115) and the receiving electronic device (1313) are sufficiently associated such that the media content (115) can be shared without privacy concerns despite the fact that the media content capture location and the other electronic device location are substantially different locations.

For instance, if a husband's smartphone, which is attempting to transmit media content to the mom's smartphone, which is the receiving electronic device, are determined from a shared history at 1603 to reside at the same location of residence, i.e., the one or more processors of the husband's smartphone determine from this shared history that the receiving electronic device belongs to the wife who resides at the same location of residence as the husband's electronic device, rather than just being occasionally present at the location of residence as a visiting guest would be, the one or more processors of the husband's smartphone might allow media content to be sharable between the transmitting electronic device of the husband and the receiving electronic device of the wife without delay and without requiring any additional authorization. In one or more embodiments, this is true even when the transmitting electronic device and the receiving electronic device are not positioned at substantially the same location.

At 1604, the one or more processors (204) of the electronic device (112) attempting to share the media content (115) may determine whether the receiving electronic device (1313) is sufficiently connected, associated, paired, linked, or otherwise related such that the media content (115) can be shared without privacy concerns despite the fact that the media content capture location and the other electronic device location are substantially different locations in another manner. For example, in one or more embodiments 1604 comprise determining, by the one or more processors (204) from accessing a database, stored either in a memory (218) of the electronic device (112), a server in communication with the electronic device (112), or other device, whether the receiving electronic device (1313) is a companion device of the electronic device (112) attempting to share the media content (115). For instance, if the electronic device (112) and the receiving electronic device (1313) have a previous engagement history, which may include frequent device-to-device communications, communications through a common electronic device such as a router or Internet-of-things device, or have been paired with secure communication channels as securely-linked companion devices, the electronic device (112) attempting to share the media content (115) and the receiving electronic device (1313) may be sufficiently connected, associated, paired, linked, or otherwise related such that the media content (115) can be shared without privacy concerns despite the fact that the media content capture location and the other electronic device location are substantially different locations.

At 1605, the one or more processors (204) of the electronic device (112) attempting to share the media content (115) may determine whether the receiving electronic device (1313) is sufficiently connected, associated, paired, linked, or otherwise related such that the media content (115) can be shared without privacy concerns despite the fact that the media content capture location and the other electronic device location are substantially different locations in still another manner. For example, in one or more embodiments 1605 comprise determining, by the one or more processors (204) from accessing a contacts list or other database, stored either in a memory (218) of the electronic device (112), a server in communication with the electronic device (112), or other device, whether the authorized user of the receiving electronic device (1313) and the authorized user (111) of the electronic device (112) at the same location of residence. In still another embodiment, the database and/or user settings within each of the electronic device (112) attempting to share the media content (115) and the receiving electronic device (1313) may designate the two devices as being connected, associated, paired, linked, or otherwise related by user definition or user setting. In either case, where the owners of each device are sufficiently connected, associated, paired, linked, or otherwise related, the electronic device (112) attempting to share the media content (115) and the receiving electronic device (1313) may be sufficiently linked such that the media content (115) can be shared without privacy concerns despite the fact that the media content capture location and the other electronic device location are substantially different locations.

At 1606, the one or more processors (204) of the electronic device (112) attempting to share the media content (115) may determine whether the receiving electronic device (1313) is sufficiently connected, associated, paired, linked, or otherwise related such that the media content (115) can be shared without privacy concerns despite the fact that the media content capture location and the other electronic device location are substantially different locations in yet another manner. For example, in one or more embodiments 1606 comprise determining, by the one or more processors (204) from accessing a database, stored either in a memory (218) of the electronic device (112), a server in communication with the electronic device (112), or other device, whether the receiving electronic device (1313) has a sufficient number of interactions where additional authorization to transmit media content (115) was received at the electronic device (112) attempting to share the media content (115), thereby overriding any precluding of transmission. For instance, if the authorized user (111) of the electronic device (112) had delivered additional authorization to transmit media content (115) to the receiving electronic device (1313) ninety-percent of the times transmission was at least temporarily precluded, or every time transmission was at least temporarily precluded, the electronic device (112) attempting to share the media content (115) and the receiving electronic device (1313) may be sufficiently linked such that the media content (115) can be shared without privacy concerns despite the fact that the media content capture location and the other electronic device location are substantially different locations.

At 1607, the one or more processors (204) of the electronic device (112) attempting to share the media content (115) may determine whether the receiving electronic device (1313) is sufficiently connected, associated, paired, linked, or otherwise related such that the media content (115) can be shared without privacy concerns by identifying one or more common intermediate communication devices with which each of the electronic device (112) attempting to share the media content (115) and the receiving electronic device (1313) have interacted. This information may be stored in a memory of each of the electronic devices that is accessible by the one or more processors (204) in one or more embodiments. In other embodiments, this information may be stored in a database stored in the intermediate device, a server in communication with the electronic device (112), or other device.

For instance, if the electronic device (112) and the receiving electronic device (1313) frequently communicate with a plurality of Internet-of-things devices situated at a fixed identifiable location, as would be the case if the authorized user of the electronic device (112) and the authorized user of the receiving electronic device (1313) lived at the same location of residence having one or more Internet-of-things devices situated therein, this previous engagement history and its commonality of transmitting device-to-intermediate device-to receiving device communication may establish sufficient commonality between the electronic device (112) attempting to transmit the media content (115) and the receiving electronic device (1313). Accordingly, the one or more processors (204) of the electronic device (112) attempting to share the media content (115) may determine that the receiving electronic device (1313) is sufficiently connected, associated, paired, linked, or otherwise related such that the media content (115) can be shared without privacy concerns.

At 1608, the one or more processors (204) of the electronic device (112) attempting to share the media content (115) may determine whether the receiving electronic device (1313) is sufficiently connected, associated, paired, linked, or otherwise related such that the media content (115) can be shared without privacy concerns from a common context. Imagine, for example, that the electronic device (112) attempting to share the media content (115) and the receiving electronic device (1313) are situated in the same vehicle. The one or more processors (204) of the electronic device (112), using its one or more sensors (205), may detect that the receiving electronic device (1313) is similarly located, moving at the same velocity, experiencing the same temperature, elevation, and so forth, that authorized user of the receiving electronic device (1313) would experience the information captured in the media content (115) when the media content (115) was captured. The one or more processors (204) may then identify that the receiving electronic device (1313) is be sufficiently connected, associated, paired, linked, or otherwise related such that the media content (115) can be shared without privacy concerns. It should be noted that the examples of FIG. 16 are illustrate mechanisms for determining whether a transmitting electronic device is sufficiently connected, related, paired, linked, or otherwise associated with a receiving electronic device. Numerous others will be obvious to those of ordinary skill in the art having the benefit of this disclosure.

At 1609, the one or more processors (204) of the electronic device (112) attempting to share the media content (115) may determine whether the receiving electronic device (1313) is sufficiently connected, associated, paired, linked, or otherwise related such that the media content (115) can be shared without privacy concerns from a previous interaction with a social media server. Illustrating by example, if media content (115) is captured at a media content capture location, and an authorized user of the electronic device (112) capturing the media content (115) delivers user input to the user interface (122) of the electronic device (112) causing the media content (115) to be shared with a social media server, in one or more embodiments the media content (115) can be transmitted without delay where there is a social site recipient/history proving prior sharing history/friendship sufficient to omit any temporary preclusion of transmission and can allow sharing without any requirement of additional authorization (even though social media server is a remote electronic device).

Turning now back to FIG. 14, where the electronic device (112) attempting to share the media content (115) and the receiving electronic device (1313) are sufficiently connected, associated, paired, linked, or otherwise related such that the media content (115) can be shared without privacy concern, as determined by decision 1405. In one or more embodiments, the connection, association, pairing, linkage, or otherwise relatedness means that the media content (115) can be shared despite the fact that the media content capture location and the other electronic device location are substantially different locations, as determined by decision 1405. Where this is the case, in one or more embodiments step 1406 comprises omitting, by the one or more processors (204), the at least temporarily precluding the transmission of the media content (115) to the receiving electronic device (1313) and instead causing, by the one or more processors (204) in response to the user input received at step 1403, the communication device (202) of the electronic device (112) to transmit the media content 115 to the receiving electronic device (1313).

Thus, in one or more embodiments, step 1406 comprises omitting, by the one or more processors (204), the at least temporarily precluding the transmission of the media content (115) to the receiving electronic device (1313) and instead causing, by the one or more processors (204) in response to the user input received at step 1403, the communication device (202) of the electronic device (112) to transmit the media content 115 to the receiving electronic device (1313) when the authorized user (111) of the electronic device (112) and the other authorized user of the receiving electronic device (1313) reside at the common residence, even when the location and the another location are substantially different locations.

In another embodiment, step 1406 comprises omitting, by the one or more processors (204) of the electronic device (112) attempting to share the media content (115), the at least temporarily precluding the transmission of the media content (115) to the receiving electronic device (1313) and instead causing, by the one or more processors (204) in response to the user input received at step 1403, the communication device (202) of the electronic device (112) to transmit the media content (115) to the receiving electronic device (1313) when the receiving electronic device (1313) is the companion electronic device of the electronic device (112), or is sufficiently connected, associated, paired, linked, or otherwise related to the receiving electronic device (1313). In one or more embodiments, this omission of precluding transmission can occur even when the location and the another location are substantially different locations.

In these embodiments, step 1406 effectively comprises overriding any preclusion of transmission when the receiving electronic device (1313) corresponds to at least one predefined criterion such as residing at a common residence, having a sufficient shared history with the electronic device (112) attempting to share the media content (115), having been paired as a companion device with the electronic device (112) attempting to share the media content (115), having a common context, having a common engagement history with an intermediate device, having user settings designating the receiving electronic device (1313) as being sufficiently connected, associated, paired, linked, or otherwise related to the electronic device (112) attempting to share the media content (115), or other criterion, including those described above with reference to FIG. 16. In one or more embodiments, this omission can occur even though the media content capture location and the location of the another electronic device are substantially different locations.

Alternatively, when the media content capture location and the other electronic device location are substantially different locations, and optionally where the electronic device (112) attempting to share the media content (115) and the receiving electronic device (1313) are not sufficiently connected, associated, paired, linked, or otherwise related such that the media content (115) can be shared without privacy concerns, even when it is the case that the media content capture location and the other electronic device location are substantially different locations, step 1407 comprises the one or more processors (204) at least temporarily precluding the transmission of the media content (115) to the other electronic device in response to the user input received at step 1403. As before, this at least temporarily precluding can comprise precluding an application operating on the one or more processors (204) from accessing the media content (115).

The method 1400 can optionally prompt, at step 1408, by the one or more processors (204) on the user interface (122)

when the media content capture location and the location of the another electronic device are substantially different locations, and optionally where the electronic device (112) attempting to share the media content (115) and the receiving electronic device (1313) are not sufficiently linked such that the media content (115) can be shared without privacy concerns despite the fact that the media content capture location and the other electronic device location are substantially different locations, for the additional authorization to transmit the media content (115) to the receiving electronic device (1313). Step 1408 can also comprise receiving, from the user interface (122), the additional authorization to transmit the media content (115), and causing, by the one or more processors (204), the communication device (202) to transmit the media content (115) to the receiving electronic device (1313) even though the media content capture location and the location of the another electronic device are substantially different locations.

Figure 15:
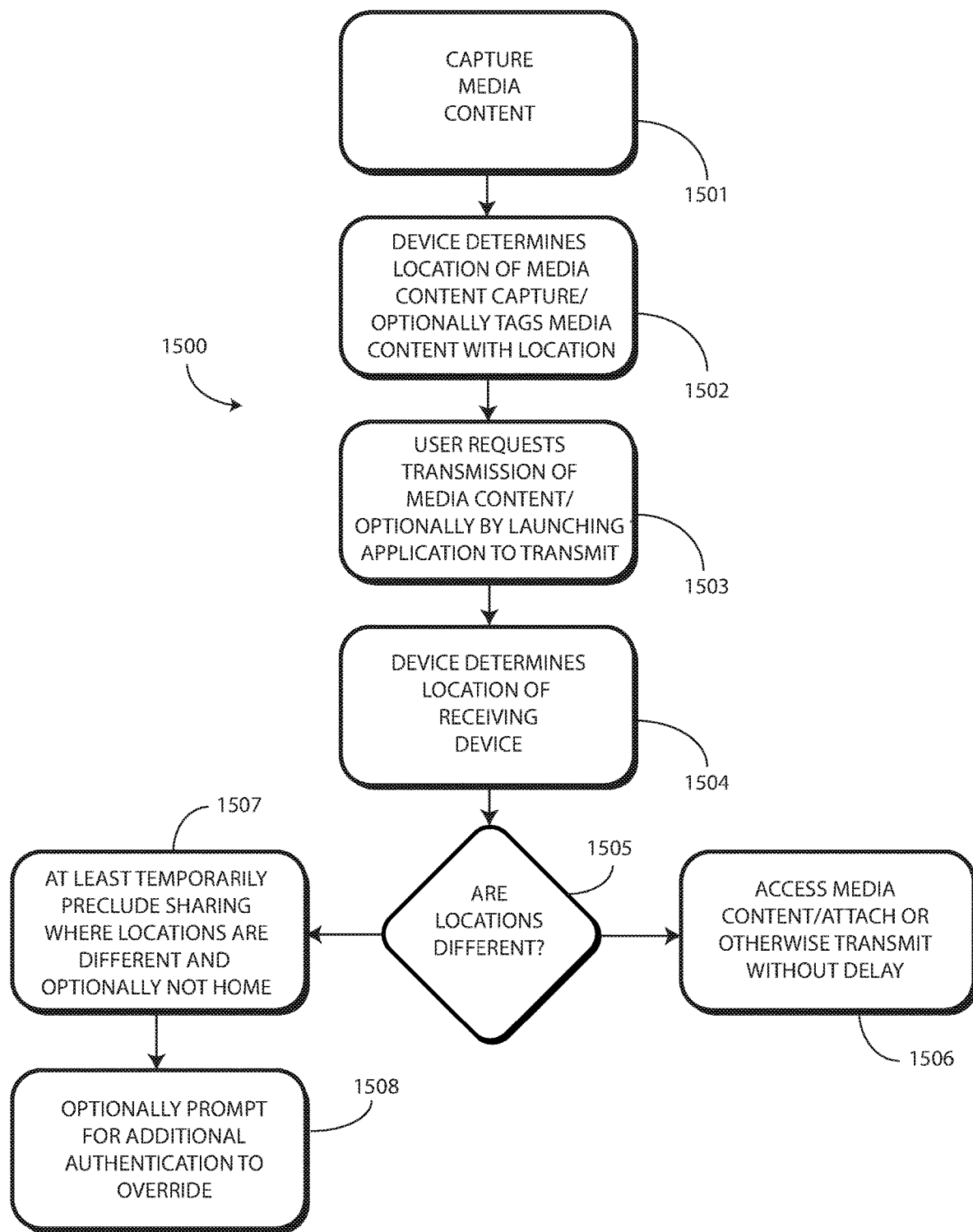
FIG. 15 illustrates yet another explanatory method in accordance with one or more embodiments of the disclosure.

Turning now to FIG. 15, illustrated therein is still another method 1500 in accordance with one or more embodiments of the disclosure. Beginning at step 1501, one or more sensors of an electronic device capture media content while the electronic device is situated at a media content capture location. As before, the media content can comprise one or more of a captured image, captured audio, a captured screenshot (which is an image), captured video, or combinations thereof.

At step 1502, a location detector of the electronic device determines where the media content capture location is positioned. Optionally, the one or more processors of the electronic device can tag the media content with this media content capture location in one or more embodiments.

At step 1503, a user interface of the electronic device receives user input requesting transmission of the media content to another electronic device situated at another electronic device location. At step 1504, one or more processors of the electronic device determine where the other electronic device location is positioned.

Decision 1505 determines whether the media content capture location and the other electronic device location are substantially different locations or substantially the same location. Where the media content capture location and the other electronic device location are substantially the same location, step 1506 comprises the one or more processors of the electronic device causing a communication device of the electronic device to transmit the media content to the other electronic device without delay and without requiring additional authorization to transmit the media content. It should be noted that if the receiving electronic device is a social media server, which would always have an other electronic device location that is substantially different from the media content capture location, the method of FIG. 14 described above could be used to allow sharing based upon engagement history rather than location, as previously described.

Alternatively, when the media content capture location and the other electronic device location are substantially different locations, step 1507 comprises the one or more processors at least temporarily precluding the transmission of the media content to the other electronic device in response to the user input received at step 1503. As before, this at least temporarily precluding can comprise precluding an application operating on the one or more processors from accessing the media content.

In one or more embodiments, step 1508 comprises prompting for additional authorization to transmit the media content to the receiving electronic device. Step 1508 can also comprise receiving, from the user interface, the additional authorization to transmit the media content, and causing, by the one or more processors, the communication device to transmit the media content to the receiving electronic device even though the media content capture location and the location of the another electronic device are substantially different locations.

Figure 17:
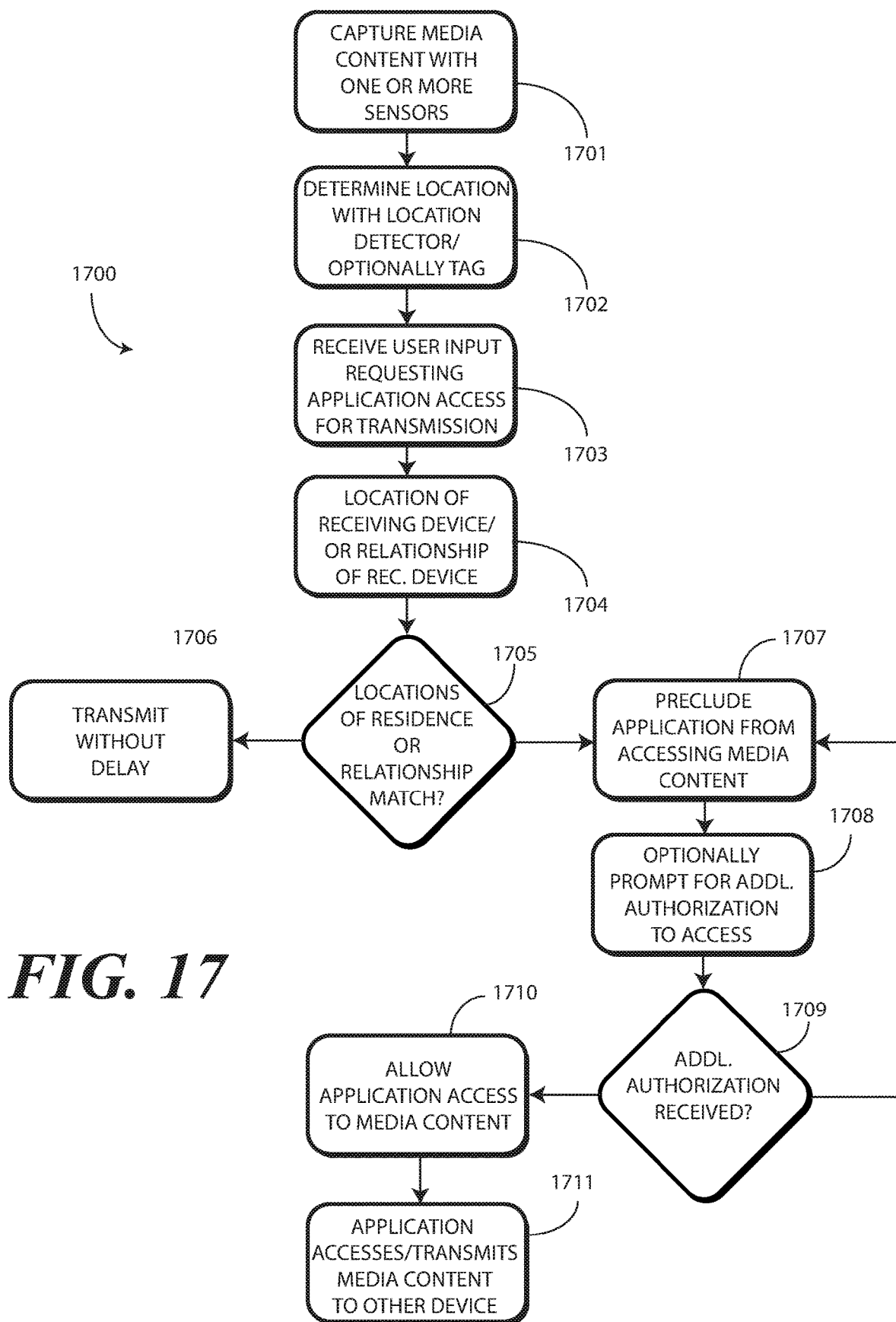
FIG. 17 illustrates another explanatory method in accordance with one or more embodiments of the disclosure.

Turning now to FIG. 17, illustrated therein is still another method 1700. In this method, there is a determination whether the transmitting electronic device and the receiving electronic device are situated at a location of residence of the authorized user of the electronic device attempting to transmit the media content to the receiving device. Where this is the case, the media content can be freely transmitted and shared between devices.

Beginning at step 1701, one or more sensors capture media content from an environment around an electronic device. Step 1702 comprises a location detector of the electronic device identifying a location of the electronic device occurring when the one or more sensors capture the media content. Said differently, step 1702 comprises the location detector of the electronic device identifying a media content capture location.

At step 1703, a user interface of the electronic device receives user input requesting transmission of the media content to another electronic device. One or more processors of the electronic device determine at step 1704, optionally using one or more of the mechanisms described above with reference to FIG. 16, a location where the receiving electronic device is situated. Said differently, in one or more embodiments step 1704 comprises the one or more processors determining another device location of the other electronic device.

At decision 1705, one or more processors of the electronic device receiving the user input at step 1703 determine whether the media content capture location and the other location of the other electronic device are each positioned at a location of residence of the authorized user of the electronic device receiving the user input at step 1703. Where they are, step 1706 comprises omitting, by the one or more processors of the electronic device, any at least temporary preclusion of the transmission of the media content to the receiving electronic device. Instead, step 1706 comprises the one or more processors causing a communication device of the electronic device to transmit the media content to the other electronic device when the location and the another location are each positioned at the location of residence of the authorized user of the electronic device.

Where the transmitting electronic device and the receiving electronic device are not both situated at the location of residence of the authorized user of the transmitting electronic device, in this illustrative embodiment privacy protection is still in order. Thus, in one or more embodiments step 1707 comprises at least temporarily precluding the transmission of the media content to the other electronic device. Step 1708 can comprise one or more processors of the electronic device causing, in response to the user input received at step 1703, and the transmitting electronic device and the receiving electronic device are not both situated at the location of residence of the authorized user of the transmitting electronic device, the presentation of a prompt for additional authorization to transmit the media content to the other electronic device. Decision 1709 determines whether this additional authorization is received at a user interface of the electronic device.

Where it is not, the at least temporarily precluding continues at step 1707. Where it is, step 1710 comprises the one or more processors ceasing the at least temporarily precluding of the transmission of the media content to the other electronic device and causing, at step 1711, a communication device of the electronic device to transmit the media content to the other electronic device.

Figure 18:
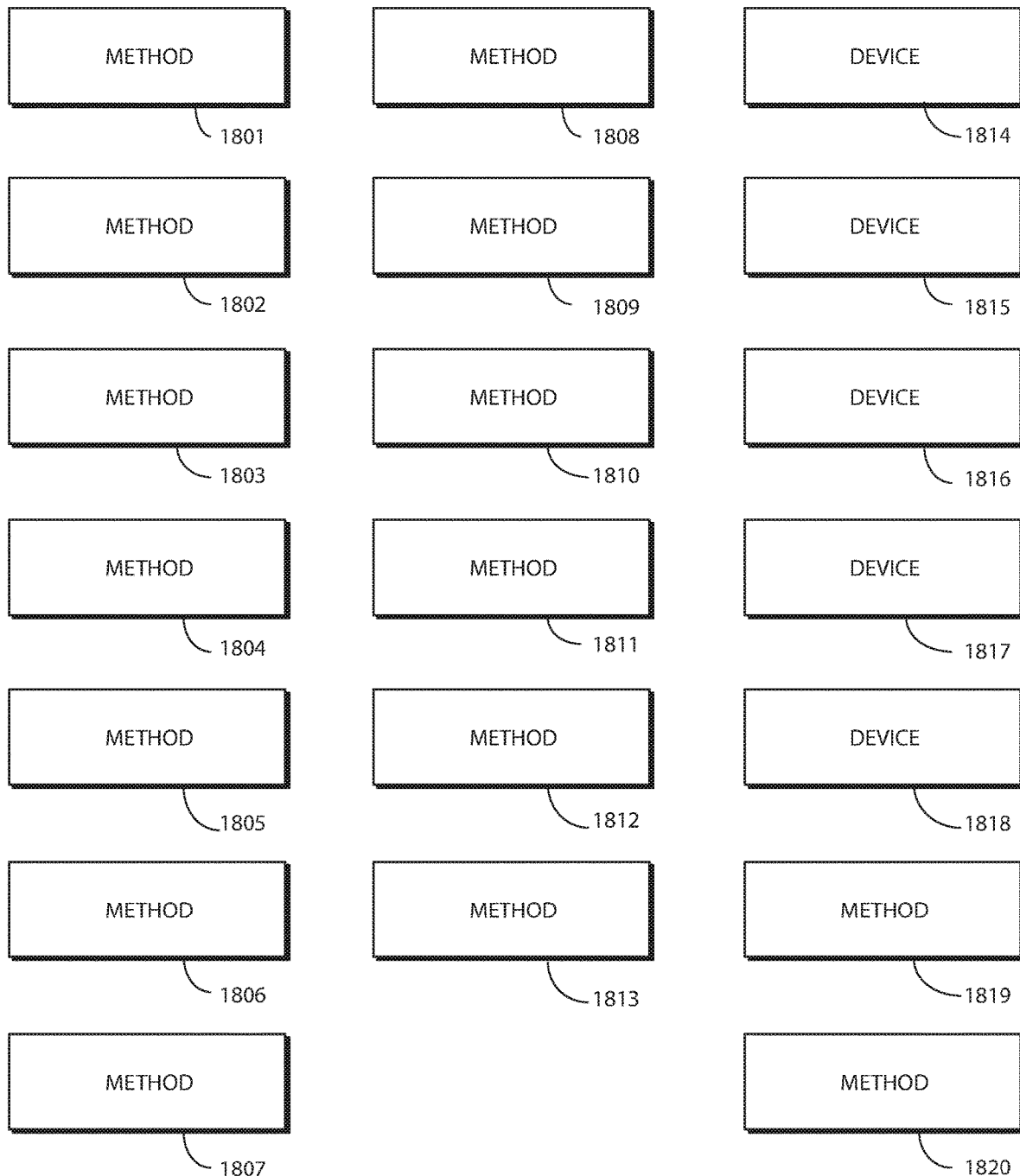
FIG. 18 illustrates various embodiments of the disclosure.
Figure 19:
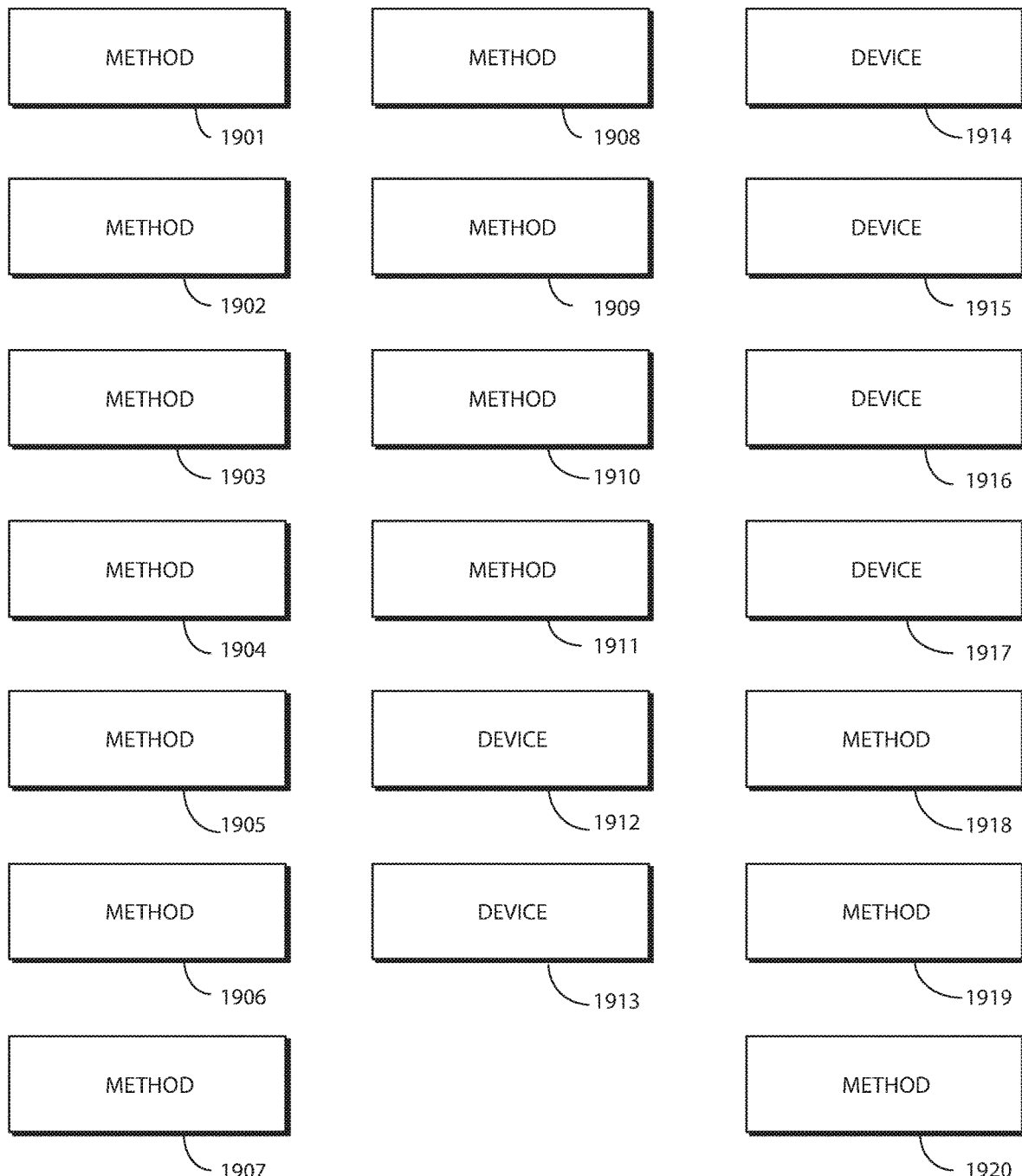
FIG. 19 illustrates other various embodiments of the disclosure.
Figure 20:
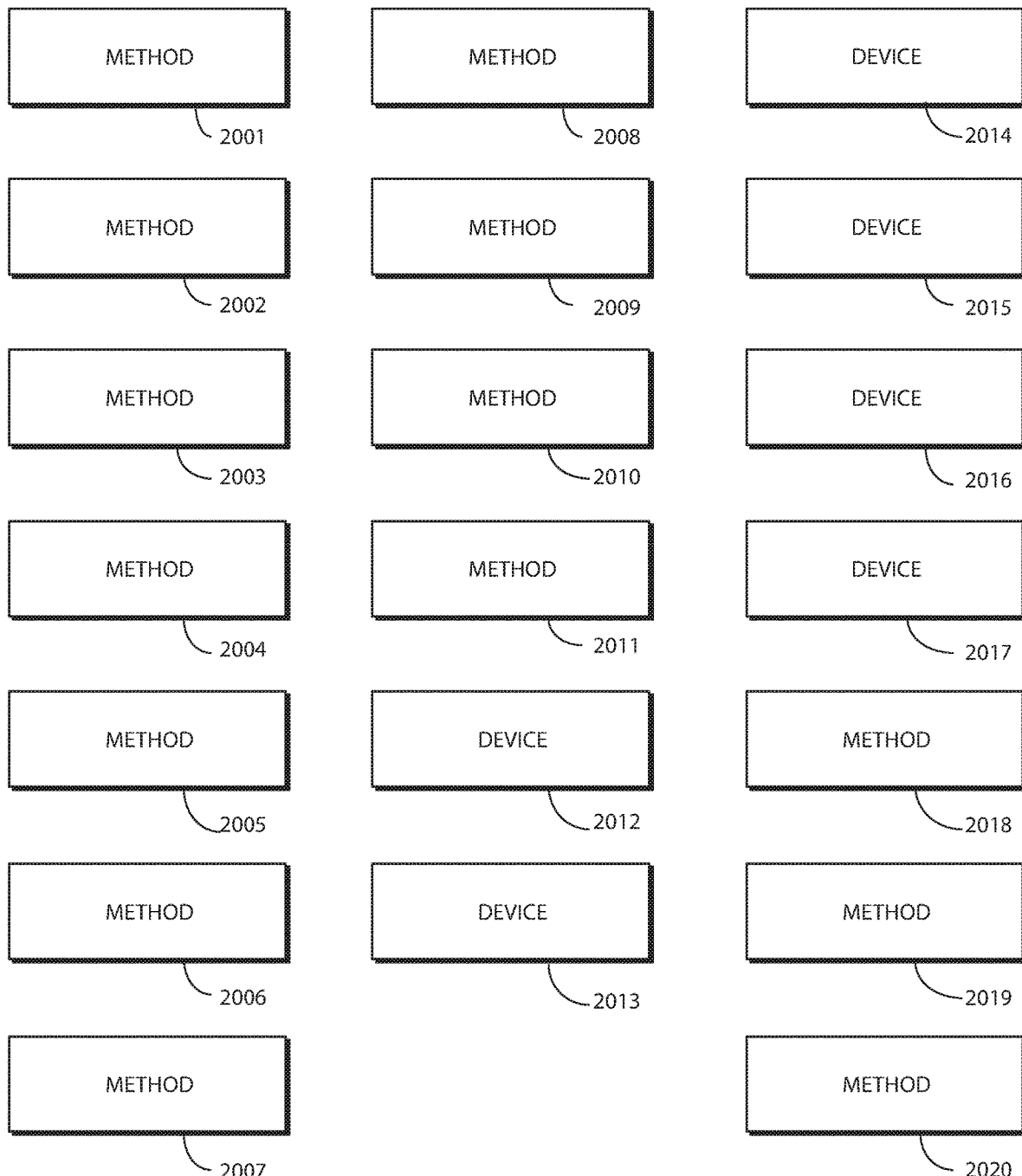
FIG. 20 illustrates still other various embodiments of the disclosure.

Turning now to FIGS. 18-20, illustrated therein are various embodiments of the disclosure. Since each of the elements included with these embodiments has been illustrated and described above, for brevity the particular configurations recited in FIGS. 18-20 will be illustrated with a labeled representation, which in this case is a labeled rectangular box. Since all the details of each embodiment has been sufficiently illustrated and described above, their repeated illustration in FIGS. 18-20 is no longer essential for a proper understanding of each embodiment.

Beginning with FIG. 18, at 1801 a method in an electronic device comprises capturing, with one or more sensors, media content from an environment of the electronic device. At 1801, the method comprises determining, with a location detector, whether the environment is positioned at a location of residence of an authorized user of the electronic device when the one or more sensors capture the media content.

At 1801, the method comprises receiving, at a user interface, user input requesting transmission of the media content to another electronic device. At 1801, the method comprises, when the environment is positioned at the location of residence of the authorized user of the electronic device when the one or more sensors capture the media content, at least temporarily precluding, with one or more processors in response to the user input, the transmission of the media content to the another electronic device.

At 1802, the at least temporarily precluding the transmission of the media content to the another electronic device of 1801 occurs only when the another electronic device is positioned outside the location of residence of the authorized user of the electronic device. At 1803, when the environment is positioned other than at the location of residence of the authorized user of the electronic device, the method of 1801 comprises causing, by the one or more processors in response to the user input, a communication device to transmit the media content to the another electronic device.

At 1804, the method of 1801 further comprises prompting, by the one or more processors at the user interface, for additional authorization to transmit the media content to the other electronic device while at least temporarily precluding the transmission of the media content to the another electronic device. At 1805, the method of 1804 further comprises receiving, at the user interface, the additional authorization to transmit the media content to the another electronic device while at least temporarily precluding the transmission of the media content to the another electronic device, and ceasing, by the one or more processors in response to the receiving the additional authorization to transmit the media content to the another electronic device, the at least temporarily precluding the transmission of the media content to the another electronic device, and causing, by the one or more processors in response to the ceasing, a communication device to transmit the media content to the another electronic device.

At 1806, the media content of 1805 comprises one or more of a captured image, captured video, captured audio, or combinations thereof. At 1807, the user input requesting transmission of the media content to the other electronic device of 1805 comprises a request for a predefined application operating on the one or more processors to cause the transmission of the media content to the other electronic device. At 1807, the at least temporarily precluding the transmission of the media content to the another electronic device of 1805 comprises at least temporarily precluding the predefined application from accessing the media content.

At 1808, the location of residence of 1805 comprises a predefined portion of a residence of the authorized user of the electronic device. At 1809, the predefined portion of the residence of the authorized user of the electronic device of 1808 comprises a predefined portion of a dwelling situated at the residence of the authorized user of the electronic device.

At 1810, the method of 1801 further comprises determining, by the one or more processors, whether a user setting limiting transmission of the media content when captured at the location of residence is set in a memory of the electronic device. At 1810, the at least temporarily precluding the transmission of the media content to the another electronic device occurs only when the user setting limiting transmission of the media content when captured at the location of residence is set in the memory of the electronic device.

At 1811, the method of 1801 further comprises determining, by the one or more processors, whether a user setting set in a memory of the electronic device identifies the media content as private media content. At 1811, the at least temporarily precluding the transmission of the media content to the another electronic device occurs only when the user setting identifies the media content as the private media content.

At 1812, the user setting of 1811 identifies the media content as the private media content when the media content comprises multimedia content. At 1813, the user setting of 1811 identifies the media content as the private media content when the one or more sensors capture the media content a predefined time of day. Media privacy can also be determined via media content post-processing or analysis in other embodiments.

At 1814, an electronic device comprises one or more sensors capturing media content from an environment of the electronic device. At 1814, the electronic device comprises a location detector determining whether the environment of the electronic device is situated at a location of residence of an authorized user of the electronic device.

At 1814, the electronic device comprises a user interface receiving user input requesting transmission of the media content to another electronic device located outside the location of residence of the authorized user of the electronic device. At 1814, the electronic device comprises one or more processors precluding transmission of the media content to the other electronic device in response to the user input when the location detector determines that one or more sensors captured the media content at the location of residence of the authorized user of the electronic device.

At 1815, the electronic device of 1814 further comprises a communication device. At 1815, the one or more processors cause, in response to the user input, the communication device to transmit the media content to the other electronic device when the location detector determines that the one or more sensors captured the media content outside the location of residence of the authorized user of the electronic device.

At 1816, the one or more processors of 1814 cause, in response to the user input when the location detector determines that one or more sensors captured the media content at the location of residence of the authorized user of the electronic device, presentation of a prompt for additional authorization to transmit the media content to the another electronic device. At 1816, the one or more processors cease the precluding of the transmission of the media content to the other electronic device upon receiving the additional authorization to transmit the media content to the other electronic device.

At 1817, the one or more processors of 1814 determine whether the media content matches at least one predefined criterion. At 1817, the one or more processors preclude the transmission of the media content to the another electronic device in response to the user input only where the media content matches the at least one predefined criterion.

At 1818, the at least one predefined criterion of 1817 comprises one or more of a predefined time of day during which the media content was captured, the location of residence being a predefined portion of a residence of the authorized user of the electronic device, or whether a user setting of the electronic device identifies the media content as private media content.

At 1819, a method in an electronic device comprises capturing, with one or more sensors, media content from an environment of the electronic device. At 1819, the method comprises determining, with the one or more sensors, whether the environment is positioned within a vehicle owned by an authorized user of the electronic device when the one or more sensors capture the media content.

At 1819, the method comprises receiving, at a user interface, user input requesting transmission of the media content to another electronic device situated outside the vehicle owned by the authorized user of the electronic device. At 1819, when the environment is positioned within the vehicle owned by the authorized user of the electronic device when the one or more sensors capture the media content, the method comprises at least temporarily precluding, with one or more processors in response to the user input, the transmission of the media content to the another electronic device. At 1820, the determining of 1819 whether the environment is positioned within the vehicle owned by the authorized user of the electronic device comprises establishing, with a communication device, electronic communication with the vehicle to confirm the authorized user of the electronic device owns the vehicle.

Turning now to FIG. 19, illustrated therein are other embodiments of the disclosure. At 1901, a method in an electronic device comprises capturing, with one or more sensors, media content from an environment of the electronic device. At 1901, the method comprises identifying, with a location detector, a first location of the electronic device occurring when the one or more sensors capture the media content.

At 1901, the method comprises receiving, at a user interface, user input requesting transmission of the media content to another electronic device or social media. At 1901, the method comprises identifying, with the location detector, a second location of the electronic device occurring when the user input is received. At 1901, when the first location and the second location are substantially different locations, the method comprises at least temporarily precluding, with one or more processors in response to the user input, the transmission of the media content to the other electronic device.

At 1902, the first location of 1901 and the second location are substantially different locations when the second location is beyond a predefined radius from the first location. At 1903, the predefined radius of 1902 is user defined in the menu.

At 1904, when the first location of 1901 and the second location are substantially similar locations, the method comprises omitting, by the one or more processors, the at least temporarily precluding the transmission of the media content to the another electronic device and instead causing, by the one or more processors in response to the user input, a communication device to transmit the media content to the another electronic device. At 1905, the first location of 1904 and the second location are substantially similar locations when the second location is within a predefined radius of the first location. At 1906 the causing the communication device to transmit the media content to the other electronic device of 1904 occurs only when the other electronic device is situated within a predefined radius of the first location.

At 1907, the method of 1901 further comprises prompting, by the one or more processors at the user interface, for additional authorization to transmit the media content to the other electronic device while at least temporarily precluding the transmission of the media content to the another electronic device. At 1908, the method of 1907 further comprises receiving, at the user interface, the additional authorization to transmit the media content to the other electronic device while at least temporarily precluding the transmission of the media content to the other electronic device.

At 1908, the method comprises ceasing, by the one or more processors in response to the receiving the additional authorization to transmit the media content to the other electronic device, the at least temporarily precluding the transmission of the media content to the another electronic device. At 1908, the method comprises causing, by the one or more processors in response to the ceasing, a communication device to transmit the media content to the other electronic device. At 1909, the media content of 1908 comprises one or more of a captured image, captured video, captured audio, captured screenshots, captured texts, captured emails, or combinations thereof.

At 1910, when the first location of 1901 is positioned at a location of residence of an authorized user of the electronic device, and the first location and the second location are substantially similar locations, the method also includes at least temporarily precluding, with the one or more processors in response to the user input, the transmission of the media content to the other electronic device. At 1911, the method of 1901 further comprises presenting, by the one or more processors on the user interface, a prompt indicating that the first location and the second location are substantially different locations.

At 1912, an electronic device comprises one or more sensors capturing media content while the electronic device is situated at a media content capture location. At 1912, the electronic device comprises a user interface receiving user input requesting transmission of the media content to another electronic device at a user input reception location.

At 1912, the electronic device comprises a location detector determining whether the media content capture location and the user input reception location are substantially different locations. At 1912, the one or more processors at least temporarily preclude, in response to the user input, the transmission of the media content to the another electronic device when the location detector determines that the media content capture location and the user input reception location are substantially different locations.

At 1913, the location detector of 1912 further determines whether the media content capture location is situated at a location of residence of an authorized user of the electronic device. At 1913, the one or more processors also at least temporarily preclude the transmission of the media content to the other electronic device when the location detector determines that the media content capture location is situated at the location of residence of the authorized user of the electronic device.

At 1914, the electronic device of 1912 further comprises a communication device. At 1914, the one or more processors cause, in response to the user input, the communication device to transmit the media content to the other electronic device when the location detector determines that the media content capture location and the user input reception location are substantially similar locations.

At 1915, the other electronic device of 1914 is situated at another electronic device location. At 1915, the one or more processors cause the communication device to transmit the media content to the other electronic device only when the media content capture location and the another electronic device location are substantially similar locations.

At 1916, the one or more processors of 1912 cause, in response to the user input when the location detector determines that the media content capture location and the user input reception location are substantially different locations, presentation of a prompt for additional authorization to transmit the media content to the another electronic device. At 1916, the one or more processors cease the precluding of the transmission of the media content to the other electronic device upon receiving the additional authorization to transmit the media content to the other electronic device.

At 1917, a method in an electronic device comprises capturing, with one or more sensors of the electronic device, media content from an environment of the electronic device. At 1917, the method comprises receiving, with a user interface of the electronic device, a request to transmit the media content to another electronic device.

At 1917, the method comprises determining, with a location detector, whether a first location where the one or more sensors captured the media content and a second location where the user interface received the request to transmit (share) the media content to the other electronic device are substantially different locations. At 1901, the method comprises precluding, by one or more processors, transmission of the media content to the other electronic device when the location detector determines that the first location and the second location are substantially different locations.

At 1918, the method of 1917 further comprises presenting, by the one or more processors at the user interface, a prompt requesting additional authentication to override the precluding of the transmission of the media content to the another electronic device when the location detector determines that the first location and the second location are substantially different locations. At 1918, the method comprises overriding, by the one or more processors, the precluding the transmission of the media content when the additional authentication is received at the user interface and causing a communication device of the electronic device to transmit the media content to the other electronic device.

At 1919, the precluding of the transmission of the media content to the other electronic device occurring at 1918 continues until the location detector determines that the first location and the second location are substantially similar locations. At 1920, the method of 1917 further comprises also precluding, by the one or more processors, the transmission of the media content to the other electronic device when the location detector determines that the first location is situated at a residence of an authorized user of the electronic device.

Turning now to FIG. 20, illustrated therein are still other embodiments of the disclosure.

At 2001, a method in an electronic device comprises capturing, with one or more sensors, media content from an environment of the electronic device. At 2001, the method comprises identifying, with a location detector, a location of the electronic device occurring when the one or more sensors capture the media content.

At 2001, the method comprises receiving, at a user interface, user input requesting transmission of the media content to another electronic device. At 2001, the method comprises determining, by one or more processors of the electronic device, another location of the other electronic device. When the location and the other location are substantially different locations, 2001 comprises at least temporarily precluding, with the one or more processors in response to the user input, the transmission of the media content to the other electronic device. At 2002, the location and the other location of 2001 are substantially different locations when the other location is beyond a predefined radius from the location.

At 2003, 2001 includes, when the location and the another location are substantially similar locations, omitting, by the one or more processors, the at least temporarily precluding the transmission of the media content to the other electronic device and instead causing, by the one or more processors in response to the user input, a communication device to transmit the media content to the other electronic device. At 2004, the location and the other location of 2003 are substantially similar locations when the other location is within a predefined radius of the location.

At 2005, the method of 2001 further comprises prompting, by the one or more processors at the user interface, for additional authorization to transmit the media content to the other electronic device while at least temporarily precluding the transmission of the media content to the another electronic device. At 2006, the method of 2005 further comprises receiving, at the user interface, the additional authorization to transmit the media content to the other electronic device while at least temporarily precluding the transmission of the media content to the other electronic device.

At 2006, the method comprises ceasing, by the one or more processors in response to the receiving the additional authorization to transmit the media content to the another electronic device, the at least temporarily precluding the transmission of the media content to the another electronic device. At 2006, the method comprises causing, by the one or more processors in response to the ceasing, a communication device to transmit the media content to the other electronic device. At 2007, the media content of 2006 comprises one or more of a captured image, captured video, captured audio, or combinations thereof.

At 2008, the method of 2001 comprises determining, by the one or more processors of the electronic device, from a database comprising information pertaining to the electronic device and the another electronic device, whether an authorized user of the electronic device and another authorized user of the another electronic device reside at a common residence. At 2008, the method comprises omitting, by the one or more processors, the at least temporarily precluding the transmission of the media content to the another electronic device and instead causing, by the one or more processors in response to the user input, a communication device to transmit the media content to the another electronic device when the authorized user of the electronic device and the another authorized user of the another electronic device reside at the common residence, even when the location and the another location are substantially different locations.

At 2009, the method of 2001 comprises determining, by the one or more processors from a database comprising information pertaining to the electronic device and the other electronic device, whether the other electronic device is a companion electronic device of the electronic device. At 2009, the method comprises omitting, by the one or more processors, the at least temporarily precluding the transmission of the media content to the another electronic device and instead causing, by the one or more processors in response to the user input, a communication device to transmit the media content to the another electronic device when the another electronic device is the companion electronic device of the electronic device, even when the location and the another location are substantially different locations.

At 2010, the method of 2001 comprises determining, by the one or more processors of the electronic device, whether the location and the other location are each positioned at a location of residence of an authorized user of the electronic device. At 2010, the method comprises omitting, by the one or more processors, the at least temporarily precluding the transmission of the media content to the another electronic device and instead causing, by the one or more processors in response to the user input, a communication device to transmit the media content to the another electronic device when the location and the another location are each positioned at the location of residence of the authorized user of the electronic device.

At 2011, the method of 2001 further comprises presenting, by the one or more processors on the user interface. At 2011, the prompt indicates that the location and the other location are substantially different locations. This is always the case when the other electronic device is a social media service server.

At 2012, an electronic device comprises one or more sensors capturing media content while the electronic device is situated at a media content capture location. At 2012, the electronic device comprises a user interface receiving user input requesting transmission of the media content to another electronic device situated at another electronic device location.

At 2012, the electronic device comprises one or more processors determining whether the media content capture location and the other electronic device location are substantially different locations. At 2012, the one or more processors at least temporarily preclude, in response to the user input, the transmission of the media content to the another electronic device when the media content capture location and the another electronic device location are substantially different locations.

At 2013, the electronic device of 2012 further comprises a communication device. At 2013, the one or more processors cause, in response to the user input, the communication device to transmit the media content to the another electronic device when the media content capture location and the another electronic device location are substantially similar locations.

At 2014, the electronic device of 2012 further comprises a memory comprising a database comprising information pertaining to the electronic device and the other electronic device. At 2014, the electronic device comprises a communication device. At 2014, the one or more processors determine, from the database, whether an authorized user of the electronic device and another authorized user of the other electronic device reside at the same location of residence. At 2014, the one or more processors omit the at least temporarily precluding, in response to the user input, the transmission of the media content to the another electronic device when the authorized user of the electronic device and the another authorized user of the another electronic device reside at the same location of residence.

At 2015, the electronic device of 2012 further comprises a memory comprising a database comprising information pertaining to the electronic device and the other electronic device. At 2015, the electronic device of 2012 further comprises a communication device.

At 2015, the one or more processors determine, from the database, whether the other electronic device is a companion electronic device of the electronic device. At 2015, the one or more processors omit the at least temporarily precluding, in response to the user input, the transmission of the media content to the other electronic device when the other electronic device is the companion electronic device of the electronic device.

At 2016, the electronic device of 2012 further comprises a communication device. At 2016, the one or more processors further determine whether the media content capture location and the other electronic device location are situated at a location of residence of an authorized user of the electronic device. At 2016, the one or more processors omit the at least temporarily precluding the transmission of the media content to the another electronic device and instead cause, in response to the user input, the communication device to transmit the media content to the other electronic device when the media content capture location and the other electronic device location are each positioned at the location of residence of the authorized user of the electronic device.

At 2017, a method in an electronic device comprises capturing, with one or more sensors, media content from an environment of the electronic device at a media content capture location. At 2017, the method comprises receiving, with a user interface, user input requesting transmission of the media content to another electronic device.

At 2017, the method comprises determining, with one or more processors, a location of the other electronic device. At 2017, when the media content capture location and the location of the other electronic device are substantially the same location, the method comprises causing, by the one or more processors, a communication device to transmit the media content to the another electronic device. Alternatively, when the media content capture location and the location of the another electronic device are substantially different locations, the method of 2017 comprises precluding the transmission of the media content until additional authorization to transmit the media content is received at the user interface.

At 2018, the method of 2017 comprises prompting, by the one or more processors on the user interface when the media content capture location and the location of the another electronic device are substantially different locations, for the additional authorization to transmit the media content to the another electronic device. At 2019, the method of 2018 comprises receiving, from the user interface, the additional authorization to transmit the media content. At 2019, the method comprises causing, by the one or more processors, a communication device to transmit the media content to the another electronic device even though the media content capture location and the location of the another electronic device are substantially different locations.

At 2020, the method of 2017 comprises overriding the precluding when the another electronic device corresponds to at least one predefined criterion even though the media content capture location and the location of the another electronic device are substantially different locations. For example, prior engagement history may be the only criterion required to override the sharing restriction. More specifically, two devices that were previously solidly linked and/or paired by location might not restrict sharing therebetween in the future when at a new location and previously paired.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example in one or more embodiments, the requirement to confirm that both a transmitting electronic device and a receiving electronic device are both at home and reside at home is eliminated. Instead, the requirement for this embodiment is now devices at a known location/same location can share media collected at that same location, i.e., there is no reference to living there, or home location.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   receiving, with a user interface, one or more user settings subdividing a location of residence of an authorized user of the electronic device into at least a first residence portion and a second residence portion;
   capturing, with one or more sensors, media content from an environment of the electronic device;
   determining, with a location detector, whether the environment is positioned at the location of residence of the authorized user of the electronic device when the one or more sensors capture the media content, wherein the determining with the location detector whether the environment is positioned at the location of residence of the electronic device further comprises determining whether the environment is positioned within the first residence portion of the location of residence or the second residence portion of the location of residence;
   receiving, at the user interface, user input requesting transmission of the media content to another electronic device; and
   when the environment is positioned at the location of residence of the authorized user of the electronic device when the one or more sensors capture the media content, at least temporarily precluding, with one or more processors in response to the user input, the transmission of the media content to the another electronic device, wherein the precluding occurs when the environment is positioned at the first residence portion of the location of residence, and when the environment is positioned at the second residence portion of the location of residence the method further comprises transmitting the media content to the another electronic device without any temporary preclusion.

2. The method of claim 1, wherein the at least temporarily precluding the transmission of the media content to the another electronic device occurs only when the another electronic device is positioned outside the location of residence of the authorized user of the electronic device.

3. The method of claim 1, wherein the first residence portion comprises an upstairs portion of the location of residence.

4. The method of claim 1, wherein the at least temporarily precluding the transmission of the media content to the another electronic device occurs only during predefined hours defined by one or more other user settings.

5. The method of claim 4, further comprising:
   prompting, by the one or more processors at the user interface, for additional authorization to transmit the media content to the another electronic device while at least temporarily precluding the transmission of the media content to the another electronic device;
   receiving, at the user interface, the additional authorization to transmit the media content to the another electronic device while at least temporarily precluding the transmission of the media content to the another electronic device;
   ceasing, by the one or more processors in response to the receiving the additional authorization to transmit the media content to the another electronic device, the at least temporarily precluding the transmission of the media content to the another electronic device; and
   causing, by the one or more processors in response to the ceasing, a communication device to transmit the media content to the another electronic device.

6. The method of claim 4, wherein the media content comprises one or more of a captured image, captured video, captured audio, captured screenshots, or combinations thereof and the first residence portion comprises an interior of a dwelling of the authorized user of the electronic device situated at the location of residence and the second residence portion comprises an exterior of the dwelling of the authorized user of the electronic device situated at the location of residence.

7. The method of claim 5, wherein:
   the user input requesting the transmission of the media content to the another electronic device comprises a request for a predefined application operating on the one or more processors to cause the transmission of the media content to the another electronic device; and
   the at least temporarily precluding the transmission of the media content to the another electronic device comprises at least temporarily precluding the predefined application from accessing the media content.

8. The method of claim 4, wherein the first residence portion comprises an upstairs of a dwelling of the authorized user of the electronic device situated at the location of residence and the second residence portion comprises a downstairs of the dwelling of the authorized user of the electronic device situated at the location of residence.

9. The method of claim 8, wherein the one or more user settings are selected from a menu presented on the user interface of the electronic device.

10. The method of claim 1, further comprising;
   determining, by the one or more processors, whether a user setting limiting transmission of the media content when captured at the location of residence is set in a memory of the electronic device; and
   wherein the at least temporarily precluding the transmission of the media content to the another electronic device occurs only when the user setting limiting transmission of the media content when captured at the location of residence is set in the memory of the electronic device.

11. The method of claim 1, further comprising;
determining, by the one or more processors, whether a user setting set in a memory of the electronic device identifies the media content as private media content; and
wherein the at least temporarily precluding the transmission of the media content to the another electronic device occurs only when the user setting identifies the media content as the private media content.

12. The method of claim 11, further comprising overriding the at least temporarily precluding and transmitting the media content to the another electronic device when the environment is positioned at location of residence and the another electronic device is also situated at the location of residence of the user of the electronic device wherein the user setting identifies the media content as the private media content when the media content comprises multimedia content.

13. The method of claim 3, wherein the first residence portion comprises a bedroom of the authorized user of the electronic device.

14. An electronic device, comprising:
one or more sensors capturing media content from an environment of the electronic device;
a location detector determining whether the environment of the electronic device is situated at a location of residence of an authorized user of the electronic device;
a user interface receiving user input requesting transmission of the media content to another electronic device located outside the location of residence of the authorized user of the electronic device; and
one or more processors:
precluding transmission of the media content to the another electronic device in response to the user input when the location detector determines that one or more sensors captured the media content at the location of residence of the authorized user of the electronic device; and
causing transmission of the media content without the precluding when the location detector determines that the one or more sensors captured the media content at the location of residence of the authorized user of the electronic device and the another electronic device is situated at the location of residence of the authorized user of the electronic device.

15. The electronic device of claim 14, the one or more processors continuing preclusion of the transmission of the media content to the another electronic device in response to the user input when the location detector determines that the one or more sensors captured the media content at the location of residence of the authorized user of the electronic device until an additional authorization to transmit the media content is received at the user interface.

16. The electronic device of claim 14, the one or more processors:
causing, in response to the user input when the location detector determines that one or more sensors captured the media content at the location of residence of the authorized user of the electronic device, presentation of a prompt for additional authorization to transmit the media content to the another electronic device; and
ceasing the precluding of the transmission of the media content to the another electronic device upon receiving the additional authorization to transmit the media content to the another electronic device.

17. The electronic device of claim 14, the one or more processors determining whether the media content depicts a single person or a plurality of persons, the one or more processors precluding the transmission of the media content to the another electronic device in response to the user input only where the media content depicts a single person.

18. The electronic device of claim 14, the one or more processors determining whether the media content depicts a predefined object situated at the location of residence, the one or more processors precluding the transmission of the media content to the another electronic device in response to the user input only where the media content depicts the predefined object.

19. A method in an electronic device, the method comprising:
capturing, with one or more sensors, media content from an environment of the electronic device;
determining, with the one or more sensors, whether the environment is positioned within a vehicle owned by an authorized user of the electronic device when the one or more sensors capture the media content;
receiving, at a user interface, user input requesting transmission of the media content to another electronic device situated outside the vehicle owned by the authorized user of the electronic device; and
when the environment is positioned within the vehicle owned by the authorized user of the electronic device when the one or more sensors capture the media content, at least temporarily precluding, with one or more processors in response to the user input, the transmission of the media content to the another electronic device;
wherein the precluding occurs only when the media content is multimedia content, further comprising when the environment is positioned within the vehicle owned by the authorized user of the electronic device when the one or more sensors capture the media content and the media content is only text, omitting the at least temporarily precluding, with one or more processors in response to the user input, the transmission of the media content to the another electronic device.

20. The method of claim 19, wherein the determining, with the one or more sensors, whether the environment is positioned within the vehicle owned by the authorized user of the electronic device when the one or more sensors capture the media content comprises exchanging electronic communications between the electronic device and the vehicle.

* * * * *